(12) United States Patent
Rose et al.

(10) Patent No.: US 9,156,172 B2
(45) Date of Patent: Oct. 13, 2015

(54) ROBOT SKELETAL COMPONENTS

(71) Applicant: Quality Manufacturing Inc., Winchester, KY (US)

(72) Inventors: Jeffrey A. Rose, Park City, UT (US); James Adam Rose, Lexington, KY (US); Stephen D. Rose, Lexington, KY (US); Raymond Cooper, Irvine, KY (US)

(73) Assignee: Quality Manufacturing Inc., Winchester, KY (US)

( * ) Notice: Subject to any disclaimer, the term of this patent is extended or adjusted under 35 U.S.C. 154(b) by 352 days.

(21) Appl. No.: 13/854,710

(22) Filed: Apr. 1, 2013

(65) Prior Publication Data

US 2013/0233116 A1    Sep. 12, 2013

Related U.S. Application Data

(63) Continuation of application No. 13/790,801, filed on Mar. 8, 2013.

(60) Provisional application No. 61/608,407, filed on Mar. 8, 2012, provisional application No. 61/655,949, filed (Continued)

(51) Int. Cl.
  *G05B 15/00* (2006.01)
  *G05B 21/00* (2006.01)
  (Continued)

(52) U.S. Cl.
  CPC ............... *B25J 18/00* (2013.01); *B25J 9/1612* (2013.01); *B25J 19/005* (2013.01);

(Continued)

(58) Field of Classification Search
  USPC .................................................. 700/245–264
  See application file for complete search history.

(56) References Cited

U.S. PATENT DOCUMENTS

| 702,117 A | 6/1902 | Taylor |
| 1,802,281 A | 4/1931 | Shimer |

(Continued)

FOREIGN PATENT DOCUMENTS

| EP | 0 582 731 A1 | 2/1994 |
| GB | 2434840 B | 10/2011 |

(Continued)

OTHER PUBLICATIONS

International Search Report and Written Opinion for PCT/US2013/029798 filed Mar. 8, 2013, and mailed from the International Searching Authority on Aug. 23, 2013, 20 pgs.

(Continued)

*Primary Examiner* — Bhavesh V Amin
(74) *Attorney, Agent, or Firm* — John R. Thompson; Stoel Rives LLP

(57) ABSTRACT

A robot skeletal component may be configured to support and power a robot. The skeletal component may include an elongated inner core and a battery coupled to and substantially circumscribing the inner core. The robot skeletal component may be configured to connect to a joint via a quick release flange. A casing may enclose the battery. The casing may be configured to seal punctures. The robot skeletal component may include a heating element to heat the battery. The robot skeletal component may be configured to transport fluid, data, and/or electrical power. The inner core may include a plurality of surface elements to transfer data and/or electrical power. The inner core may include a hollow interior, and the hollow interior may include a plurality of non-interconnected chambers configured to transfer fluid. The inner core may include insulators to insulate the inner core from the surface elements and/or the fluid.

31 Claims, 59 Drawing Sheets

Related U.S. Application Data on Jun. 5, 2012, provisional application No. 61/673,114, filed on Jul. 18, 2012, provisional application No. 61/683,324, filed on Aug. 15, 2012, provisional application No. 61/709,822, filed on Oct. 4, 2012, provisional application No. 61/767,130, filed on Feb. 20, 2013.

(51) Int. Cl.
```
B25J 18/00      (2006.01)
F04B 9/10       (2006.01)
B25J 9/16       (2006.01)
G01B 7/00       (2006.01)
B25J 19/00      (2006.01)
```

(52) U.S. Cl.
CPC .............. *B25J 19/0029* (2013.01); *F04B 9/10* (2013.01); *G01B 7/00* (2013.01); *Y10S 901/27* (2013.01); *Y10S 901/28* (2013.01); *Y10T 74/20311* (2015.01)

(56) References Cited

U.S. PATENT DOCUMENTS

| | | | |
|---|---|---|---|
| 3,945,892 | A | 3/1976 | James et al. |
| 3,999,904 | A | 12/1976 | Raymond |
| 4,001,556 | A | 1/1977 | Folchi et al. |
| 4,013,535 | A | 3/1977 | White |
| 4,067,093 | A | 1/1978 | Schumacher et al. |
| 4,241,816 | A | 12/1980 | Hubrecht et al. |
| 4,323,850 | A | 4/1982 | Dawson et al. |
| 4,481,815 | A | 11/1984 | Overton |
| 4,499,784 | A | 2/1985 | Shum |
| 4,555,953 | A | 12/1985 | Dario et al. |
| 4,572,564 | A | 2/1986 | Cipolla |
| 4,588,348 | A | 5/1986 | Beni et al. |
| 4,615,512 | A | 10/1986 | Hoke |
| 4,638,670 | A | 1/1987 | Moser |
| 4,745,844 | A | 5/1988 | Larsen |
| 4,766,389 | A | 8/1988 | Rhoades et al. |
| 4,770,455 | A | 9/1988 | Collins, Jr. |
| 4,817,440 | A | 4/1989 | Curtin |
| 4,823,071 | A | 4/1989 | Ding et al. |
| 4,841,224 | A | 6/1989 | Chalupnik et al. |
| 4,845,457 | A | 7/1989 | Nakanishi |
| 4,886,467 | A | 12/1989 | Peveto |
| 4,896,914 | A | 1/1990 | Stevens |
| 4,908,574 | A | 3/1990 | Rhoades et al. |
| 4,936,743 | A | 6/1990 | Stoss |
| 4,980,646 | A | 12/1990 | Zemel |
| 4,991,491 | A | 2/1991 | Neumann |
| 5,003,517 | A | 3/1991 | Greer, Jr. |
| 5,011,207 | A | 4/1991 | Stevens |
| 5,025,126 | A * | 6/1991 | Hansen ..................... 219/125.1 |
| 5,092,645 | A | 3/1992 | Okada |
| 5,114,300 | A | 5/1992 | Shahinpoor et al. |
| 5,114,859 | A | 5/1992 | Kagenow |
| 5,125,759 | A | 6/1992 | Chun |
| 5,233,293 | A | 8/1993 | Huang et al. |
| 5,403,057 | A | 4/1995 | Sugito et al. |
| 5,407,185 | A | 4/1995 | Zehnpfennig et al. |
| 5,413,454 | A * | 5/1995 | Movsesian .................... 414/729 |
| 5,565,625 | A * | 10/1996 | Howe et al. ................ 73/514.16 |
| 5,602,487 | A | 2/1997 | Manku |
| 5,793,640 | A | 8/1998 | Wu et al. |
| 5,897,156 | A * | 4/1999 | Hayard et al. ........... 296/136.13 |
| 5,911,158 | A | 6/1999 | Henderson et al. |
| 5,920,015 | A | 7/1999 | Hallberg et al. |
| 5,959,455 | A | 9/1999 | Brown |
| RE36,498 | E | 1/2000 | Howe et al. |
| 6,011,627 | A | 1/2000 | Mulligan et al. |
| 6,042,965 | A | 3/2000 | Nestler et al. |
| 6,067,862 | A | 5/2000 | Murray et al. |
| 6,082,196 | A | 7/2000 | Nonoyama et al. |
| 6,086,060 | A | 7/2000 | Berthold |
| 6,114,862 | A | 9/2000 | Tartagni et al. |
| 6,191,723 | B1 | 2/2001 | Lewis |
| 6,209,443 | B1 | 4/2001 | Perez |
| 6,444,488 | B2 | 9/2002 | Charrier et al. |
| 6,445,053 | B1 | 9/2002 | Cho |
| 6,448,621 | B1 * | 9/2002 | Thakur ......................... 257/414 |
| 6,484,068 | B1 | 11/2002 | Yamamoto et al. |
| 6,496,021 | B2 | 12/2002 | Tartagni et al. |
| 6,538,410 | B2 | 3/2003 | Mori et al. |
| 6,586,810 | B2 * | 7/2003 | Thakur ......................... 257/417 |
| 6,591,685 | B2 | 7/2003 | Kraetzl et al. |
| 6,604,426 | B2 | 8/2003 | Kraetzl |
| 6,661,239 | B1 | 12/2003 | Ozick |
| 6,684,754 | B2 * | 2/2004 | Comer ........................... 91/534 |
| 6,707,290 | B2 | 3/2004 | Nyce et al. |
| 6,724,201 | B2 | 4/2004 | Sato et al. |
| 6,764,373 | B1 | 7/2004 | Osawa et al. |
| 6,909,940 | B2 | 6/2005 | Hellman et al. |
| 6,922,158 | B2 * | 7/2005 | Ymker ........................... 341/15 |
| 6,938,938 | B2 | 9/2005 | Risle et al. |
| 6,995,649 | B2 | 2/2006 | Nugent |
| 7,118,601 | B2 | 10/2006 | Yasui et al. |
| 7,168,758 | B2 | 1/2007 | Bevan et al. |
| 7,212,007 | B2 | 5/2007 | Yasuda et al. |
| 7,219,551 | B2 | 5/2007 | Suzuki |
| 7,331,094 | B2 * | 2/2008 | Berninger .................. 29/407.05 |
| 7,498,758 | B2 | 3/2009 | Baba et al. |
| 7,570,065 | B2 | 8/2009 | Harish et al. |
| 7,591,165 | B2 | 9/2009 | Papakostas et al. |
| 7,610,811 | B1 | 11/2009 | Wang et al. |
| 7,658,119 | B2 | 2/2010 | Loeb et al. |
| 7,734,375 | B2 | 6/2010 | Buehler et al. |
| 7,878,075 | B2 | 2/2011 | Johansson et al. |
| 7,904,200 | B2 | 3/2011 | Takenaka et al. |
| 7,938,038 | B2 * | 5/2011 | Sugawara et al. .......... 74/490.04 |
| 7,951,477 | B2 | 5/2011 | Wood et al. |
| 8,012,100 | B2 | 9/2011 | Ward |
| 8,033,189 | B2 | 10/2011 | Hayakawa et al. |
| 8,079,278 | B2 | 12/2011 | Xi et al. |
| 8,081,299 | B2 | 12/2011 | Kim et al. |
| 8,097,986 | B2 * | 1/2012 | Kimura et al. ............. 310/12.17 |
| 8,126,592 | B2 | 2/2012 | Saunders et al. |
| 8,173,285 | B2 * | 5/2012 | Dougherty ...................... 429/62 |
| 8,181,540 | B2 | 5/2012 | Loeb et al. |
| 8,235,732 | B2 | 8/2012 | Garascia et al. |
| 8,341,158 | B2 | 12/2012 | Acharya |
| 8,342,586 | B2 * | 1/2013 | Papanikolopoulos et al. .... 244/2 |
| 8,364,312 | B2 * | 1/2013 | Tobey ........................... 700/258 |
| 8,415,957 | B2 | 4/2013 | Huang et al. |
| 8,446,157 | B2 | 5/2013 | Fröjd |
| 8,485,576 | B2 | 7/2013 | Melville et al. |
| 8,515,579 | B2 | 8/2013 | Alcazar et al. |
| 2002/0007230 | A1 * | 1/2002 | Ueno et al. ..................... 700/245 |
| 2004/0102274 | A1 | 5/2004 | Tesar |
| 2004/0186626 | A1 | 9/2004 | Tsukamoto et al. |
| 2004/0197179 | A1 | 10/2004 | Achkire et al. |
| 2005/0187657 | A1 * | 8/2005 | Hashimoto et al. ........... 700/245 |
| 2005/0283043 | A1 * | 12/2005 | Sisk ............................... 600/38 |
| 2008/0187391 | A1 | 8/2008 | Mimken |
| 2009/0088896 | A1 * | 4/2009 | Tobey ........................... 700/245 |

FOREIGN PATENT DOCUMENTS

| | | |
|---|---|---|
| JP | 06-151997 | 5/1994 |
| JP | 07-197928 A | 8/1995 |
| JP | 2003-159689 A | 6/2003 |
| WO | WO 2009/058359 A1 | 5/2009 |
| WO | WO 2010/133006 A1 | 11/2010 |
| WO | WO 2012/049535 A1 | 4/2012 |

OTHER PUBLICATIONS

Pratt, Dr. Gill et al., "DARPA Robotics Challenge Proposers' Day," Apr. 16, 2012, pp. 1-80.

Brockett, Roger W. et al., "Robotic Manipulation: Harvard Robotics Laboratory," http://hrl.harvard.edu/manipulation/, © 2003-2004 Harvard Robotics Laboratory and the authors, 2 pgs.

(56) References Cited

OTHER PUBLICATIONS

Ferrier, Nicola J. et al., "Reconstructing the Shape of a Deformable Membrane from Image Data," The International Journal of Robotics Research, vol. 19, No. 8, Aug. 2000, © 2000 Sage Publications, Inc., pp. 1-22.
Vásárhelyi, Gábor, "The Design of Tactile Sensors and Their Elastic Cover," Péter Pázmány Catholic University, Faculty of Information Technology, Multidisciplinary Technical Sciences Doctoral School, Budapest 2007, pp. 1-19.
Condliffe, Jamie, "This Robotic Finger Is More Sensitive Than Yours," http://gizmodo.com/5919516/this-robotic-finger-is-more-sensitive-than-yours, Jun. 19, 2002, 4 pgs.
Dunham, Katie, "USC Viterbi researchers work on a robot's touch," USC News, http://news.usc.edu/, Jun. 20, 2012, 3 pgs.
"Demystifying Piezoresistive Pressure Sensors," http://www.maximintegrated.com/app-notes/index.mvp/id/871, Jul. 17, 2002, 7 pgs.
"Piezoresistive Sensors," Chapter 6, LiuCh06v3.qxd, http://www.mech.northwestern.edu/FOM/LiuCh06v3_072505.pdf, Jul. 25, 2005, pp. 207-244.
Cook, Phillip, "How to Make an Ag/AgCl Reference Electrode—YouTube," uploaded Jul. 31, 2008, http://www.youtube.com/watch?v=JOR8DWH2PXE, 2 pgs.
Malkin, Robert A. et al., "Construction of a very high-density extracellular electrode array," American Journal of Physiology—Heart and Circulatory Physiology, submitted Aug. 9, 1999, accepted in final form Dec. 29, 1999, http://ajpheart.physiology.org/content/279/1/H437.full, 12 pgs.
Valdés-Ramírez, G. et al., "Design and Construction of Solid State Ag/AgCl Reference Electrodes Through Electrochemical Deposition of Ag and AgCl Onto a Graphite/Epoxy Resin-Based Composite. Parte 1: Electrochemical Deposition of Ag Onto a Graphite/Epoxy Resin-Based Composite," International Journal of Electrochemical Science, 6 (2011), http://www.electrochemsci.org/papers/vol6/6040971.pdf, pp. 971-987.
"The Silver/Silver Chloride Reference Electrode," Tanner's General Chemistry, http://tannerm.com/ag_ref.htm, © 2008 Tanner McCarron and Weston McCarron, 6 pgs.
"A new highly stable silver/silver-chloride electrode," Medical & Biological Engineering & Computing, http://resources.metapress.com/pdf-preview.axd?code=hl731174r737v716&size=largest, Nov. 1977, 1 pg.
Ansuini, Frank J. et al., "Factors Affecting the Accuracy of Reference Electrodes," Cathodic & Anodic Protection, reprinted from Materials Performance, vol. 33, No. 11, Nov. 1994, © 1994 NACE International, pp. 14-17.
"pH, Theory and Practice," http//www.radiometer-analytical.com/pdf/ph_theory.pdf, © Radiometer Analytical SAS, France, 2007-11G, 38 pgs.
Ross, Jordan, "Liquid metal thermal interface materials by Indium Corporation," http://www.indium.com/thermal-interface-materials/other/liquid-metal/, © 1996-2013 Indium Corporation, 3 pgs.
Dickey, Michael D. et al., "Eutectic Gallium-Indium (EGaIn): A Liquid Metal Alloy for the Formation of Stable Structures in Microchannels at Room Temperature**," http://gmwgroup.harvard.edu/pubs/pdf/1014.pdf, © 2008 Wiley-VCH GmbH & Co. KGaA, Weinheim, pp. 1097-1104.
"Dielectric Constant Measurement of Solid Materials," Application Note 380-1, Using HP 1645 1B Dielectric test fixture, http://www.hpmemory.org/an/pdf/an_380-1.pdf © 1998 Hewlett-Packard Company, 8 pgs.
"Pololu robotics forum—View topic—Concept; 3-way mobile joint," http://forum.pololu.com/viewtopic.php?f=1&t=819, Feb. 22, 2008, pp. 1-8.
Trinkel, Bud, Fluid Power Ebook Edition 1, eBooks content from Hydraulics & Pneumatics, http://hydraulicspneumatics.com/ebooks/fluid-power-ebook-edition-1-0, Jun. 25, 2007, 4 pgs.
Trinkel, Bud, Fluid Power Ebook Edition 2, eBooks content from Hydraulics & Pneumatics, http://hydraulicspneumatics.com/ebooks/fluid-power-ebook-edition-2-0, Jun. 25, 2007, 3 pgs.
"Book 2, Chapter 19: Rotary actuators, Other Technologies content from Hydraulics & Pneumatics," http://hydraulicspneumatics.com/other-technologies/book-2-chapter-19-rotary-actuators, May 19, 2010, 16 pgs.
Atsuo Takanishi, Biped humanoid robot group, WABIAN-2R (2006-), Copyright (C) 2009, last visited Jun. 18, 2013.
Takanishi Laboratory, Biped Humanoid Robot, Research Paper, Copyright (C) 2010, last update Nov. 17, 2010.
Moll, A Self-sealing Fiber-reinforced Composite, Journal of Composite Materials, vol. 0, No. 00/2009, © The Author(s), 2009, published Jan. 5, 2010.
Non-final Office Action for U.S. Appl. No. 13/790,801, filed Mar. 8, 2013, and mailed from the USPTO on Apr. 8, 2015, 35 pgs.

\* cited by examiner

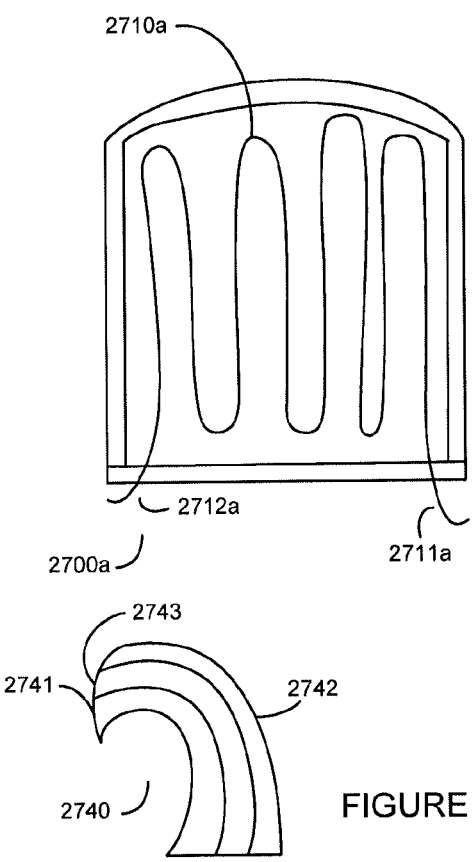
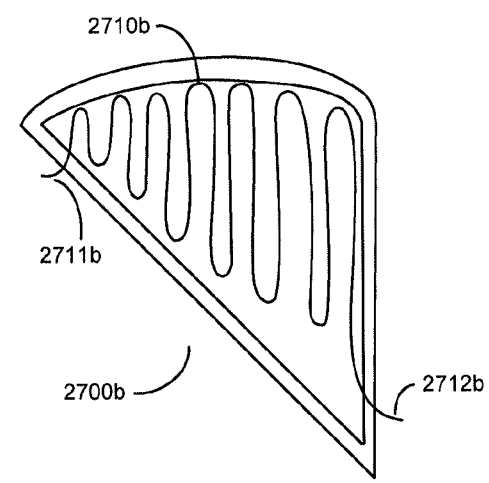
FIGURE 27A
FIGURE 27B
FIGURE 27C

ROBOT SKELETAL COMPONENTS

RELATED APPLICATIONS

This application is a continuation of U.S. patent application Ser. No. 13/790,801, filed Mar. 8, 2013 and entitled "Touch Sensitive Robotic Gripper," which claims priority to U.S. Provisional Patent Applications with Ser. Nos. 61/608,407 filed Mar. 8, 2012; 61/655,949 filed Jun. 5, 2012; 61/673,114 filed Jul. 18, 2012; 61/683,324 filed Aug. 15, 2012; 61/709,822 filed Oct. 4, 2012; and 61/767,130 filed Feb. 20, 2013, all of which are hereby incorporated by reference herein in their entirety.

TECHNICAL FIELD

This disclosure relates to skeletal components for robotic systems.

BRIEF DESCRIPTION OF THE DRAWINGS

FIGS. 24A and 24B are cross-section views of skin panels configured to power a robot, such as a robotic gripper or the like.
FIGS. 27A-27C are cross-section views of sections of the inner battery.

DETAILED DESCRIPTION OF PREFERRED EMBODIMENTS

Robotic systems have become increasingly common in automated manufacturing. Some such systems comprise what are known as end effect grippers. Robotic systems including end effect grippers often manipulate an object to a desired location. In many instances, it is critical for proper assembly or fabrication that the object be placed exactly in the desired location. However, known gripping systems are only able to accurately manipulate an object to a desired location if that object is inserted into the gripper at a precise location. This requires that the object be manually positioned and the gripper be manually closed about the object. The manual positioning and closing requires additional time and labor.

A gripping system may use sensors and one or more processors to generate a more sophisticated understanding of an object being grasped by the gripping system. The processor may include a general purpose device, such as an Intel®, AMD®, or other "off-the-shelf" microprocessor. The processor may include a special purpose processing device, such as an ASIC, SoC, SiP, FPGA, PAL, PLA, FPLA, PLD, microcontroller or other customized or programmable device. In some embodiments, the processor may be comprised of more than one general purpose device and/or special purpose device. The gripping system may also include a memory containing instructions or data. The memory may include static RAM, dynamic RAM, flash memory, ROM, CD-ROM, disk, tape, magnetic, optical, or other computer storage media. In some embodiments, the processor and/or memory may control multiple gripping systems and/or receive measurements from sensors. The gripping systems may be connected to the processor and memory by wires, a wired or wireless network, or other means of communication.

Touch Sensor

Figure 1A:
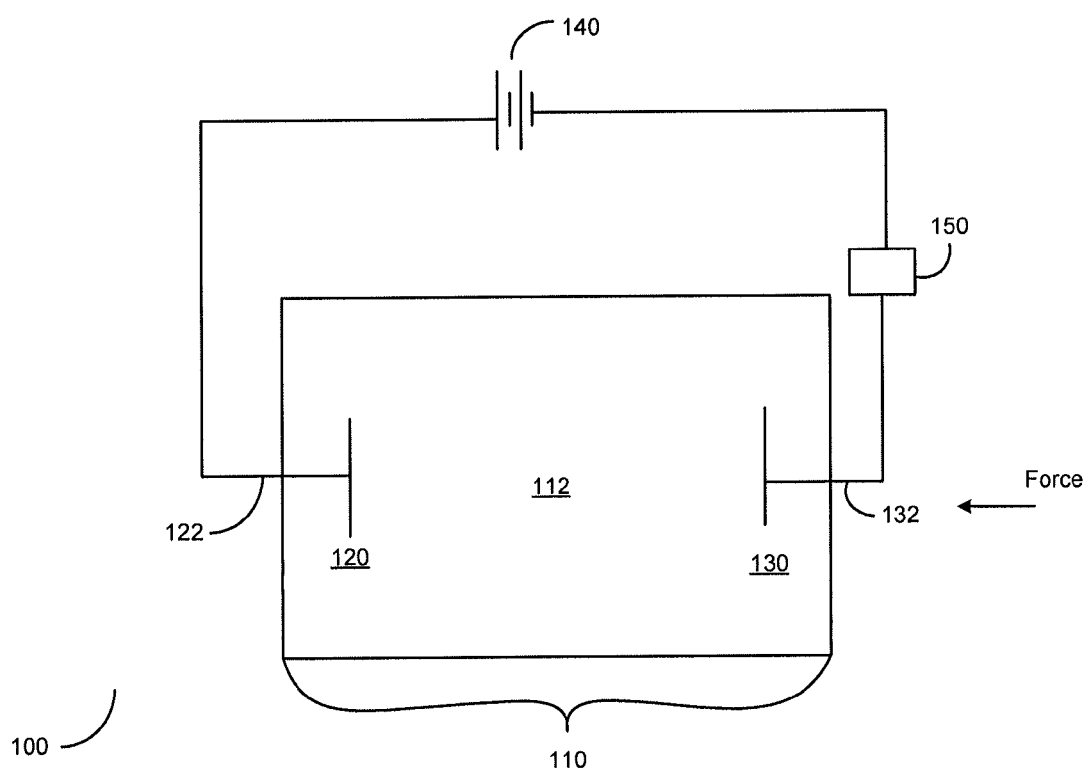
FIGS. 1A and 1B illustrate a touch sensor.

FIG. 1A illustrates a single touch sensor 100 that may be used to describe an object being grasped by a gripping system. The sensor comprises a sensing cell 110 that contains a stationary electrode 120 and a movable electrode 130. The sensing cell 110 is filled with a conductive fluid 112. The conductive fluid 112 may convey charge between the electrodes 120, 130 to prevent a potential difference between the electrodes from causing an accumulation of charge. A dielectric fluid may optionally be used instead of a conductive fluid. Dielectric and conductive fluids may be referred to as electrically operative fluids. A power source 140 is connected to the two electrodes 120, 130 to form a completed circuit through the conductive fluid.

The movable electrode 130 is capable of changing position relative to the stationary electrode 120. When an object presses against the touch sensor, the movable electrode 130 will be pushed towards the stationary electrode 120. As the movable electrode changes position, the resistance and other properties of the circuit will change. The resistance is dependent on the distance between the electrodes 120, 130. When the distance between electrodes 120, 130 is largest, the resistance of the circuit will be at a maximum. For many conductive fluids 112, the relationship between distance and resistance will be approximately linear. Alternatively or in addition, a capacitance between the electrodes may change as the distance between the electrodes changes. An electrical property measuring device 150 may be used to measure the changes in properties of the circuit as the movable electrode 130 changes position. The measurements from the electrical property measuring device 150 may be used to determine the distance between electrodes 120, 130.

Many different types of electrical property measuring devices 150 and configurations of the circuit are possible. In the illustrated embodiment, the power source 140 is a constant voltage source and the electrical property measuring device 150 is an ammeter in the configuration illustrated. However, the touch sensor 100 could be reconfigured to have a constant current power source and a voltmeter set up in parallel with the sensing cell 110. An ohmmeter could be used as both the power source and the measuring device. A resistor or other circuit component could be placed in parallel or series with the sensing cell 110, which would allow an ammeter to be used with a constant current source or a voltmeter to be used with a constant voltage source. A voltmeter could measure the voltage drop across a series resistor to determine the electrical properties of the sensing cell. For a circuit with a changing capacitance, a capacitance meter could be used to measure the capacitance, and/or the capacitor voltage, capacitor current, and/or capacitor impedance could be measured. The power source may supply direct current or alternating current. The power source may also apply power at regular sampling intervals or have a duty cycle of less than 100%. Those of skill in the art will recognize other possible circuits that would allow an electrical property measuring device 150 to measure changes in the position of the flexible, movable electrode. Any measurement of voltage, current, or resistance can be converted to another measurement using Ohm's law of V=IR. For more complicated systems, Kirchhoff's circuit laws may also be needed to perform the conversion.

Many different kinds of conductive fluid 112 are possible including water mixed with sodium chloride, calcium chloride, or any other salt that creates an electrolyte when mixed with water; vinegar; gallium; gallium alloys; wood's metal; gallium aluminum alloy; sodium potassium alloy; and sulfuric acid. In general, the conductive fluid 112 may comprise any salt, acid, and/or base. Non-toxic antifreeze, such as propylene glycol or glycerol, and/or toxic antifreeze, such as ethylene glycol may be added to water-based conductive fluids. Many conductive fluids are commercially available including: Indium Corporation's Gallium Alloy 46L with a melting point of 7.6 degrees Celsius; Rotometal's Gallinstan with a melting point of −19 degrees Celsius. These metals become liquid at warm temperatures and offer high conductivity. Potassium chloride is available commercially from sources, such as Cole-Parmer KCL 3M with saturated AgCl. The choice of conductive fluid 112 may depend on the cost, safety, and precision desired. Gallium alloys and sodium potassium alloy may be expensive. Sodium potassium alloy reacts violently with air when heated, but then forms an oxide coating that inhibits further reaction. Gallium aluminum alloy reacts violently with water releasing hydrogen gas and does not have any inhibiting activity. Additionally, the choice of conductive fluid 112 will affect the requirements of the power source 140 and electrical property measuring device 150. A highly conductive fluid may consume more energy unless a low voltage source 140 is used. A more resistive fluid may consume more energy when a constant current source is used. A more sensitive electrical property measuring device 150 may also be required for more highly conductive fluids.

The electrodes 120, 130 comprise flat plates in the illustrated embodiment. Wires 122, 132 connect the flat plates with the power source 140 and electrical property measuring device 150. The electrodes 120, 130 may be made of conductive material such as copper, silver, aluminum, or any other conductive material known in the art. The size of the electrodes 120, 130 will depend on the size and geography of the object to be grasped by the gripping system. For very small or complicated objects, the flat plates may have a surface area on the order of $10^{-4}$ square inches.

Figure 1B:
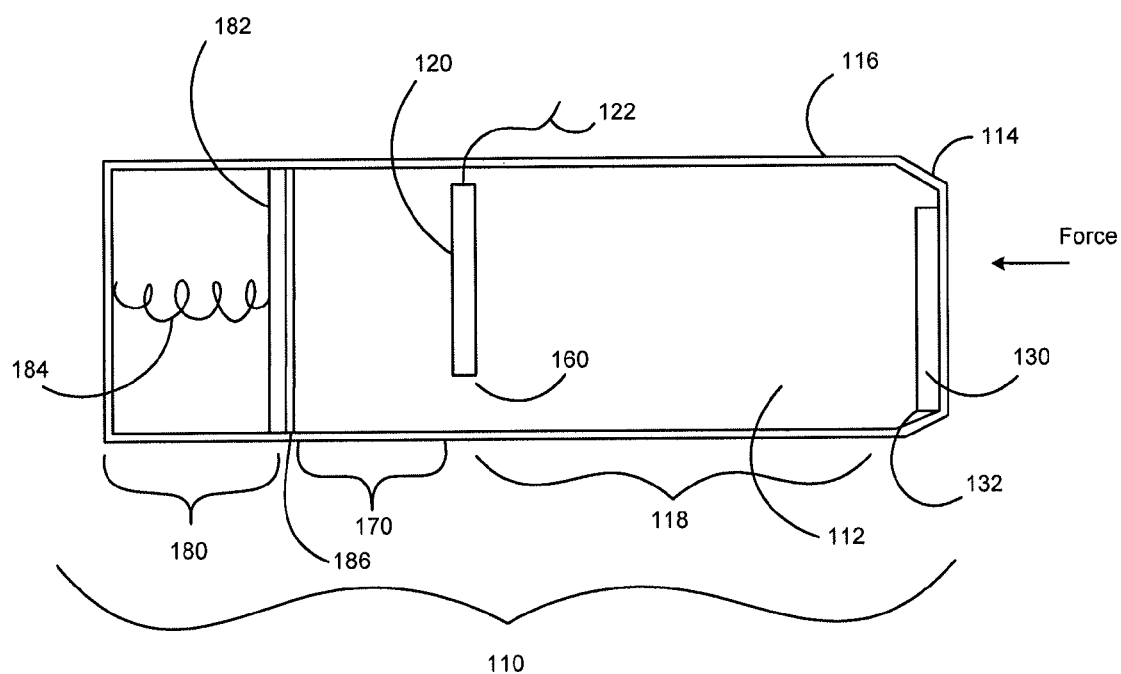

FIG. 1B illustrates the structure of the sensing cell 110 in more detail. The movable electrode 130 is attached to a flexible silicon wall 114. The remainder of the sensing cell wall 116 is made from a thermoset or thermoplastic, a flexible wire cable, an elastomer, such as silicon rubber, or the like. The stationary electrode 120 further comprises a baffle 160 that allows the conductive fluid 112 (or a dielectric fluid) to escape into reservoir 170 as the movable electrode 130 is compressed towards the stationary electrode 120. A pressure controller 180 may allow the conductive fluid 112 to escape into the reservoir 170 when the movable electrode 130 is compressed. The pressure controller 180 forces the conductive fluid 112 back into the sensing chamber 118 when the movable electrode 130 is no longer compressed. The conductive fluid 112 may be incompressible to prevent compression of the movable electrode from changing electrical properties of the conductive fluid.

In this embodiment, the pressure controller 180 may comprise a metal plate 182 and a mechanical spring 184 that applies pressure to the metal plate 182 in accordance with Hooke's law. A silicon layer 186 may be affixed to the metal plate 182. Alternatively, the silicon layer 186 may act as a mechanical spring without the metal plate 182. The silicon layer 186 may seal the back end of the reservoir 170 from possible leaks or loss of conductive fluid 112. In other embodiments, a hydraulic or pneumatic spring may be used in place of the mechanical spring 184. The mechanical spring may be a simple elastomer spring effect, a fluid flow controlled by a pressure regulator, or the like. The pressure controller 180 may also comprise a pressure measuring device and/or pressure regulating device that determines the pressure of the conductive fluid 112. The pressure measuring device may measure the movement of the metal plate 182 and/or the silicon layer 186, or the pressure measuring device may use other methods known in the art to determine the pressure of the conductive fluid 112. The pressure controller 180 may comprise a piezoresistive pressure transducer (not shown) in contact with the metal plate 182, the silicon layer 186, and/or the flexible walls 114. The piezoresistive pressure transducer may be attached to the metal plate 182 and in contact with the silicon layer 186. The piezoresistive sensor may be used to measure shear forces on the cell. In some embodiments, the pressure may be determined by measuring the in-line pressure of the hydraulic system.

Materials besides silicon may be used for the flexible wall 114 in other embodiments. The flexible wall may conform to the structure of the object being grasped and may be nonconductive. Suitable materials may include latex, plastics, natural and synthetic rubbers, and silicones. Because the flexible wall 114 will be used to grasp the object, the material for the flexible wall 114 may be selected to have a high coefficient of friction with the object intended to be grasped. In some embodiments, it may also be desirable that the movable electrode 130 be flexible as well. In those embodiments, the movable electrode may comprise conductive polymers, such as conductive or doped silicon or fluorosilicone. Alternatively, metal electrodes may be used where the metal electrode is thin enough to flex, or the metal electrode has a small enough surface area to contour to the surface of the object being gripped.

Sensor Array

Figure 2:
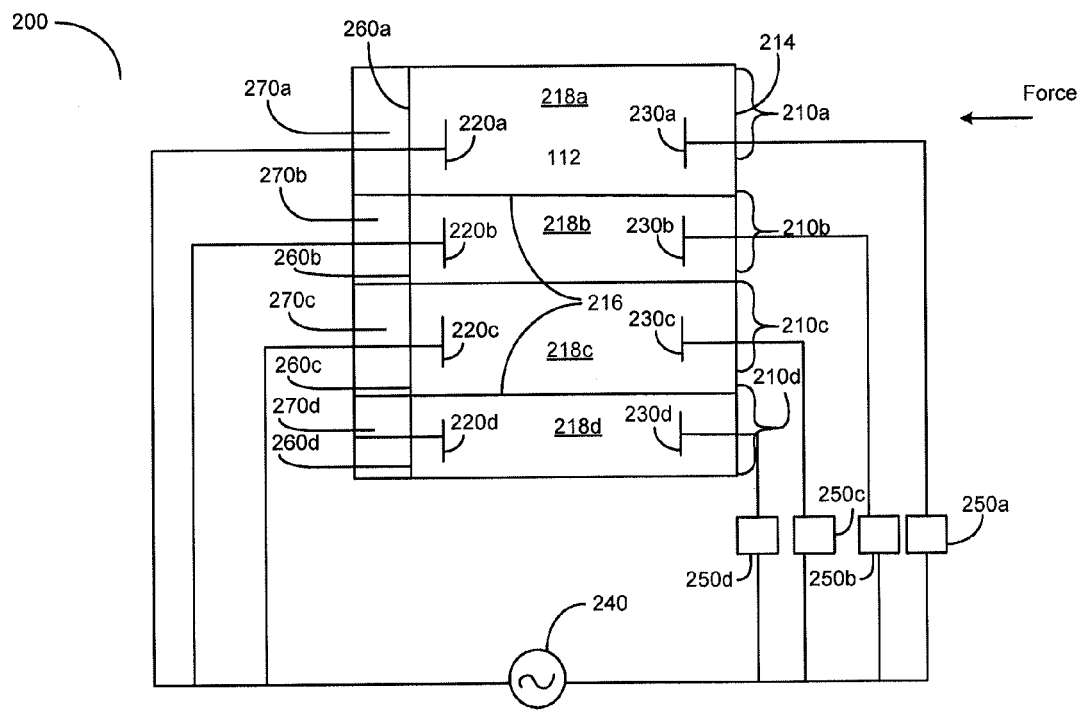
FIG. 2 illustrates an array of touch sensing cells.

FIG. 2 illustrates an array of sensing cells 200 that may be used to measure the different areas of an object pressing the individual sensing cells 210$a,b,c,d$. Each sensing cell 210$a,b,c,d$ in the array is connected to its own electrical property measuring device 250$a,b,c,d$. The illustrated array 200 will produce a two dimensional set of measurements of the object touching the array 200. The array 200 can detect the length of the object and the length of various components of the object and the depth of the object and the depth of various components of the object. By stacking additional sensor cells on top of or below the array 200 (into or out of the figure), an array could be created that will create a three dimensional set of measurements of the object. The width of the object and the width of various components of the object may be detected in this configuration. Whether an array sensing two dimensions or three dimensions is used will depend on the application of the gripper. Also, depending on the sensing needs, the array may contain very few sensors or may contain many thousands of sensors.

Each sensing cell 210$a,b,c,d$ comprises a baffle 260$a,b,c,d$ and a reservoir 270$a,b,c,d$. As shown in this embodiment, the stationary electrodes 220$a,b,c,d$ may be separate from the baffles 260$a,b,c,d$. The movable electrodes 230$a,b,c,d$ may be attached to a flexible wall 214. In this embodiment, the sensing cells 210$a,b,c,d$ are separated from each other by the thermoset, thermoplastic, or elastomer walls 216. In other embodiments, conductive fluid 112 may be allowed to flow between reservoirs 270$a,b,c,d$ or a common reservoir may be shared by all the sensing cells 210$a,b,c,d$. Additionally, embodiments may have sensing chambers 218$a,b,c,d$ not separated by the thermoset or thermoplastic walls 216. However, this may create cross conductivity between movable electrodes 230$a,b,c,d$ and stationary electrodes 220$a,b,c,d$ in different sensing cells 210$a,b,c,d$. In some embodiments, a single plate may comprise the stationary electrodes 220$a,b,c,d$ or the stationary electrodes 220$a,b,c,d$ may be electrically coupled with one another. In these embodiments, the electrical property measuring devices 250$a,b,c,d$ and circuits may be configured to measure an electrical property of a single movable electrode 230$a,b,c,d$. For example, ammeters may be placed between the power source 240 and the movable electrodes 230$a,b,c,d$ rather than between the stationary electrodes 220$a,b,c,d$ and the power source 240.

Grippers

Figure 3:
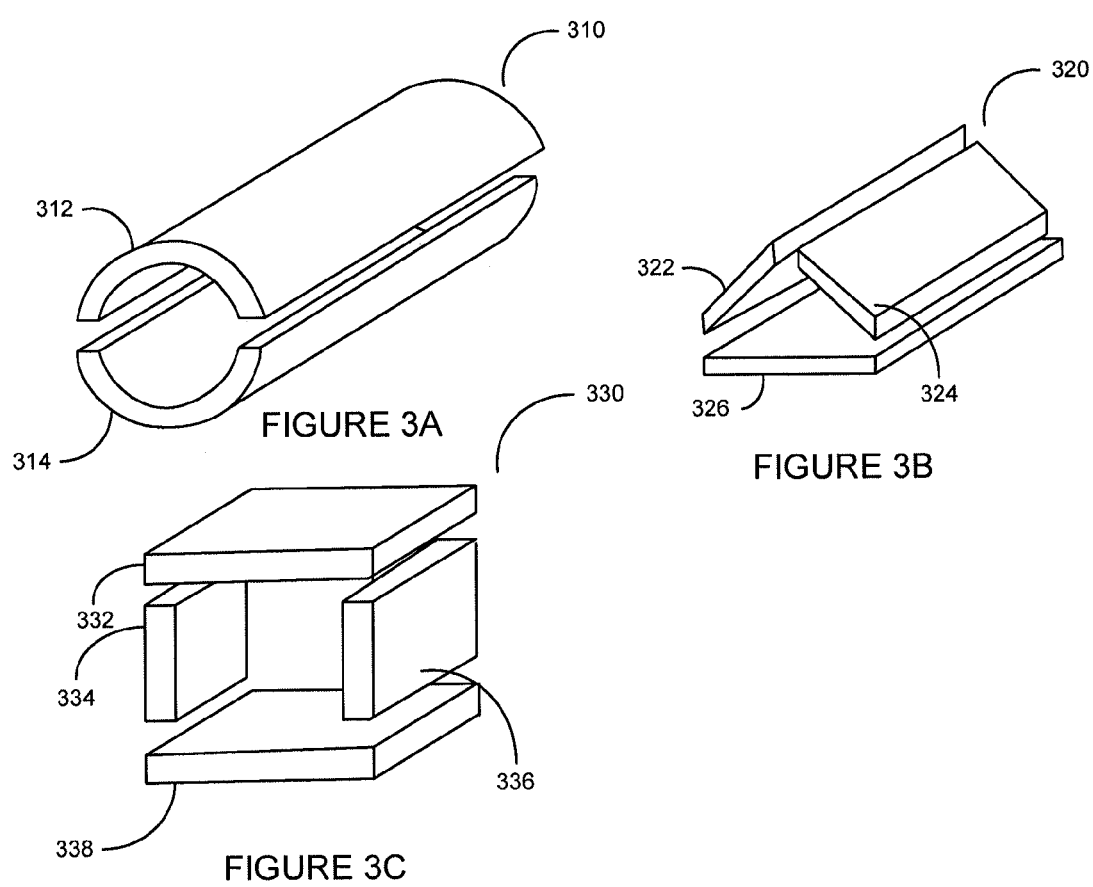
FIGS. 3A-3C illustrate embodiments of grippers.

FIGS. 3A, 3B, and 3C illustrate various embodiments of grippers that may comprise sensor arrays 200. Grippers may have two 310, three 320, or four 330 gripping members. Those of skill in the art will recognize how to make grippers comprising more than four gripping members. In some embodiments, a sensor array 200 may be placed on the inside, outside, or both inside and outside of a preexisting gripping member depending on the gripper's function. For those grippers meant to grasp the outside of an object, the sensor arrays 200 may be placed on the inside of the gripping members. For those grippers meant to grasp an object from the inside, for example grabbing a container or bottle from the inside, the sensor arrays 200 may be placed on the outside of the gripping members. In other embodiments, the gripping member is formed entirely from the sensor array 200 with the flexible wall 214 and thermoset or thermoplastic walls 216 defining the shape and structure of the gripping member. The movable electrodes 230$a,b,c,d$ are located on the side of the gripping member that is meant to come in contact with the object being grasped. For gripping members that may contact objects on both sides, sensing cells 210$a,b,c,d$ may face both directions. In other embodiments, a single sensing cell may have a stationary electrode with movable electrodes on each side of it.

For a gripper with two gripping members 310, half-cylindrical gripping members 312, 314 may provide more contact area with the object being grasped. In other embodiments, the two gripping members may each be flat, one may be flat with the other half-cylindrical, or they may be any other shapes that would maximize contact area with the object being grasped. The shape will depend on the particular object to be grasped. A gripper with three gripping members 320 may be configured such that the gripping members 322, 324, 326 are flat and approximately form the sides of a triangle. The triangle may be equilateral, isosceles, or obtuse. For any triangle, at least two of the angles formed between the gripping members will need to be acute. The gripping members 322, 324, 326 may also be shapes other than flat depending on the object to be grasped. Similarly, a gripper with four gripping members 330 may have flat gripping members 332, 334, 336, 338 that approximately form the sides of a square. However, it 330 may also form other quadrilaterals and may have gripping members 332, 334, 336, 338 that are shapes other than flat. Those of skill in the art will recognize other shapes including three dimensional shapes, for example a hemisphere, that may be approximately formed by the configuration of a given number of gripping members. Any of the above described embodiments of gripper members, whether round, triangular, or square, can have one or more additional members (not shown) that can move perpendicular relative to the movement of the gripping members. The additional members may then move inside the square, triangular, or round shapes to measure the dimensions of the object from a third axes in order to create a more complete three-dimensional profile of the object being grasped. The additional members would enter between the two members 312, 314, three members 322, 324, 326, or four members 332, 334, 336, 338 shown in FIGS. 3A, 3B, and 3C, respectively.

The gripping members 312, 314 are designed to be moved relative to one another so that they 312, 314 may grasp an object. When the gripping members 312, 314 are closest to each other or grasping an object, the gripper 310 may be described as closed. When the gripping members 312, 314 are furthest from each other, the gripper 310 may be described as open. Actuators controlling the position of the gripping members 312, 314 may open and close the gripper 310. Also, dowel rods and guide pins may control the path of the gripping members 312, 314 to ensure that they are aligned correctly. High precision guide pins may be used when very accurate positioning is required. The actuator movement may be accomplished with pneumatic, hydraulic, or electric motors or other means known in the art. An electric motor and lead screw may be used to produce linear actuation of the gripping members 312, 314.

In addition, the gripper may be controlled by actuators that change the linear position of the gripper among a three dimensional space. Additional actuators may also allow rotation of the gripper along one or more axes. These actuators may precisely control the movement of the gripper and object being grasped to allow for high precision assembly, fabrication, insertion, manufacturing, surgery, measurement or other known uses for automated grippers.

Gripping Systems

Figure 4:
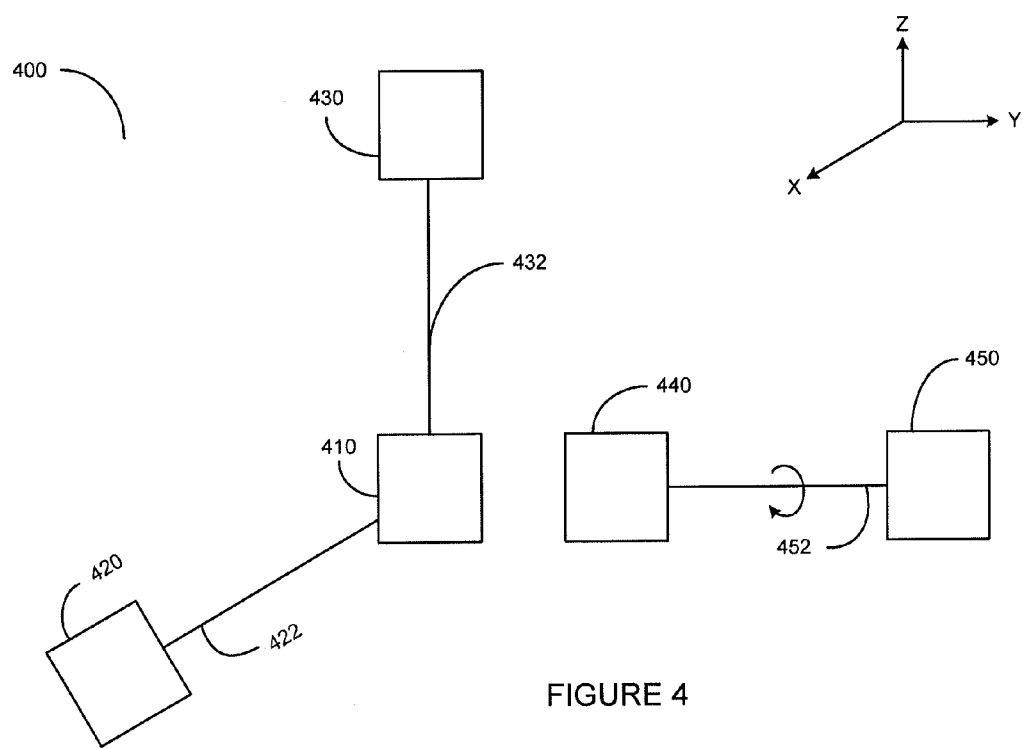
FIG. 4 illustrates a system for controlling the location and orientation of grippers.

FIG. 4 illustrates a system 400 for manipulating one or more grippers 410, 440 after at least one gripper 410 has closed on an object. Although two grippers 410, 440 are shown in this embodiment, the second gripper 440 may be replaced by other tools known in the art such as tools for drilling, milling, powder coating, assembly, or other operations. In this embodiment, the gripper 410 grasping the object may be moved along the X and Z axes. Actuators 420, 430 (e.g., servos) may use lead screws 422, 432 to control the movement of the gripper 410 along these axes.

The second gripper 440 may move only along the Y axis and may be controlled by an actuator 450 and lead screw 452. Another actuator (not shown) may also rotate the second gripper 440 about the Y axis. This may allow for an object held by the first gripper 410 to be screwed into an object held by the second gripper 440. Even though, in the illustrated embodiment, each gripper 410, 440 is only limited to movement along some axes, the grippers 410, 440 may move relative to each other along all axes. Thus, the system 400 can correct for offsets in location along the X, Y, or Z axes. In other embodiments, each gripper 410, 440 may be able to move along all the axes and rotate about all the axes. In some embodiments, the second gripper 440 is a conventional gripper and the first gripper 410 is a touch sensitive gripper. Other "off-the-shelf" robotic systems may be used that control the gripper with 4 to 6 axes of manipulation. Exemplary "off-the-shelf" systems include the Kuka AG's KR series, or manipulators, such as Fanuc Robotics Industrial Robots, may be incorporated into the gripper actuation. Robotic systems, such as the Fanuc M-1iA, may incorporate movement of a single gripper into a three motor x-y-z axis control system. An alternative control scheme may use a single hydraulic motor to control three hydraulic joints.

Figure 5:
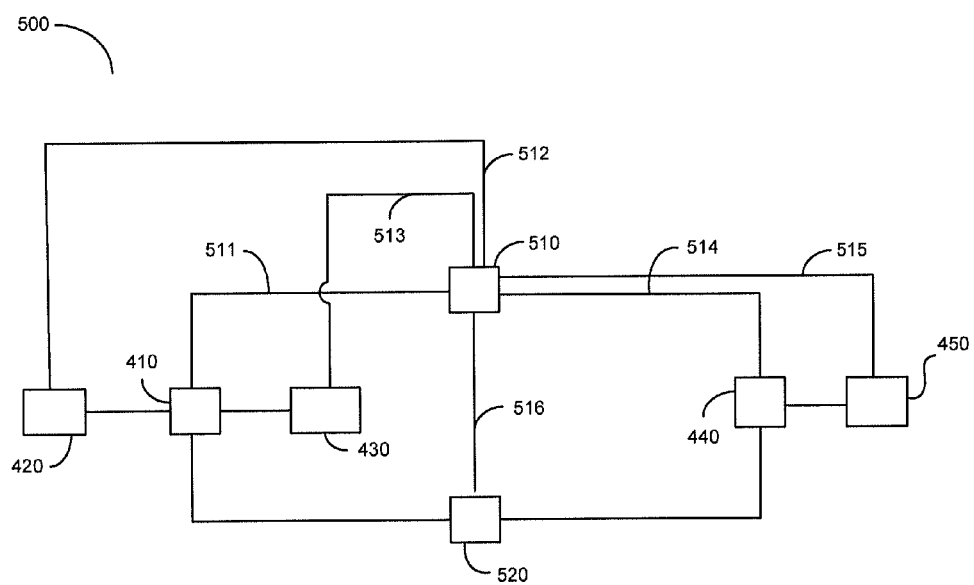
FIG. 5 illustrates a gripping system that controls the closing, location, and orientation of grippers based on information from touch sensors.

FIG. 5 illustrates a touch sensitive robotic gripping system 500 with a processor 510 for controlling the system. The gripping system 500 may be a component of a complete robotic system (not shown), which may include vision systems, proximity detection, safety shut-off, computer integration, programmable logic controllers (PLCs), LIDAR, computer geographic modeling, and/or robotic arms. The complete robotic system may be autonomous, semi-autonomous, or operator controlled. In the illustrated embodiment, a hydraulic system 520 is controlled by the processor 510 with wire 516. The hydraulic system 520 may be used to open and close the grippers 410, 440, regulate pressure on reservoirs 270 collectively or individually, regulate pressure control valves, and control direction fluid valves. The pressure and fluid control valves may be regulated using pulse width modulation. The electrical property measurements and pressure measurements may be sent from the grippers 410, 440 to the processor 510 over wires 511, 514. The processor 510 also may control the actuators 420, 430, 450 using wires 512, 513, 515, which allows the processor 510 to modify the location of the grippers 410, 440. Alternatively, the actuators 420, 430, 450 may be linear or radial hydraulic actuators and the wires 512, 513, 515 may control pressure and fluid directional valves. In other embodiments, the processor 510 may control components and receive measurements wirelessly or through other known methods of communication.

The processor 510 may receive sampled and quantized measurement data regarding the object that it is gripping from electrical property measuring devices 250$a,b,c,d$, and pressure measurement devices in each gripping member 410, 440. Shear sensors (not shown) and temperature sensor (not shown) in each gripping member 410, 440 may send measurements to the processor 510. The processor 510 may convert this sampled data into a geographic model of the object being grasped. The processor 510 may compare this model with a diagram of the object stored in a memory. Objects may be recognized by comparing geographic shapes and/or blueprints stored in the memory to measured dimensions and/or computer generated geographic shapes of grasped objects. In an embodiment, one or more neural networks may perform the comparison. Geographic shapes of objects may be stored along with operations that may be performed with these shapes. Objects may be compared to two and/or three dimensional prints and/or representations stored in the memory by design programs, such as AutoCAD. Then the processor 510 decides how to properly manipulate the object using the actuators 420, 430, 450 based on this information.

The raw measurement data may be sampled and quantized before it is transferred to the processor 510. The rate of sampling may depend on what the gripping system 500 is being used for. The raw measurement data may be sampled many thousands of times per second when the manner in which the object is grasped is important. Whereas if the orientation only needs to be determined once, the processor 510 may sample only a few times per second or once per object being grasped. The time for the processor 510 to manipulate the sampled data may also determine how often the raw measurement data is sampled. The processor may only sample the measurement data when it is has completed the previous calculation and is ready to perform another calculation. In some embodiments, the grasping of an object may cause one or more movable electrode 230 to tilt at an angle to the stationary electrodes 220. As a result, the measured distance between electrodes 220, 230 may increase as the electrodes 230 tilt. A higher sampling rate may be required in embodiments and/or configurations where tilting is possible to enable to the processor to detect and correct for tilt error. In some embodiments, the pressure measurement data and electrical property measurement data may be sampled at different rates.

The number of bits per sample (quantization) will also depend on the application of the gripper system. For more precise measurements or systems where a wide fluctuation in measurements is possible, 32, 64, or higher bit samples may be required. The quantization rate may also be limited by the sensitivity of the measuring devices 250. For less sensitive measuring devices, there may be little or no benefit to using more than 16 or 8 bits per sample. In some embodiments, the measuring devices 250 may perform the sampling and quantization as part of the measurement process. In other embodiments, the processor 510 or another component performs the sampling and quantizing. The sampled and quantized measurement data may be stored in the memory.

For the processor 510 to convert the sampled measurement data into a geographic model of an object, the processor 510 may first calibrate the measurement data to displacements. In some embodiments, the sampled electrical property measurements (e.g., voltage, capacitance, current, resistance, impedance, etc.) may be converted to displacement measurements by moving the movable electrodes 230 to a known distance so the processor can determine the value of the electrical property measurements received at that distance. A set of data points may be generated by measuring the electrical property across a series of displacements separated by known increments (e.g., separated by equidistant increments). The processor may create a linear fit for the entire set of detected calibration values or it may create a linear interpolation between each pair of detected values. In other embodiments, a non-linear function may be used to fit the detected calibration values or interpolate between detected values. A set of discrete data points, a fit for the data points, and/or one or more interpolations for the data points may be referred to as an electrical property measurement to displacement curve. Alternatively, to calibrate the gripper, a flat object or object shaped similarly to the gripping member may be slowly closed upon by the gripper. The processor 510 may use the information received from this process to map electrical property measurements to a linear distance scale with arbitrary units, and/or a distance to voltage scale may be created. Each measurement may be mapped to a discrete value. The number of steps used by the processor 510 when quantizing the electrical property measurements may depend on the distance and measurement increments. The minimum discrete increment (e.g., minimum step) may be selected to correspond to a desired displacement measurement resolution. For example, to measure a distance of 0.750 inches with an accuracy of 0.001 inches, the processor 510 may subdivide the voltage range into 750 quantized steps with each step corresponding to a 0.001-inch increment. The processor 510 may calibrate each sensor cell 210 individually, or it 510 may use an average calibration for all sensor cells 210. In some embodiments, a temperature sensor may allow the processor 510 to further calibrate for the temperature of the conductive fluid 112. The temperature sensor may be in contact with the movable electrode, stationary electrode, the chamber, a portion of the chamber near a contact surface, fluid lines, and/or fluid reservoirs to determine fluid temperature. The electrical property measurement to displacement curve may take temperature as an input and output a temperature-corrected displacement. Alternatively, or in addition, the processor 510 may be configured to make predetermined corrections to the electrical property measurement to displacement curve based on temperature variations from a calibrated temperature, and/or calibration may include determining a plurality of electrical property measurement to displacement curves for different temperatures. The temperature measurements may be used to adjust the electrical property measurements input to the electrical property measurement to displacement curve and/or to adjust the displacement computed from the electrical property measurement to displacement curve.

A diagram of the object to be grasped may be stored in a memory accessible by the processor 510. The diagram may be created by an AutoCAD design program. An object may be stored in the memory in multiple ways. Measurements or other data about the size and shape of the object may be directly loaded into the memory by a user or another computer system. Alternatively, the gripper 410 may be manually closed on the object one or more times with the object set at a different predefined orientation each time. Further, if the gripper 410 and/or pressure controller 180 is controlled using hydraulic or pneumatic means, the pressure exerted by the gripper 410 and/or the pressure of the conductive fluid 112 may be adjusted manually. The processor 510 then generates a diagram of the object based on the measurements from the sensor array 200. The diagram may then be stored in the memory by the processor 510.

Once the processor 510 has been calibrated and a diagram and/or shape has been stored in the memory, the gripping system 500 may start manipulating objects. Objects may be fed to the gripper 410 with a vibrating hopper machine, conveyor belt, or other means known in the art. An optical, vision, and/or acoustic system may detect the location of the object to be grasped. The object may also or instead trigger a microswitch alerting the gripping system 500 to the presence of the object. The processor 510 may then move the gripper 410 to the expected location of the object and attempt to grasp the object. Once the gripper is in the proper location, the processor 510 may close the gripper 410 on the object. If the object is fragile or only a limited pressure may be applied to the object, the processor 510 may monitor pressure measurements and/or electrical property measurements to determine how far to close the gripper 410 on the object. The processor 510 may also monitor the electrical property measurement data received from individual sensing cells 210 in some embodiments. If the electrodes 220, 230 are too close or touching, a sensing cell may draw too much current and damage or drain the power source 240. The processor stops closing the gripper 410 if the electrodes 220, 230 of any sensing cell 210 are too close. In other embodiments, the circuit may be designed to prevent too much current draw or a porous insulating material may be placed in the sensing cell 210 that allows the conductive fluid 112 to flow but prevents the electrodes 220, 230 from touching.

When the object is grasped, it is in an unknown position and orientation. The processor 510 then uses the data from the electrical property measuring device to create a geographic model of the object. In some embodiments, the processor 510 may create several geographic models of the object as it is being grasped. In other embodiments, the processor 510 may create only a single geographic model of the object once the gripper 410 has finished closing on the object. The processor 510 may create the geographic model by converting the sampled data into displacements, detecting edges and boundaries between wider and thinner portions of the object, placing sampled data directly into an array, or using any other known means to describe an object. The type of geographic model generated by the processor 510 may depend on the type of diagram saved in the memory. The geographic model may be defined in a manner that simplifies comparison with the diagram saved in the memory.

Various methods may be used to compare the diagram in the memory with the geographic model of the object generated by the processor 510 to determine the orientation and position of the object. If the model comprises edges and boundaries, the processor 510 may try to align those edges and boundaries with diagram features. For distances, the processor 510 may try to match those distances with anticipated or measured distances in the diagram. To find a match, the processor 510 may attempt to minimize the mean square error between the geographic model and the diagram; it 510 may attempt to minimize the maximum error between any point in the geographic model and the corresponding point in the diagram; or it 510 may use any other method known in the art of minimizing error. In some embodiments, the processor 510 will determine that a match could not be found if the error cannot be reduced below a certain threshold or confidence level. The processor 510 may attempt to drop the object and grasp it again or send a signal to a human operator if a match is not found.

If a way to match the model to the diagram is found, the processor 510 then determines the manipulations required to make the geographic model match a desired orientation and location stored in the memory. In some embodiments, the diagram comprises the desired orientation and location. In other embodiments, the desired orientation and location are stored separately. The object may not be centered in the gripper, so the processor 510 will need to compensate for the offset of the object. The object may also be rotated along one or more axes relative to the diagram. The processor 510 may then rotate the grippers 410, 440 and move the grippers 410, 440 laterally until the object is in the proper position using the actuators 420, 430, 450.

In some embodiments, a touch sensitive gripper may place the object in a conventional gripper that requires precise placement of the object. In other embodiments, the corrections may occur during the normal movement of the grippers 410, 440, if the grippers 410, 440 are required to move the object as part of the grippers' 410, 440 function. In some embodiments, the processor 510 may be trained as to the proper orientation and location for the object as well as the proper movement of the object through manual movement of the grippers 410, 440 and actuators 420, 430, 450. The processor 510 then saves this information to the memory. In some of these embodiments, the processor 510 may exactly follow the movements taught to it. In other embodiments, the processor 510 may be instructed to save one or a few locations and orientations and it uses the most efficient movement to progress to each location and orientation. In still other embodiments, the processor 510 may perform an activity such as screwing a bolt or moving in a sawing motion once it reaches a desired location and orientation. Once the activity is complete, the processor 510 may repeat the process again. Each repetition may be referred to as a cycle. The processor 510 may be programmed to perform a predetermined number of cycles.

Diagrams of several different types of objects may be stored in the memory at a single time. The processor 510 may attempt to match an object being grasped against all the diagrams in the memory. The processor 510 may be programmed using computer code in the memory to perform different functions based on the object detected. The processor 510 may be instructed to assemble different objects held in different grippers 410, 440 together. In an embodiment, the processor 510 sorts objects into different locations based on the type of object detected. In other embodiments, the processor 510 may be designed to cycle through a series of different tasks for the same object. In the manufacturing context, grippers 410, 440 may have multiple locations to insert bolts and/or to fabricate, weld, and/or assemble components. The processor 510 may have the grippers 410, 440 insert a bolt into, or perform another manufacturing operation at, each location before beginning again at the first location. The processor 510 may attempt to find a correct part by having the grippers 410, 440 grasp multiple objects and release those that do not match the desired object. The processor 510 may move the grippers 410, 440 randomly or systematically after it releases an incorrect object and attempts to find a new object. Common sensors, such as piezoresistive, capacitive proximity, inductive, optical, infrared, ultrasonic, laser, or Merkel tactile cells, may assist in sensing the object and/or in the manufacturing operation. Additional sensors may be located on or off the grippers.

Sensor Cell Comprising a Piston

Figure 6A:
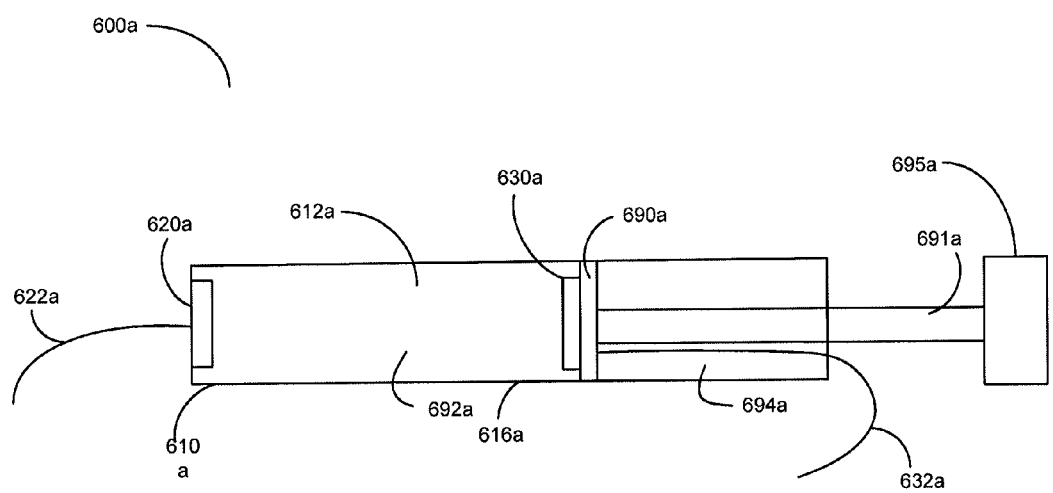
FIGS. 6A and 6B are cross-section and side views of a touch sensor comprising a sensor cell comprising a piston assembly.
Figure 6B:
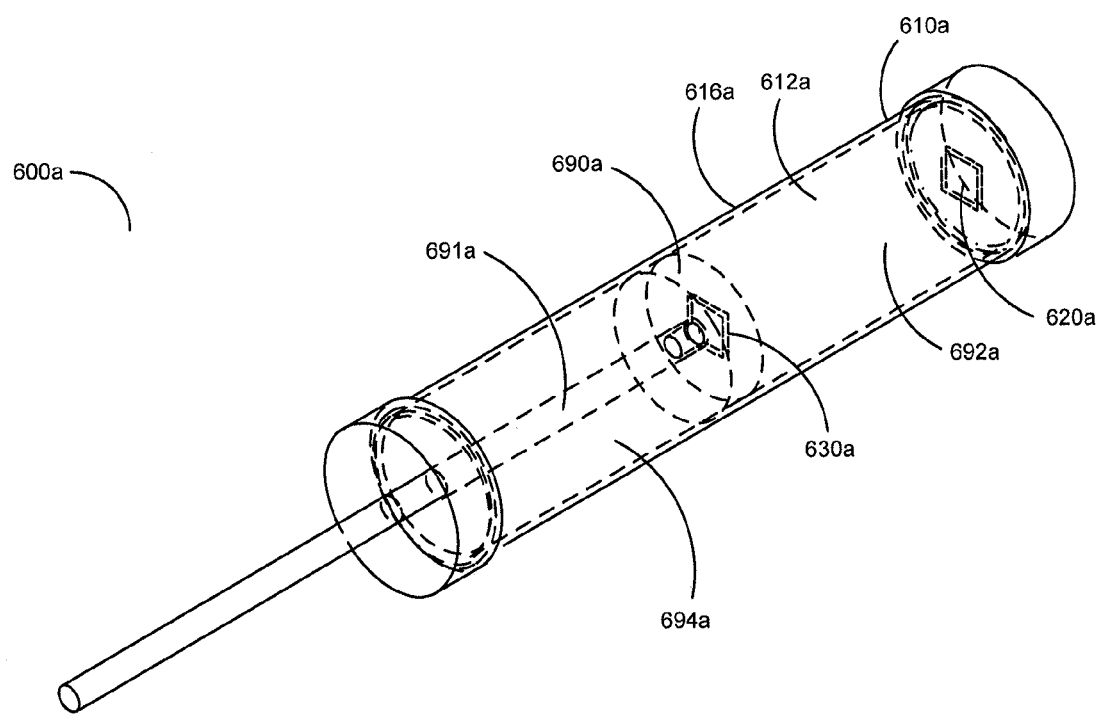

FIGS. 6A and 6B are cross-section and side views of a touch sensor 600*a* comprising a sensor cell 610*a* that uses a piston assembly. The piston assembly comprises a piston rod 691*a*, which is affixed to a piston 690*a* and a contact head 695*a* that contacts an object of interest. The sensor cell comprises two chambers: a piston extension chamber 692*a* and a piston retraction chamber 694*a*. In the illustrated embodiment, each chamber 692*a*, 694*a* contains a conductive fluid 612*a* that can be added to or removed from the chamber 692*a*, 694*a* via one or more reservoirs (not shown) and pumps (not shown). Alternatively, a dielectric fluid may be used. The pumps (not shown) extend or retract the piston 690*a* by adding or removing fluid. In other embodiments, one chamber may comprise a fluid, while the other does not and/or there may be only one pump, and/or a bidirectional valve may or may not be used. A positive displacement pump may be used to increase the precision of the movement. A positive displacement pump may be able to move a fixed amount of fluid that corresponds to a linear displacement of a piston in a single and/or multiple hydraulic cylinders.

The sensor cell 610*a* may further comprise a stationary electrode 620*a* at a proximal end of the sensor cell 610*a* and a movable electrode 630*a*. The movable electrode 630*a* may be affixed to the piston 690*a*. This configuration may allow the electrodes 620*a*, 630*a* to measure the distance moved by the piston 690*a* during extension or retraction. Both electrodes 620*a*, 630*a* are in the extension chamber 692*a* in the illustrated embodiment, but they could also or instead be placed in the retraction chamber 694*a* in other embodiments. Both electrodes 620*a*, 630*a* may be insert molded into the end cap and piston, respectively, to prevent leaking through the lead wires of the electrodes.

The illustrated electrodes 620*a*, 630*a* are flat plates. The electrodes 620*a*, 630*a* may be made of conductive material such as copper, silver, gold, aluminum, silver chloride, tungsten, tantalum, columbium, titanium, molybdenum, gallium, conductive ink, or the like. The conductive fluid 612a may comprise a salt, such as sodium chloride, calcium chloride, potassium chloride, or the like, dissolved in water; vinegar; gallium; wood's metal; gallium alloys, such as gallium aluminum alloy or eutectic gallium-indium alloy; sodium potassium alloy; or sulfuric acid. Non-toxic antifreeze, such as propylene glycol or glycerol, and/or toxic antifreeze, such as ethylene glycol may be added to water-based conductive fluids. The conductive fluid 612a may also comprise a material similar to the electrodes 620a, 630a to prevent leaching. For example, the conductive fluid 612a may be potassium chloride saturated with silver chloride for silver or silver chloride electrodes 620a, 630a. Some very corrosive conductive fluids 612a, such as gallium-indium alloy or other liquid metals, may dissolve most metals. The electrodes 620a, 630a may comprise a material with a high resistance to corrosion, such as tungsten or tantalum, or a material resistant to corrosion, such as columbium, titanium, or molybdenum, in those embodiments. In some embodiments, fluid in the chamber 692a, 694a not containing electrodes 620a, 630a will be non-conductive. In other embodiments, both chambers 692a, 694a will share a common reservoir containing the conductive fluid 612a. As before, the electrodes 620a, 630a may be powered by alternating or direct current.

The walls 616a, piston 690a, and piston rod 691a may be made from a nonconductive material such as polycarbonate, other hard polymers, or the like. In some embodiments, the walls 616a may be a conductive material, such as titanium, steel, aluminum, or the like, covered with a layer of nonconductive material or a sleeve of nonconductive material to insulate them from the electrodes 620a, 630a. Because materials like silver chloride decompose when exposed to ultraviolet (UV) or other specific frequencies of light, the walls 616a may comprise a material that blocks UV light or light of other specific frequencies. For corrosive conductive fluids 612a, the walls 616a may be selected to be a polymer or a metal that is resistant to corrosion.

Additionally, the walls 616a may be selected to be a material resistant to damage from external elements. This may allow the sensor cell 610a to come in contact with hazardous materials. The sensor cell 610a may even be inserted into oil filled cylinders such as are used in the construction equipment industry for bulldozers and the like. The sensor cell 610a can range in size from very small, such as nanofabricated sensor cells, to very large, such as multiple meters in width or length or larger, depending on the selected application.

In the illustrated embodiment, wires 622a, 632a are coupled to the electrodes 620a, 630a, and the wire 632a passes through the retraction chamber 694a and out of the distal end of the sensor cell 600a. In other embodiments, the wire 632a passes through the extension chamber 692a and the proximal end of the sensor cell 600a. In embodiments where parts of the piston 690a, piston rod 691a, and walls 616a are conductive, these elements may act as a portion of the wire 632a. The wire 632a of the movable electrode 630a may run through the center of the piston 690a to make an external connection.

The wires 622a, 632a may be powered by a power source (not shown) and connected to an electrical property measuring device (not shown) like in touch sensor 100. The electrical property measuring device measures electrical characteristics corresponding to the distance the piston 690a is extended and may comprise a current shunt, a Wheatstone bridge, or the like. The touch sensor 600a may comprise additional measuring devices, such as a piezoresistive pressure sensor (not shown) and/or a polyvinyl idene fluoride (PVDF) film sensor (not shown). The piezoresistive pressure sensor may be placed in one or both chambers 692a, 694a or in the reservoir to determine the pressure of the conductive fluid 612a. The PVDF film sensor may be affixed to the contact head 695a. The PVDF film sensor may be used to measure contact with an object of interest or vibrations of the object, such as when the object is moving tangentially to the contact head 695a. The PVDF film sensor may also be used as a shear sensor to detect movement of the object tangential to the contact head 695a. A common contact surface may be a continuous sheet shared by a plurality of sensor cells 600a. For example, the common contact surface may comprise a skin covering the plurality of sensor cells 600a to prevent contaminants from entering between cells 600a. Accordingly, a PVDF film sensor, such as a shear sensor, may be a small portion of the overall contact area of the contact surface.

The touch sensor 600a may be controlled by a processor (not shown) and/or computer software stored in a memory (not shown). The processor may also be coupled to an output device (not shown), such as a digital read out, monitor, speaker, printer, or the like, and an input device (not shown), such as a mouse, keyboard, touch screen, microphone, or the like, to allow an operator to control the touch sensor 600a. Alternatively, the computer software may be configured to autonomously control movement of the touch sensor 600a. The processor may control a pump (not shown) to add or remove fluid 612a to the extension and/or retraction chambers 692a, 694a. The pump may be a positive displacement pump configured to trap a fixed volume of fluid and discharging the fixed volume from an outlet. The positive displacement pump may allow the piston 690a to be moved in fixed and/or measurable increments. The pump may comprise plastic and/or a non-conductive material to insulate the pump from the conductive fluid 612a.

Figure 6C:
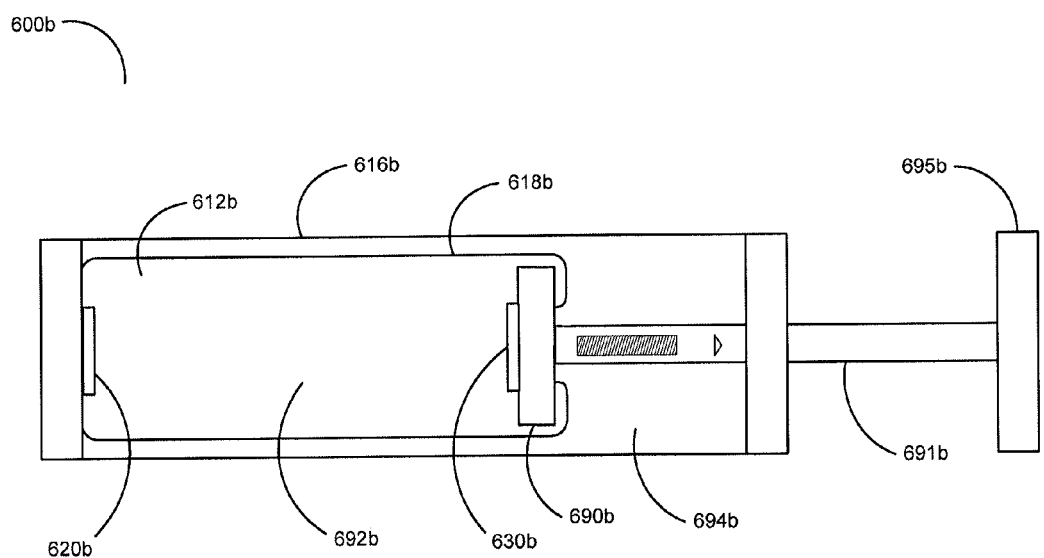
FIG. 6C is a cross-section view of a touch sensor comprising a sensor cell including a bladder and a piston assembly.

FIG. 6C is a cross-section view of a touch sensor 600b comprising a bladder 618b and a piston assembly. Like the touch sensor 600a without a bladder, the touch sensor 600b may include stationary and movable electrodes 620b, 630b; extension and retraction chambers 692b, 694b; a piston rod 691b, a piston head 690b, and a contact head 695b; conductive fluid 612b; and cell walls 616b. The cell walls 616b may define a cylinder-shaped cavity. Wires (not shown) may be insert injection molded into the cell walls 616b, the piston head 690b, and/or the piston rod 691b.

A bladder 618b may enclose the extension chamber 692b to prevent the conductive fluid 612b from leaking. The retraction chamber 694b may contain a gas and not a liquid. In an embodiment, the extension and/or retraction chambers 692b, 694b may each include a bladder 618b and/or bellows. Alternatively, a single bladder and/or bellows may enclose the extension and retraction chambers 692b, 694b and may be attached to both sides of the piston 690b. Smaller sensor cells may be particularly prone to leaking if bladders and/or bellows are not included. The bladder 618b and/or bellows may be an insulating sleeve to insulate cell walls 616b from the conductive fluid 612b. The bladder 618b and/or bellows may comprise surgical rubber. The bladder 618b and/or bellows may be configured to fold inside itself and around the piston 690b and/or to roll up as it is compressed. The bladder 618b may completely seal the fluid 612b without the use of O-rings and may eliminate the possibility of leaking under normal circumstances.

There are many ways to move the movable electrode relative to the stationary electrode while changing the volume of electrically operative fluid separating them. Sensor cells 610a with pistons and sensor cells 110 without pistons are exemplary embodiments that are not intended to be restrictive. Variations on these embodiments and/or embodiments that have not been explicitly are also contemplated. For example, a stationary electrode may be affixed to a piston, and a movable electrode may be affixed to a housing configured to interact with an object.

Sensor Array Comprising Parallel and Series Sensor Cells

Figure 7:
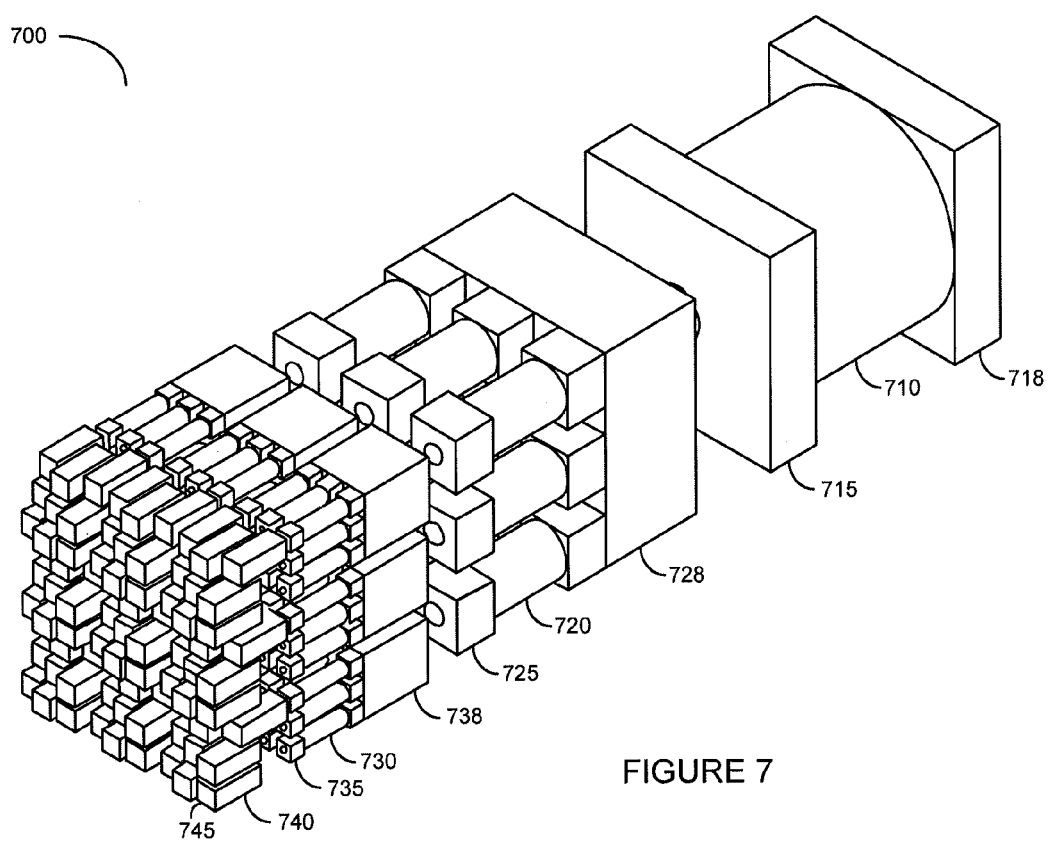
FIG. 7 is a side view of a touch sensor comprising a plurality of piston sensor cells arranged in parallel and series with one another.

FIG. 7 is a side view of a touch sensor 700 comprising a plurality of layers of sensor cells 710, 720, 730, 740 arranged in parallel and series with one another. Some of the illustrated layers of sensor cells 710, 720, 730 comprise pistons (not shown) and operate in the manner of sensor cell 610a. Other layers of sensor cells 740 may comprise an array of sensor cells with flexible walls, such as sensor cell 110 and 200. In alternate embodiments, only sensor cells 110, only sensor cells 610, or a different combination of the two may be used instead. A first sensor cell 710 is disposed at the proximal end of the sensor 700 and is the largest of the plurality of sensor cells 710, 720, 730, 740. In the illustrated embodiment, the largest sensor is 1 inch by 1 inch. In other embodiments, it may be larger or smaller based on the particular application. A plurality of medium sized sensor cells 720 may be in series with the largest sensor cell 710; a plurality of small sized sensor cells 730 may be in series with the medium sensor cells 720; and a plurality of the final layer of contact sensor cells 740 may be in series with the small sensor cells 730. The final layer of contact sensor cells 740 may be configured to grasp, contact, and/or interact with an object. The final, small, and medium sensor cells 740, 730, 720 may be disposed on the contact heads of the small sensor cells 730, medium sensor cells 720, and largest sensor cell 710 respectively. One of the sensor cells 740 in the final layer may be considered to be mechanically in series with any sensors cells 710, 720, 730 in previous layers that can adjust the position of the one in the final layer. Sensor cells 710, 720, 730, 740 may be considered to be mechanically in parallel if neither one's movement affects the other's position and/or if the sensor cells 710, 720, 730, 740 are in the same layer.

In the illustrated embodiment, there are nine small sensor cells 730 per medium sensor cell 720 and nine medium sensor cells 720 per large sensor cell 710, which gives a nine-to-one ratio of sensor cells between levels. As a result, the medium sensor cells 720 may be approximately 0.3 inches by 0.3 inches and the small sensor cells 730 may be approximately 0.1 inches by 0.1 inches. In other embodiments, the ratio may be larger or smaller than nine-to-one, or the large-to-medium ratio may not be the same as the medium-to-small ratio. The final sensor cells 740 may have a one-to-one ratio with the small sensor cells 730. In other embodiments, this ratio may be larger or smaller. As can be seen in the illustrated embodiment, ratios of sensor cells from one layer to the next may vary across layers. Alternatively, the ratio may be constant across all layers. Although four layers of sensor cells 710, 720, 730, 740 in series are illustrated, a greater or fewer number of layers in series may be used in other embodiments. There are also many possible shapes for the contact heads 715, 725, 735, 745 of the sensor cells such as square, circular, triangular, hexagonal, or the like. By stacking the piston sensor cells 710, 720, 730, a travel length of the piston in each sensor cell 710, 720, 730 can be reduced. For example, the largest sensor cell 710 may have a travel length of 0.5 inches, the medium sensor cells 720 may each have a travel length of 0.25 inches, and the smallest sensor cells 730 may each have a travel length of 0.125 inches. This allows for a total travel length of 0.875 inches without requiring a large travel length for the smallest sensors 730. In the illustrated embodiment, the total length of the three layers 710, 720, 730 is 2 inches.

The large number of sensor cells 710, 720, 730, 740 can result in a significant number of wires (not shown) for measurement and control of each sensor cell and a significant number of electrical property measuring devices (not shown). The number of wires and electrical property measuring devices may be reduced by multiplexing together the signals on the wires from the sensor cells 710, 720, 730, 740. The signals may be time division multiplexed in a fixed order, or a processor may control the multiplexing. The multiplexing may be performed using integrated circuits or by mechanical means. For integrated circuits, chips may be placed on the bases 718, 728, 738 of each layer of the piston sensor cells 710, 720, 730. The final layer of contact sensor cells 740 may include an integrated circuit inside the contact sensor cells 740 for multiplexing. In some embodiments, only some layers or sensor cells 710, 720, 730, 740 are multiplexed. One or more amplifiers may be used before or after the multiplexers to create greater precision and to mitigate noise. Amplifiers may also be necessary for low resistance conductive fluids, such as gallium alloys. Additionally, one or more analog-to-digital converters (ADC) may be used before or after multiplexing the signals from measurement wires to sample and quantize the signals. Analog or digital demultiplexing may be used in various embodiments to separate the signals. The touch sensor 700 may be a modular design that can be stacked in length and/or height. The touch sensor 700 may be affixed into gripper jaws or fingers in any configuration to enable a flexible design to grasp various sized and shaped objects. The touch sensor 700 may be designed with a single flexible skin on the final sensor layer 740. A plurality of touch sensor 700 may be stacked as complete units with each module having a separate skin covering the final sensor layer 740. The touch sensor 700 may be designed with thin walls and may be closely stacked to prevent contaminants from entering between the modules and to reduce the area that is not measuring the object geography. The total thickness separating individual cells may be 0.020 inches or less including the walls.

Figure 8A:
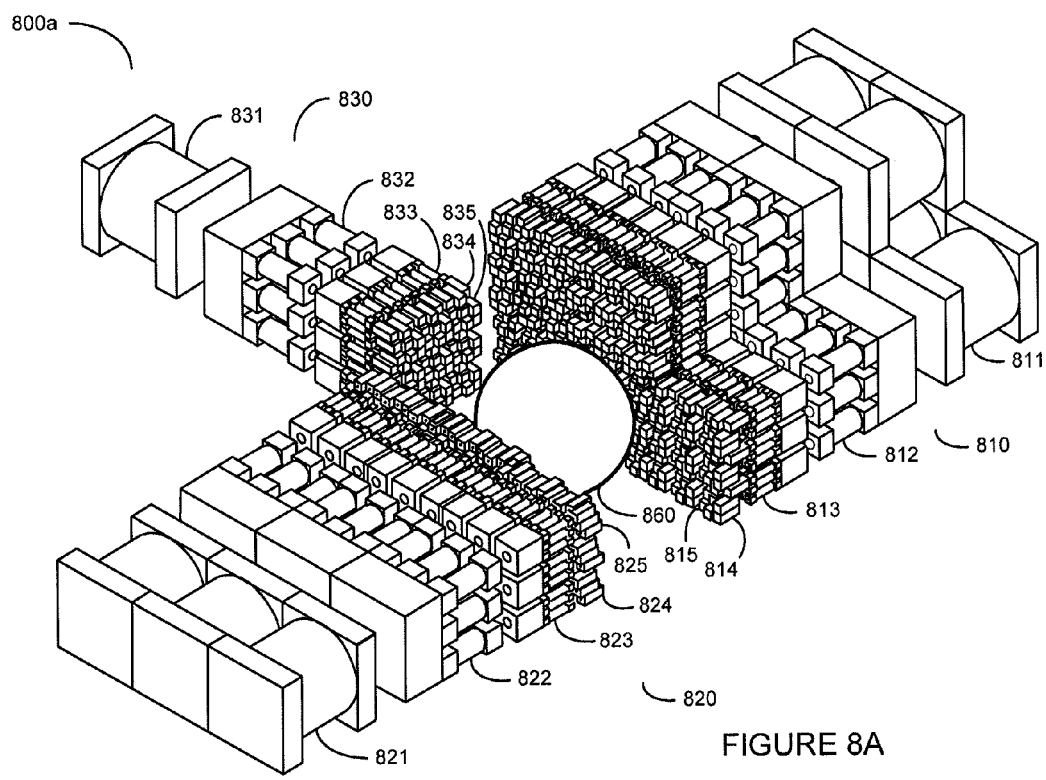
FIGS. 8A and 8B are side views of a touch sensitive gripping system comprising a plurality of opposing touch sensor arrays.
Figure 8B:
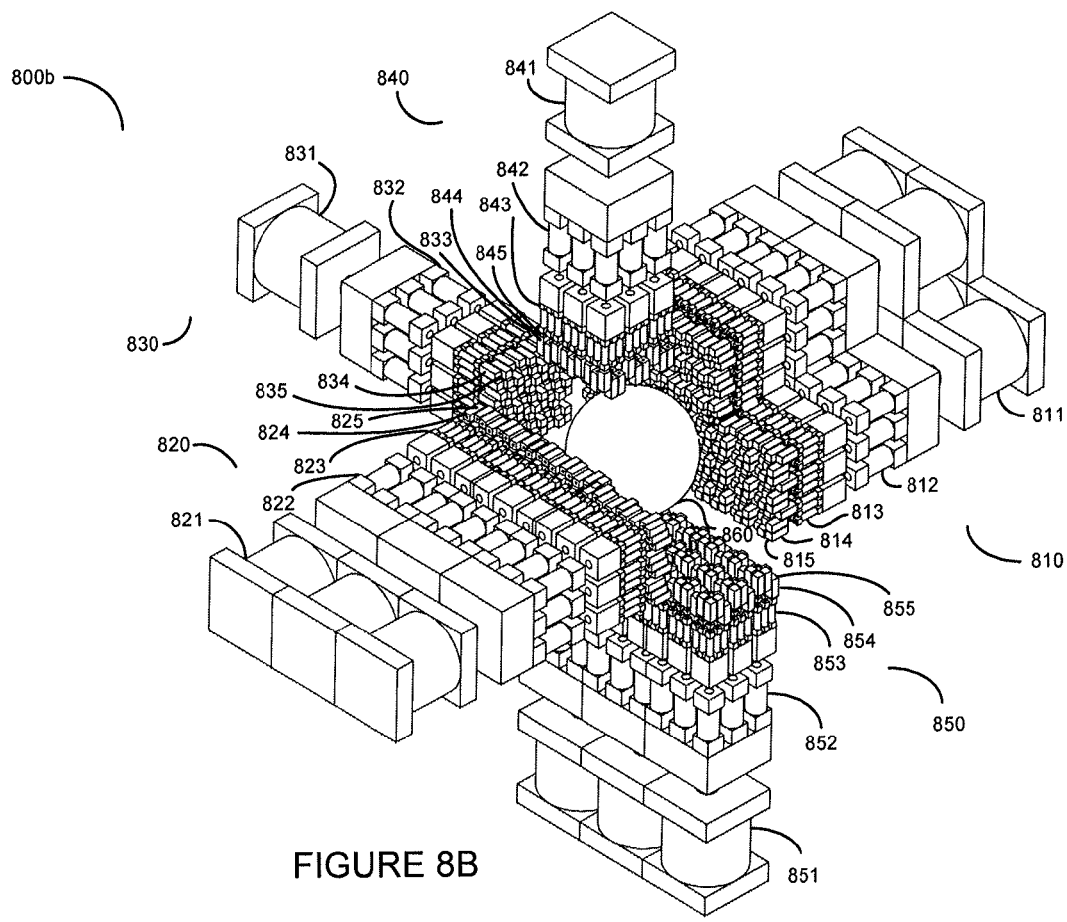

FIGS. 8A and 8B are side views of a touch sensitive gripping systems 800a and 800b comprising a plurality of opposing touch sensor arrays. The touch sensitive gripping arrays 800a and 800b may be used to grasp an object 860. Like the touch sensor array 700, each touch sensor array 810, 820, 830, 840, 850 may comprise a first layer 811, 821, 831, 841, 851; a second layer 812, 822, 832, 842, 852; a third layer 813, 823, 833, 843, 853; and a fourth layer 814, 824, 834, 844, 854. A final contact layer (not shown) may also be added in some embodiments. The final contacts in each touch sensor array 810, 820, 830, 840, 850 may all be physically connected together by a single insulating wall and/or skin, or the final contacts may be separated into sections corresponding to the cross sectional area of any of the first layer 811, 821, 831, 841, 851, the second layer 812, 822, 832, 842, 852, the third layer 813, 823, 833, 843, 853, the fourth layer 814, 824, 834, 844, 854, or the final layer. The insulating wall and/or skin may comprise silicon rubber or the like. The single insulating wall and/or skin may increase the stability of the extended pistons and/or keep contaminants from entering between the sensor cells.

In some touch sensor arrays 810, 820, 850, the first layer 811, 821, 851 may comprise a plurality of sensor cells. In the illustrated embodiment, the first and second touch sensor arrays 810, 820 and the fourth and fifth touch sensor arrays 840, 850 directly oppose one another. The third touch sensor array 830 may be at a right angle to the first and second sensor arrays 810, 820. The fourth and fifth sensor arrays 840, 850 may be at right angles to the first and second sensors arrays 810, 820, as well as the third sensor array 830. The sensor arrays 810, 820, 830 in the gripping array 800a may lie in a two-dimensional plane. In the gripping array 800b, five sensor arrays 810, 820, 830, 840, 850 may occupy a three-dimensional space. In other embodiments, there may be a greater of fewer numbers of sensor arrays 810, 820, 830, 840, 850 in one, two, or three dimensions. For example, there may be two, four, or six touch sensor arrays and/or modules at right angles to each other and/or opposing each other. The touch sensor arrays 810, 820, 830, 840, 850 may also be at 60 degree angles from one another and form a triangular shape. The illustrated embodiment is configured to grasp objects from the outside, but other embodiments may be configured to grasp an object from inside.

Figure 9:
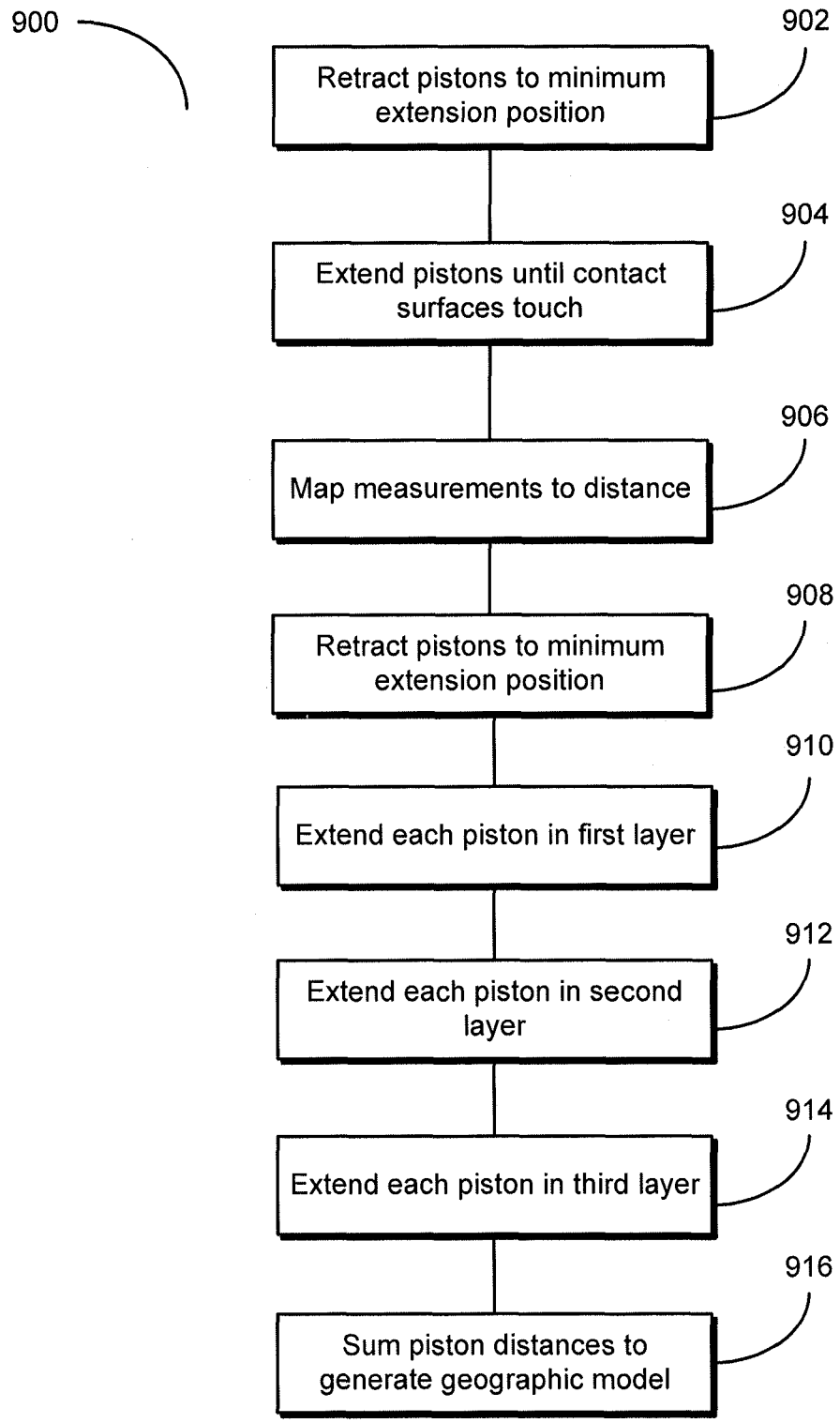
FIG. 9 is a flow diagram of a method for calibrating a touch sensor and grasping an object.

FIG. 9 is a flow diagram of a method 900 for calibrating a touch sensitive gripping system 800a and grasping an object 860. A similar method may be used for gripping system 800b. Before grasping the object 860, the touch sensitive gripping system 800a may be calibrated by fully retracting 902 the pistons (not shown) in each sensor cell to a minimum extension position. The minimum extension position may correspond with a mechanical stop, a fill limit for the reservoir, full extension or retraction of the pistons, and/or the electrodes touching. Next, the pistons in the sensor cells in each layer 811, 812, 813, 821, 822, 823, 831, 832, 833 may be extended 904 until the contact surfaces 815, 825, 835 of the sensor arrays 810, 820, 830 are touching each other. This is the maximum extension position for the sensor arrays 810, 820, 830, which may be regulated by contact pressure. In some embodiments, extension may precede retraction. The touch sensor 800a may be calibrated by mapping 906 the measured minimum and maximum extension positions to displacement. The calibration may comprise determining a measured electrical property to displacement curve, such as a voltage to distance curve. A voltage to distance curve and/or a digital calibration of voltage to distance may be created for each sensor in the sensor arrays 810, 820, 830, 840, 850. In some embodiments, the displacement between the maximum and minimum extension positions can be measured and input to a processor (not shown) to define physical measurement units for a displacement being measured. In other embodiments, the displacement being measured may be expressed as a fraction or percentage of the displacement between the minimum and maximum extension positions. Displacements may be expressed relative to the maximum extension position and/or relative to the minimum extension position.

Once the gripping system 800a is calibrated, it may be used to grasp the object 860. The sensor cells in every layer 811, 812, 813, 821, 822, 823, 831, 832, 833 of the sensor arrays 810, 820, 830 may start by being retracted 908 to the minimum extension position. Each piston in the first layer 811, 821, 831 may be extended 910 until the object 860 is contacted by a contact surface 815, 825, 835 in series with each piston in the first layer 811, 821, 831, or each piston reaches the maximum extension position. In some embodiments, each piston may continue to extend after initial contact until a predetermined maximum pressure is measured by a pressure sensor for each sensor cell 811, 821, 831. In other embodiments, only the sensor cells in one layer may have pressure sensors, and the pistons may be extended until a pressure sensor in a sensor cell in series with the piston reaches a predetermined threshold. Multiple sensor cells may also be connected to a single pressure regulator and/or hydraulic pump, and extension may be limited by the in-line pressure detected by the regulator and/or pump. The pressure may be regulated to the cells, individually or collectively, by one or more hydraulic valves.

Once every piston in the first layer 811, 821, 831 has extended until contact with the object 860 has been made with sufficient pressure, or every piston has reached the maximum extension point, the gripping system 800a may begin extending 912 the pistons in the second layer 812, 822, 832. Again, every piston may be extended until the object 860 is contacted with sufficient pressure by a contact surface 815, 825, 835 in series with each piston in the second layer 812, 822, 832 or until the pistons reach their maximum extension point.

The third layer 813, 823, 833 may be extended 914 until a contact surface in series with every piston in the third layer 813, 823, 833 makes contact with sufficient pressure or reaches its maximum extension point. In those embodiments where the processor controls multiplexing, the processor may speed operation by only multiplexing measurement and control of sensor cells that have not yet made contact with the object 860 with sufficient pressure. In some embodiments, the pistons may all be pressure regulated by the same pumping and reservoir system using single or multiple control valves to control selected piston pressure so that simultaneous extension results until sufficient contact pressure is indicated by a pressure feedback loop. Pressure feedback may be received from piezoresistive sensors (not shown) in the back of the contact surfaces 815, 825, 835. In certain embodiments, one pump may be used per series array. Thus, multiple layers 811, 812, 813, 821, 822, 823, 831, 832, 833 may be extended simultaneously in some embodiments.

Once each piston has finished being extended, the processor may calculate 916 the position of each contact point with the object 860. This can be done by taking the displacement the flexible wall has moved in the fourth layer 814, 824, 834 and adding the displacements travelled by each piston in the third layer 813, 823, 833; the second layer 812, 822, 832; and the first layer 811, 821, 831 in series with that piston. The plurality of total displacements calculated may be used to generate a geographic model of the object 860 and/or to determine the object's specific location and orientation in the gripping system 800a. The geographic model may include a differential volume and/or perimeter determined from the movement of the sensor cells relative to the calibrated reference points. A predetermined area of each sensor cell may be multiplied by the displacement travelled by the sensor cell to determine a corresponding volume. A plurality of volumes may be summed to determine a total volume, and/or the geographic model may be assembled from volumes determined for each sensor cell. The object 860 can be manipulated based on the geographic model generated and the location determined. For additional objects, the gripping system 800a may be recalibrated using steps 902, 904, and 906, or the gripping system 800a can jump to step 908 and skip calibration.

Sensor Array with Sensors not Separated by Insulating Walls

Figure 10:
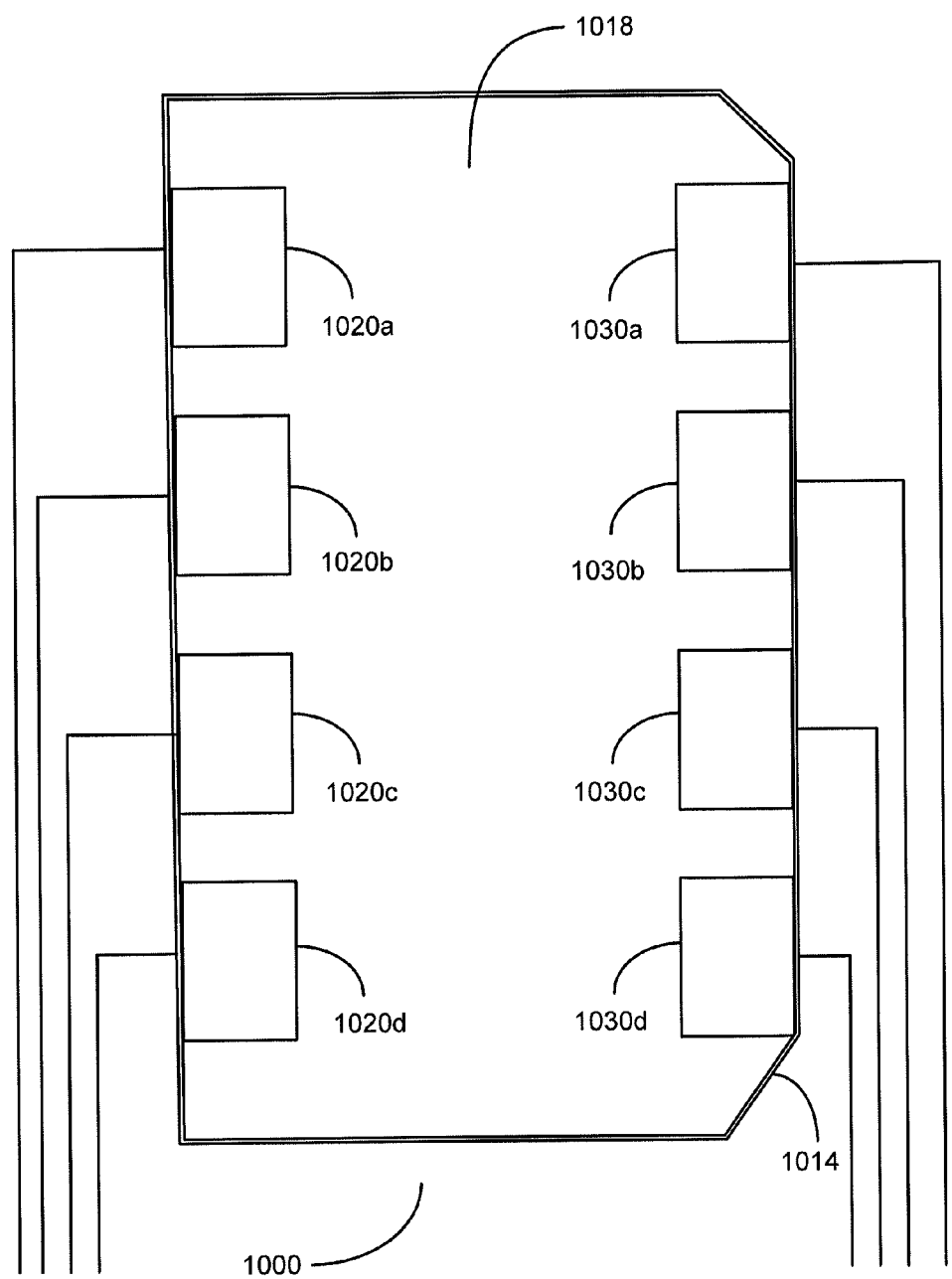
FIG. 10 is a cross-section view of a sensor array comprising a plurality of electrodes, not separated by insulating walls.

FIG. 10 is a cross-section view of a sensor array 1000 comprising a plurality of electrodes 1020a-d, 1030a-d not separated by insulating walls. A single sensing chamber 1018 containing a conductive fluid comprises all the electrodes 1020a-d, 1030a-d allowing electrical energy to conduct between any stationary electrode 1020a-d and any movable electrode 1030a-d. Like sensing cell 110, the movable electrodes 1030a-d may be embedded in a flexible substrate 1014. The movable electrodes 1030a-d then move as the flexible substrate 1014 is pressed against an object to grip that object. The flexible substrate 1014 may comprise latex, plastics, natural and/or synthetic rubbers, and/or silicones. The connections to the movable electrodes 1030a-d may also be embedded in the flexible substrate 1014 to prevent their exposure to the conductive fluid. In some embodiments, the electrodes 1020a-d, 1030a-d may comprise conductive ink. The conductive ink may be printed with an inkjet printer or the like onto the flexible substrate 1014. The conductive ink may be coated with silver, silver chloride, tungsten, or tantalum using vapor deposition, chemical deposition, etching, electrolysis, dipping, or the like. The deposited material may prevent the conductive ink from being in contact with the conductive fluid thus protecting the conductive ink from corrosive conductive fluids. In some embodiments, the stationary electrodes 1020*a*-*d* may be replaced with a single, large electrode that interacts with all of the movable electrodes 1030*a*-*d*. The stationary electrodes 1020*a*-*d* may be connected to a multiplexer (not shown) to cycle through each of the electrodes 1020*a*-*d*. The movable electrodes 1030*a*-*d* may be connected to the same multiplexer and/or a separate multiplexer. A processor may switch through the electrode pairs 1020*a*, 1030*a*; 1020*b*, 1030*b*; 1020*c*, 1030*c*; 1020*d*, 1030*d* in sequence to create a closed circuit through each pair. In an embodiment with two multiplexers, the multiplexers may cycle together and/or a common select signal may be sent to both multiplexers to ensure that opposing pairs of electrodes 1020*a*-*d*, 1030*a*-*d* are activated, or the stationary electrode may be a single electrode in common to all the movable electrodes 1030*a*-*d*.

Figure 11:
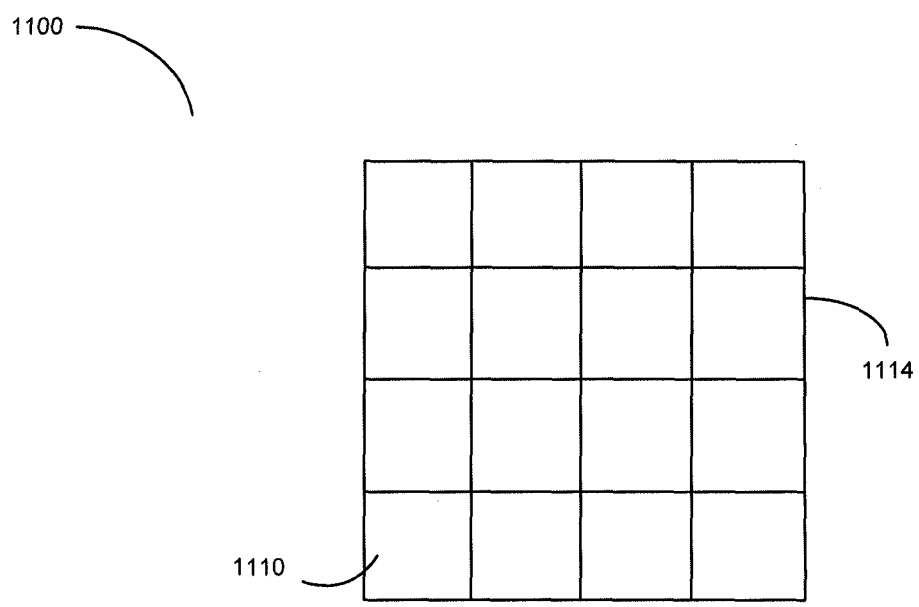
FIG. 11 is an overhead view of a sensor array without internal, insulating walls.

FIG. 11 is an overhead view of a sensor array 1100 without internal, insulating walls. The sensor array 1100 comprises 16 individual sensing elements 1110 in a two-dimensional array. Each sensing element 1110 may comprise a piston (not shown) with a movable electrode (not shown) on it, or the movable electrodes may be affixed directly to a flexible substrate 1114. Thus, a sensor array without internal, insulating walls may be implemented either with flexible walls like sensor array 200 or with pistons like the layers of sensors 710, 720, 730. In some embodiments of touch sensors 700, the final layer 740 may comprise a sensor array 1100 without insulating walls. Similarly, the fourth layers 814, 824, 834, 844, 854 in touch sensitive gripping systems 800*a* and 800*b* may be implemented by sensor arrays 1100 without insulating walls. The flexible substrate 1114 may be made of latex; plastics; natural and synthetic rubbers, such as silicon rubber; silicones; and the like.

Figure 12A:
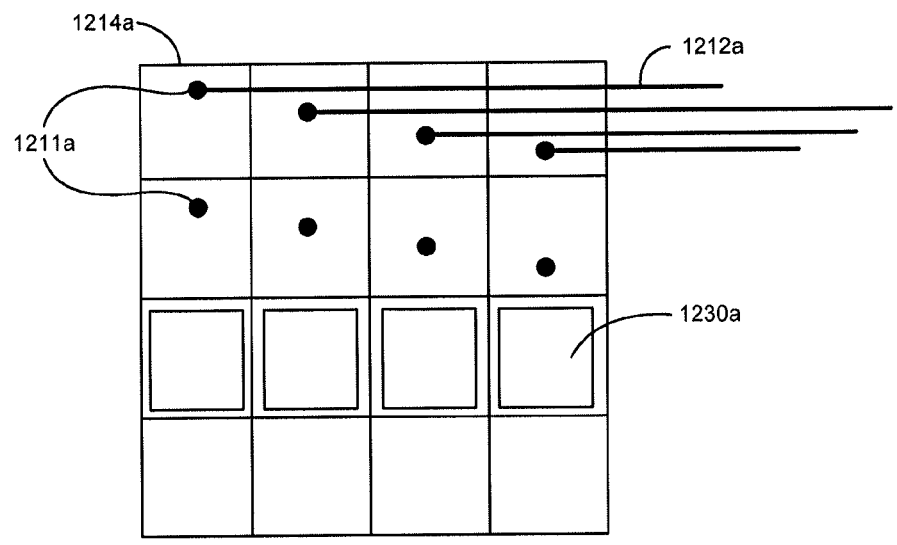
FIG. 12A is a bottom view of a flexible substrate for a sensor array without internal, insulating walls.

FIG. 12A is a bottom view of a flexible substrate 1214*a* for a sensor array 1200*a* without internal, insulating walls. The flexible substrate 1214*a* may include a plurality of contact points 1211*a* (also referred to herein as "lands"). The contact points 1211*a* may include a conductive material, such as conductive ink, which may be inkjet printed onto the flexible substrate 1214*a*. A plurality of wires 1212*a* may provide external connections to electrodes 1230*a*. The plurality of wires 1212*a* may also be inkjet printed onto the substrate 1214*a*. In the illustrated embodiment, the plurality of wires 1212*a* may all exit the inside of the sensor array 1200*a* on the same side. The plurality of wires 1212*a* may be covered with an insulator such that only the contact points 1211*a* remain exposed. The movable electrodes 1230*a* may then be attached to the contact points 1211*a*.

Figure 12B:
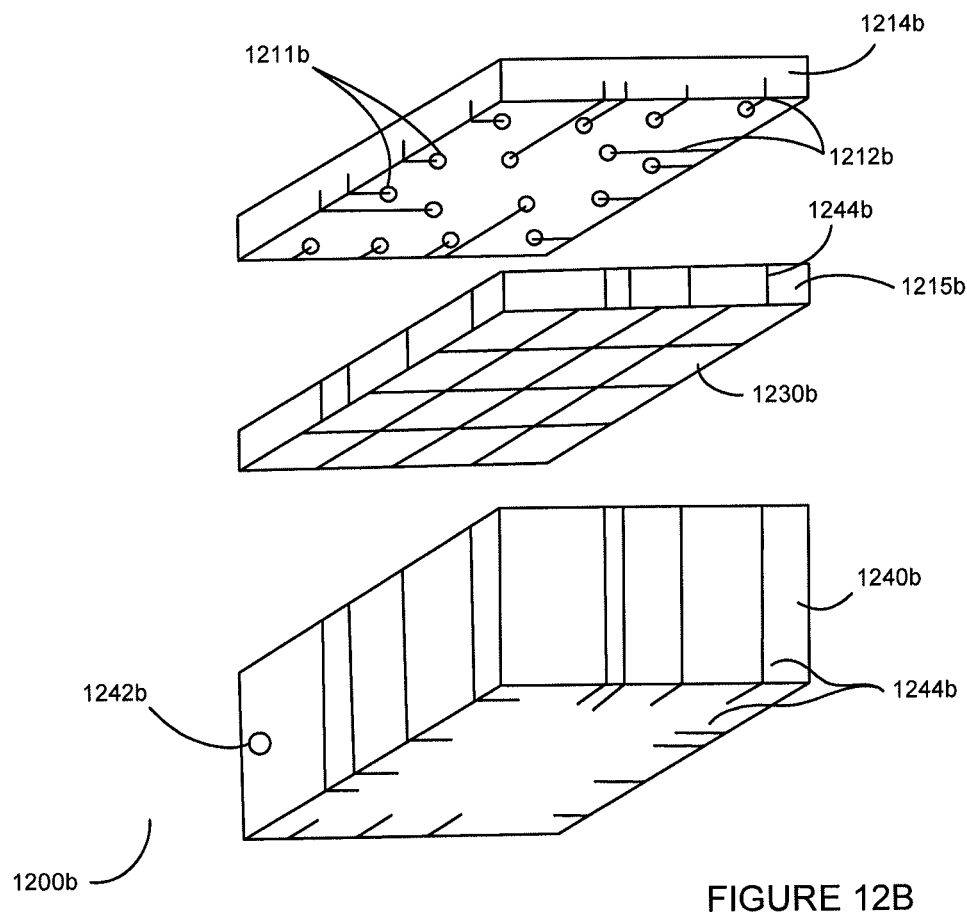
FIG. 12B is a front perspective view of an alternate embodiment of a sensor array without internal insulating walls.

FIG. 12B is a front perspective view of an alternate embodiment of a sensor array 1200*b* without internal insulating walls. In an embodiment, the dimensions of the sensor array 1200*b* are 0.25 inches by 0.25 inches by 0.25 inches. Unlike the sensor array 1200*a*, the plurality of wires 1212*b* may exit the inside of the sensor array 1200*b* on a plurality of different sides. A plurality of contact points 1211*b* and the plurality of wires 1212*b* may be inkjet printed onto a flexible substrate 1214*b*. The flexible substrate 1214*b* may comprise silicon. An additional substrate layer 1215*b* may cover the wires 1212*b* and leave only the contact points 1211*b* exposed. Movable electrodes 1230*b* may be attached to the exposed contact points 1211*b*. In an embodiment, the movable electrodes 1230*b* may be inkjet printed onto the exposed contact points 1211*b*.

The flexible substrate 1214*b* and additional substrate layer 1215*b* may be attached to a sensor array body 1240*b*. The flexible substrate 1214*b*, additional substrate layer 1215*b*, and the sensor array body may include external wires 1244*b* along the outside edges. The external wires 1244*b* may be inkjet printed onto the exteriors of the flexible substrate 1214*b*, additional substrate layer 1215*b*, and sensor array body 1240*b* before and/or after the flexible substrate 1214*b*, additional substrate layer 1215*b*, and sensor array body 1240*b* have been attached to one another. The external wires 1244*b* may be coupled to a multiplexer (not shown) and may be coated in an insulating material. The insulating material may be hard polytetrafluoroethylene (e.g., Teflon®), such as is produced by Chem Processing Inc. or American Durafilm. Alternatively, or in addition, the plurality of wires 1212*b* and/or the external wires 1244*b* may be flexible flat wire/cable and may be attached to the flexible substrate 1214*b*, additional substrate layer 1215*b*, and/or sensor array body 1240*b*. Flexible flat wire/cable may be available from Z-Axis Connector Company, DIY Trade, or Mouser Electronics.

A fill hole 1242*b* may allow a conductive or dielectric fluid to be added to the sensor array 1200*b* after it has been sealed. A fill hose (not shown) may be coupled to the fill hole 1242*b* to add the fluid. The sensor array 1200*b* may be spun in a centrifuge with the fill hose still attached to remove air bubbles though the fill hose. Once any air bubbles have been removed, the fill hole 1242*b* may be sealed.

Figure 13:
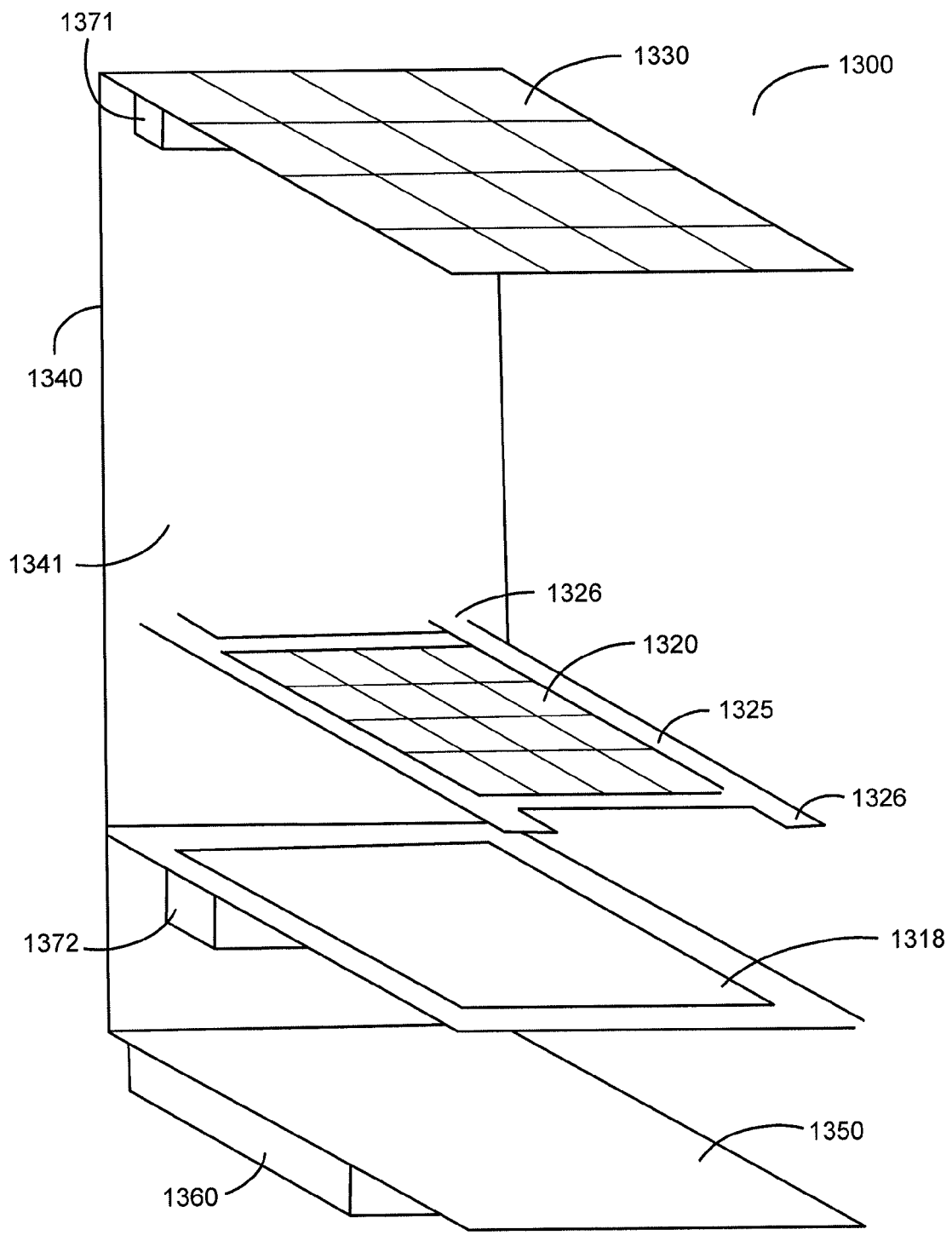
FIG. 13 is a cross-section view of a sensor array.

FIG. 13 is a cross-section view of a sensor array 1300. In the illustrated embodiment, the sensor array 1300 includes 16 movable electrodes 1330 and 16 stationary electrodes 1320. Alternatively, more or fewer electrodes 1320, 1330 may be included in other embodiments, and/or the movable electrodes 1320 may be a single electrode of area equal to or less than the sum of the areas of the 16 stationary electrodes 1330. The electrodes 1320, 1330 may include a conductive material, such as silver, conductive ink, any previously discussed conductive material, or the like. The movable electrodes 1330 may be inkjet printed and/or attached to a flexible substrate (not shown) as discussed above. The stationary electrodes 1320 may be attached to a stationary electrode housing 1325. The stationary electrode housing 1325 may be made of a high Young's Modulus non-conductive material, such as carbon-fiber-reinforced plastic. The flexible substrate and/or stationary electrode housing 1325 may be electrically and/or mechanically coupled to one or more sidewalls 1340. The one or more sidewalls 1340 may include one or more printed circuit boards (PCBs) 1341, such as single-sided and/or double-sided PCBs. The sidewalls 1340 may be made of a flexible material, such as flat wire/cable, silicon rubber, flexible PCB, or the like. On contact pressure with an object, the sidewalls 1340 may flex and allow the movable electrodes 1330 to move close to the stationary electrodes 1320. In an embodiment, two opposing sidewalls 1340 may include PCBs 1341, silicon rubber with embedded wires, and/or flexible cable, and another two sidewalls 1340 may not include PCBs 1341, wires, and/or flexible cables. Other sidewalls enclosing the sensor array 1300 may also be flexible. The one or more sidewalls 1340 may electrically couple the stationary and/or movable electrodes 1320, 1330 to a base plate 1350. The base plate 1350 may include a double-sided PCB configured to electrically couple the stationary and/or movable electrodes 1320, 1330 to a multiplexer 1360. The base plate 1350 may include through holes and/or vias to couple the electrodes 1320, 1330 to the multiplexer 1360. The multiplexer 1360 may be electrically coupled with measuring and/or processing components (not shown) as discussed above.

The sensor array 1300 may be filled with an electrically operative fluid (not shown). The stationary electrode housing 1325 may include offsets 1326 that support the stationary electrode housing 1325. The offsets 1326 may space the stationary electrode housing 1325 from the walls 1340 to create a baffle and allow fluid to flow around the stationary electrode housing 1325. A bladder 1318 may be included to prevent leaking of the electrically operative fluid. The bladder 1318 may be designed with a lower Young's Modulus than the sidewalls 1340. In an embodiment, the sidewalls 1340 may include silicon rubber with a greater thickness, and the bladder 1318 may include silicon rubber of a lesser thickness. The bladder 1318 may be configured to allow expansion of the bladder as the fluid is displaced so that the sidewalls 1340 do not bulge. The sidewalls 1340 may include a material with a Young's Modulus higher than the bladder 1318 and/or a material thicker than the bladder 1318 with the same Young's Modulus as the bladder to prevent deformation of the sidewalls. The offsets 1326 and bladder 1318 may permit displacement of the electrically operative fluid so that the flexible substrate can conform to an object (not shown). The thickness and/or elastic modulus of the bladder 1318 may be selected to allow sufficient displacement for the flexible substrate to conform to the shape of the object. A similar substance may be included in both the flexible substrate and the bladder 1318, e.g. silicon rubber. The bladder 1318 and flexible substrate may be a similar size and thickness in some embodiments. Alternatively, a bladder 1318 thinner than the flexible substrate may reduce side bulging of the flexible substrate.

The sensor array 1300 may also include a shear sensor 1371, a pressure sensor 1372, and a temperature sensor (not shown). The shear sensor 1371 may be in contact with the flexible substrate and/or movable electrodes 1330 and detect shear force on the opposite side of the flexible substrate. The shear sensor 1371 may be perpendicular to the electrodes 1330 and/or parallel to the one or more sidewalls 1340. In some embodiments, more than one shear sensor 1371 may be used to detect shear force in multiple directions and/or locations. The shear sensor 1371 may be a PVDF film sensor, a piezoresistive sensor, or the like. The pressure sensor 1372 may be in contact with the bladder 1318 and/or the electrically operative fluid. A probe for the temperature sensor may be attached to the one or more sidewalls 1340, in hydraulic fluid lines (not shown), in contact with the flexible substrate, in contact with the object, in contact with the bladder 1318, in contact with the stationary and/or movable electrodes 1320, 1330, and/or in contact with the electrically operative fluid. Electrical lead wires (not shown) may couple the shear sensor 1371, pressure sensor 1372, and/or temperature sensor to the one or more sidewalls 1340. The one or more sidewalls 1340 and/or the multiplexer 1360 may transmit sensor measurements to the processor.

Insert injection molding may be used to form the walls 1340. The walls 1340 may encompass flexible cables and/or inkjet printed electrical wires, the base plate 1350, and the offsets 1326 and may circumscribe the sensors 1371, 1372, the electrodes 1320, 1330, and the bladder. The offsets 1326 may be attached to the flexible cables, and/or the offsets 1326 may be insert injection molded into the sidewalls 1340. In an embodiment, the walls 1340, base plate 1350, bladder 1318, PCBs 1341, stationary electrode housing 1325, and the flexible substrate are coupled to each other by silicon rubber. The offsets 1326, the bladder and bladder housing 1318, and the PCBs 1341 add support to the sidewalls 1340. The electrical lead wires to the shear sensor 1371, pressure sensor 1372, temperature sensor, movable and/or stationary electrodes 1320, 1330, and the like may be covered by a moldable plastic, such as a thermoplastic, during the injection molding. The moldable plastic may electrically insulate any electrical connections other than the electrodes 1320, 1330 from coming into contact with the electrically operative fluid.

Figure 14:
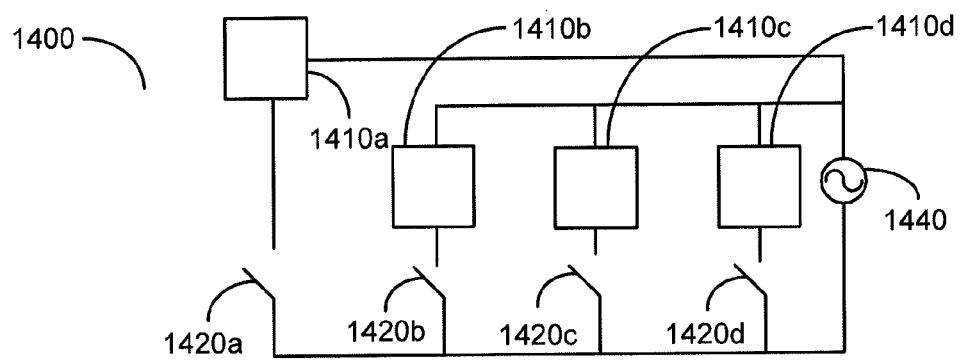
FIG. 14 is a schematic diagram of a sensor comprising control circuitry and a sensor array without internal, insulating walls.

FIG. 14 is a schematic diagram of a sensor 1400 comprising control circuitry and a sensor array without internal, insulating walls. The control circuitry may control power to the electrode pairs 1410a-d to allow for accurate measurement. Each electrode pair 1410a-d may be controlled by a switch 1420a-d that determines whether or not power from a power source 1440 flows to that electrode pair 1410a-d. The switches 1420a-d may be implemented as field effect transistors made from silicon, gallium arsenide, carbon nanotubes, or the like. A field effect transistor may have its source connected to the power source 1440 and its drain coupled to one of the electrode pairs 1410a-d. The switches 1420a-d may be embedded in or on the flexible substrate or may be located away from the electrode pairs 1410a-d. For example, a field effect transistor made from carbon nanotubes may be particularly resistant to damage from flexing of the flexible substrate. Thin film metal may be used to electrically couple the switches 1420a-d with the electrode pairs 1410a-d.

In some embodiments, the switches 1420a-d may only allow one pair of electrodes 1410a-d to be powered at a time, such as only directly opposing electrodes. In the illustrated embodiment, each movable electrode (not shown) is paired with a stationary electrode (not shown) opposite to it. A processing unit or the like may cycle which switch 1420a-d is enabled until the displacement between every electrode pair 1410a-d has been measured. Internal impedances of the circuitry may control the maximum sampling rate that still allows for accurate measurements. In some embodiments, the switches 1420a-d may be coupled with the movable electrodes. In other embodiments, the switches 1420a-d may be coupled with the stationary electrodes. Some embodiments may have switches 1420a-d for both the stationary and movable electrodes. Non-opposing electrodes may be enabled to measure shear force on the gripping surface (not shown). The circuit may comprise one or more multiplexers (not shown) to consolidate signals to a single measuring device (not shown) or there may be a measuring device for each electrode pair 1410a-d. Signals may also be amplified and filtered before or after multiplexing. Consolidated signals may be demultiplexed before sampling and relay to a processing unit or the processing unit may be programmed to properly interpret multiplexed signals.

Figure 15:
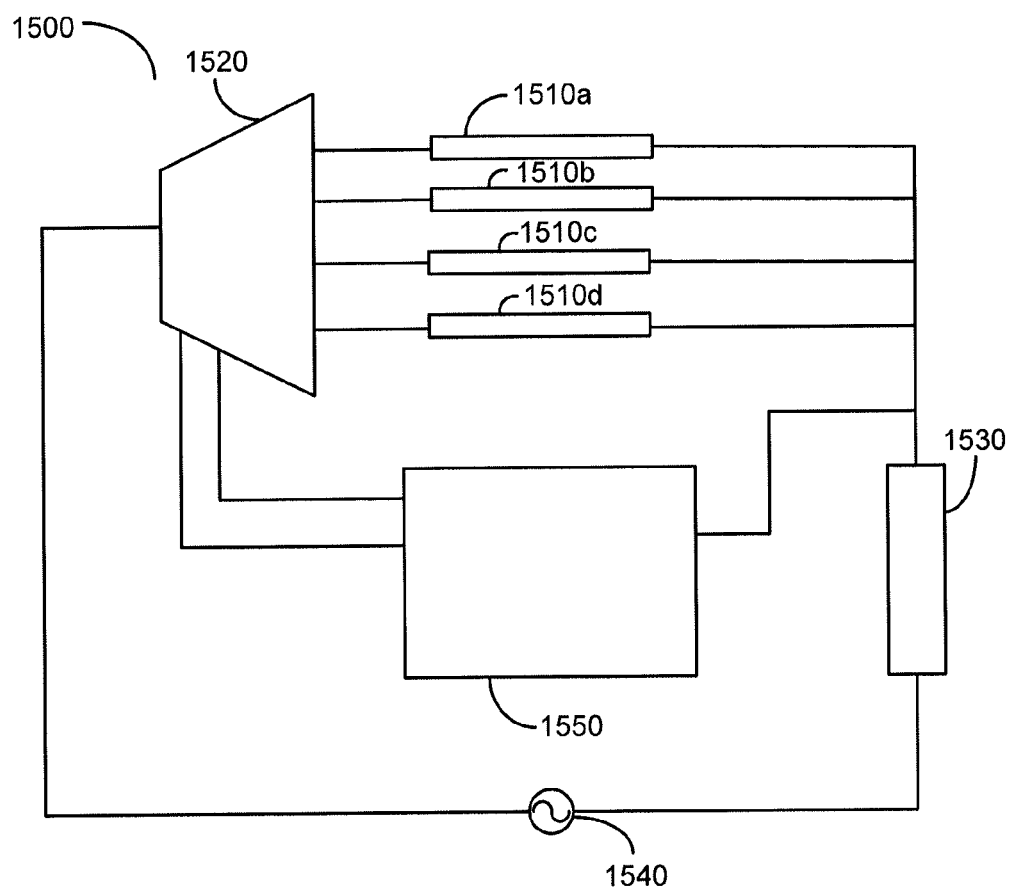
FIG. 15 is a schematic diagram of a sensor comprising a control multiplexer and a sensor array without internal, insulating walls comprising.

FIG. 15 is a schematic diagram of a sensor 1500 comprising a control multiplexer 1520 and a sensor array without internal, insulating walls. The multiplexer 1520 may allow power to be supplied to only a selected electrode pair 1510a-d. In the illustrated embodiment, the stationary electrodes (not shown) are electrically coupled with each other. Alternatively or additionally, the movable electrodes (not shown) may also be coupled with each other. In other embodiments, a single stationary electrode may interact with all of the movable electrodes, or the stationary electrodes and movable electrodes may not be coupled to each other. A first multiplexer (not shown) may be connected to the stationary electrodes, and a second multiplexer (not shown) may be connected to the movable electrodes. Alternatively, a single multiplexer may switch through the pairs of stationary and movable electrodes. A current shunt 1530 may allow a voltage relative to ground to be measured by a processing unit

1550. In other embodiments, a Wheatstone bridge may be used to measure resistance rather than the current shunt 1530.

In the illustrated embodiment, the processing unit 1550 controls the multiplexer 1520. In some embodiments, the processing unit 1550 may comprise a microprocessor (not shown) and an integrated circuit, such as an FPGA, ASIC, or the like (not shown). The multiplexer 1520 may be implemented in the integrated circuit or may be an off the shelf ASIC controlled by the integrated circuit. The integrated circuit may also comprise an ADC to measure the voltage across the current shunt 1530. The integrated circuit may also be able to efficiently handle parallel computations to convert voltage measurements to displacements before outputting the displacements to the microprocessor with a high bandwidth link. This may allow the integrated circuit to manage the control circuitry and perform lower level calculations, while the processor uses the preprocessed data received from the integrated circuit to perform higher level modeling. Carbon nanotube integrated circuits embedded into the flexible substrate may comprise all or part of the switches, electrodes, microprocessor, multiplexer, and/or demultiplexer. Microfluidic channels may be used for electrodes with very small contact areas to enhance electrical coupling between the conductive fluid and the stationary and movable electrodes.

Determining Relative Permittivity and/or Resistivity of an Object

A gripping system may be used to measure a capacitance across an object being gripped. Because the distance between the capacitor plates is known, a relative permittivity of the object may be determined from the capacitance. In some embodiments, determining the relative permittivity may comprise computing a dielectric constant for the object. Alternatively or additionally, a resistance of the object being gripped may be measured. Measurements of the length of the object and the area of the object from the gripping system may be used with the measured resistance to determine a resistivity of the object. In some embodiments, the relative permittivity may be determined for insulators, the resistivity may be determined for conductors, and the relative permittivity and/or resistivity may be determined for semiconductors.

The relative permittivity and/or resistivity may be used to identify the composition of an object by comparing the determined/measured value to known values for various materials or to previously measured values for various objects. Once the material of the object is known, properties of the object or the weight of the object may be predicted from the material. The relative permittivity and/or resistivity may also be used to determine the purity of an object or the existence of hazardous materials on the object. These determinations may be beneficial in the semiconductor industry and the like. The additional data from measuring the relative permittivity and/or resistivity may allow for better process control, increased efficiency, and superior products.

Figure 16A:
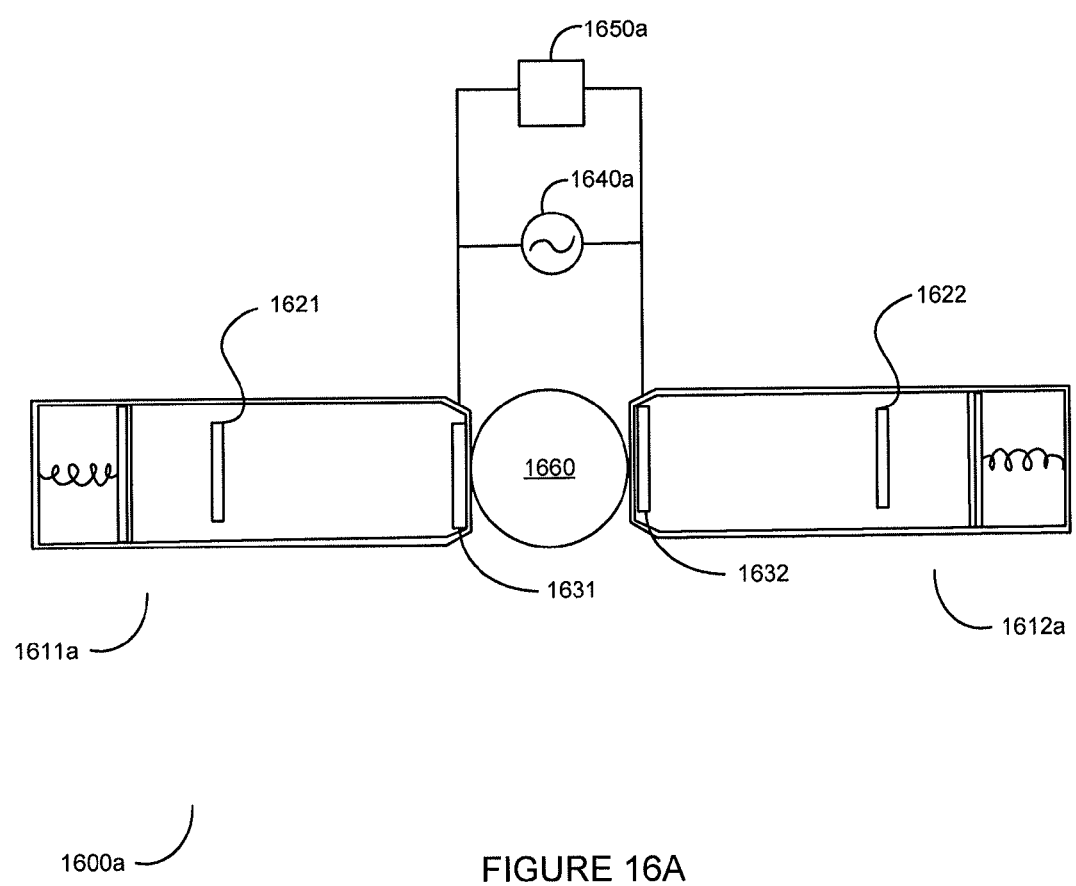
FIG. 16A is a schematic diagram of a relative permittivity sensor comprising opposing sensor cells.

FIG. 16A is a schematic diagram of a relative permittivity sensor 1600a comprising opposing sensor cells 1611a, 1612a. The opposing sensor cells 1611a, 1612a may comprise pistons and/or flexible walls. In the illustrated embodiment, the movable electrodes 1631, 1632 may be used as plates of a capacitor with an object 1660 acting as the dielectric for the capacitor. In other embodiments, the fixed electrodes 1621, 1622 or both the fixed and movable electrodes 1621, 1622, 1631, 1632 may be used as the plates of the capacitor. A separate voltage line may be supplied to the movable electrodes 1631, 1632, or one or more switches may be used to change between displacement measuring and capacitance measuring.

In some embodiments, displacement measuring may not be performed during capacitance measuring, and the fixed electrodes 1621, 1622 may be at the same voltage as the movable electrodes 1631, 1632 or allowed to float. Correspondingly, opposing movable electrodes 1631, 1632 may be at the same voltage, one may be allowed to float during displacement measurement, and/or the opposing electrodes 1631, 1632 are not energized at the same time during displacement measurement to prevent capacitive interference. In embodiments, the object 1660 may be ejected by applying a voltage of the same polarity to both movable electrodes 1631, 1632 or may be attracted in between the electrodes 1631, 1632 when a voltage is applied across the electrodes 1631, 1632. This may be used to grab or release an object, such as when using micromachinery.

In some embodiments, the sensor 1600a may use only one pair of directly opposing electrodes. Alternatively, a predetermined plurality of electrodes and/or non-directly opposing electrodes may be used. For example, measuring permittivity of hollow objects with directly opposing electrodes may require an excessively large voltage, so electrodes angled relative to one another may be selected in such instances. Alternatively, the shape of the object 1660 may cause the movable electrodes 1631, 1632 to be angled rather than directly opposing one another. The angles may be between 0 degrees and 180 degrees in some embodiments and between −180 degrees and 180 degrees in others. For angled plates, the electric field may arch through the object 1660. The arching of the electric field may depend on the thickness and material of the object 1660. The voltage may be increased until the electric field extends out of the object 1660. When the permittivity is detected to be that of air and/or there is a change in permittivity from that of the object 1660, an edge of the object 1660 may be indicated. In alternate embodiments, edge detection may be performed by changing one plate of the capacitor to a different sensor cell's movable electrode until the permittivity of air is detected.

Detecting changes in the permittivity of an object 1660 can be used to determine a thickness of an object wall. Various capacitor plate arrangements may be used to detect changes in permittivity. The capacitor plates may be arranged in close proximity, such as a series capacitor plate alignment, to cause the electric field to form an arch between the capacitor plates. A measured capacitance of the arching field may depend on the permittivity of each material through which the field passes, such as an object wall and a material behind the object wall like water or air. For example, a small electric field applied to a glass of water by series plate capacitors may first penetrate through the glass. As the electric field is increased, the electric field may penetrate through the water and the glass. A change in capacitance as the electric field is increased may indicate the electric field is passing through a material with a different permittivity value.

The electric field between capacitor plates may create an arch with the series plate alignment. Increasing the voltage from a low value to a high value across the capacitor may cause the electric field to project from one layer of the object to another layer of different material as the arching electric field is increased. The capacitor voltage may also be monitored in order to determine changes in materials. Changes in the shape of the voltage curve may also be used to indicate the thickness of the different layers of object materials. The change in dielectric constant of the various materials of the object may cause ripples in the voltage-time curve as a function of increasing voltage. Comparing these changes to stored values may be used to determine the wall thickness of an object.

The voltage across a capacitor may be expressed using the equation:

$$V = \frac{1}{C}\int_0^t i(\tau)d\tau + V(0) \quad (1)$$

wherein V is the voltage across the capacitor at time t, V(0) is the voltage across the capacitor at time 0, C is the capacitance value of the capacitor, and $i(\tau)$ is the current into and out of the capacitor. The impedance of the capacitor may be expressed as:

$$Z = \frac{1}{j\omega C} = -\frac{j}{2\pi f C} \quad (2)$$

wherein Z is the impedance of the capacitor, $j^2=-1$, $\omega$ is the angular frequency, f is the ordinary frequency, and C is the capacitance value of the capacitor. The capacitor voltage, current, and/or impedance may be used to detect changes in the dielectric constant as the voltage and/or frequency is increased to project through the different layers of the object. Monitoring the shape of the voltage curve may predict the wall thickness and materials of the object. Different voltage and/or frequency curves may be stored in the processor for comparison to the measured curve.

The permittivity values for various substances, including substances with multiple layers of different materials, may be stored for comparison with measured values using a processor. A combined equivalent permittivity value may be computed from the measured capacitance. The combined equivalent permittivity value may be dependent on the permittivity values of each material through which the electric field passes. Alternatively or in addition, the processor may calculate a permittivity profile by comparing a change in applied voltage and/or frequency relative to a change in capacitance. The combined equivalent permittivity and/or permittivity profile may then be compared to the stored permittivity values and/or stored permittivity profiles to determine the thickness of the object wall and/or to determine the materials of which the object 1660 is comprised. Determining the thickness of the object wall may be important for regulating pressure. The pressure exerted on an object 1660 by a gripper may be controlled through feedback of various information. The feedback may include the object's material, the wall thickness, change in voltage, change in impedance, change in frequency, and/or the change in permittivity as the electric field projects through a wall and encounters another material.

A power source 1640a and measuring device 1650a may be used to measure the capacitance, capacitor impedance, and/or capacitor voltage across the object 1660. In some embodiments, the power source 1640a and measuring device 1650a may be a single device. In other embodiments, additional electrodes (not shown) may be used to create a plurality of capacitor circuits, which may be controlled by multiplexers and/or demultiplexers (not shown). The capacitance, capacitor impedance, and/or capacitor voltage may be measured by applying a direct current (DC) voltage and measuring current and/or a charging time; applying a constant current and measuring a rate of voltage change and/or a charging time; applying an alternating current (AC) and measuring the resulting voltage; applying an AC voltage and measuring the resulting current; applying and varying the frequency of an alternating current and measuring the capacitor voltage; applying and varying the frequency of an alternating voltage and measuring the capacitor current; using a bridge circuit; or the like. With either a constant voltage AC source or constant current AC source, the magnitude, the phase, and/or a complex representation of the resulting current or voltage can be measured. A variable frequency switching power supply may be used to provide DC and AC power at various frequencies, power, and/or voltage. Because properties may vary substantially with frequency, the power source 1640a and measuring device 1650a may have wide programmable frequency ranges. In some embodiments, several measurements may be averaged to increase accuracy. The voltage applied in any of the above measurement systems may be low to avoid exceeding the breakdown voltage of the object 1660 or generating too much heat in the object 1660, which may mostly be a problem for AC powered measurements.

In some embodiments, a plurality of capacitances across the object may be measured at a corresponding plurality of frequencies. The frequencies may be varied from zero (DC) to $10^{15}$ Hertz or higher in embodiments. This may comprise sweeping from low frequency to high frequency. Similarly, the voltage across the movable electrodes 1631, 1632 may be increased over a plurality of values during measurements. The measurements may also be used to determine the dielectric relaxation and/or dissipation factor of the material. The permittivity of a material may also depend on the length of time the material is exposed to an electric field as well as the temperature of the material. Thus, capacitances may be measured for multiple exposure times, and a temperature of the dielectric may be measured.

A relative permittivity of the object may be determined from the one or more measured capacitances. In some embodiments, the relative permittivity may be computed using a processor. Because walls, air gaps, and the like are in between the movable electrodes 1631, 1632 and can contribute to the capacitance measurement, the sensor 1600a may be calibrated initially to account for the permittivity of these sensor components before determining the relative permittivity of the object. Alternatively, air gaps may be reduced or eliminated by applying a liquid to the robotic gripper. In some embodiments, the liquid may comprise a polar solvent, such as water. Due to the higher permittivity of water, capacitance measurements may be increased, allowing more precise measurements at lower voltages. To calibrate the sensor 1600a, the sensor cells 1611a, 1612a first may be brought together until they are touching. One or more capacitances of the sensor components may then be measured at one or more frequencies.

The relative permittivity of the sensor components may be determined according to the equation:

$$C = \frac{\varepsilon_{sensor}\varepsilon_0 A}{d_{sensor}} \quad (3)$$

wherein $\varepsilon_{sensor}$ is the relative permittivity of the sensor components, $d_{sensor}$ is the distance between the movable electrodes, $\varepsilon_0$ is the vacuum permittivity, and A is the area of the electrodes 1631, 1632. In some embodiments, the vacuum permittivity and electrode area may be predetermined values, and the value $\varepsilon_{sensor}/d_{sensor}$ for each frequency may be stored to account for the sensor components. The permittivity of sensor components may be determined during step 904 of the displacement calibration. In other embodiments, the sensor cells 1611a, 1612a may be separated by a predetermined displacement during computation of the relative permittivity for sensor components and/or $\in_{sensor}$ may be stored. Equation 3 comprises units from the International System of Units (SI). In other embodiments, Gaussian units or other unit systems may be used to calculate permittivity. In Gaussian units, the dielectric constant k may be computed according to the equation:

$$C = \frac{k_{sensor}A}{4\pi d_{sensor}} \quad (3a)$$

The relative permittivity of the object 1660 may then be computed from a measured capacitance using the equation:

$$C = \frac{\varepsilon_0 A}{\frac{d_{object}}{\varepsilon_{object}} + \frac{d_{sensor}}{\varepsilon_{sensor}}} \quad (4)$$

which can be rewritten:

$$\varepsilon_{object} = \frac{d_{object}}{\frac{\varepsilon_0 A}{C} - \frac{d_{sensor}}{\varepsilon_{sensor}}} \quad (5)$$

wherein $d_{sensor}$ is the distance between the electrodes attributable to sensor components, $\in_{object}$ is the relative permittivity of the object 1660, and $d_{object}$ is the distance between the electrodes attributable to the object. If the sensor cells 1611a, 1612a were touching when computing the relative permittivity of the sensor components, then $d_{sensor}$ in equation (3) may be approximately $d_{sensor}$ in equation (5) and $\in_{sensor}/d_{sensor}$ may be directly inserted into equation (5). Distance measurements made according to the previously discussed methods may be used as the distance $d_{object}$. Because all other values are known, $\in_{object}$ can then be computed.

The computation of the relative permittivity may also compensate for air gaps between the sensor cells 1611a, 1612a. The permittivity of an object 1660 with air gaps may be computed according to the equations:

$$\varepsilon_{object} = \frac{1}{1 - \left(1 - \frac{C_{air}}{C_{object+air}}\right)\frac{d_{plates}}{d_{object}}} \quad (6)$$

wherein the permittivity of air is assumed to be one, $p_{plates}$ is the distance between the plates including both the air gap and width of the object, $C_{object+air}$ is the measured capacitance with the object 1660 in place, and $C_{air}$ is the measured capacitance at distance $d_{plates}$ with the object 1660 not in place. If $C_{air}$ is not measured, equation 6 can also be computed as:

$$\varepsilon_{object} = \frac{1}{1 - \left(1 - \frac{\varepsilon_0 A}{d_{plates} C_{object+air}}\right)\frac{d_{plates}}{d_{object}}} \quad (6a)$$

Equation 6 can then be combined with equation 4 to compute the relative permittivity while accounting for air gaps and sensor components, yielding the equation:

$$\varepsilon_{object} = \frac{1}{1 - \left(1 - \frac{C_{air}}{C_{object+air}}\right)\left(\frac{d_{walls}}{d_{object}} - \frac{d_{sensor}}{d_{object}\varepsilon_{sensor}}\right)} \quad (7)$$

wherein $d_{walls}$ is the distance between the sensor cell 1611a, 1612a flexible substrate walls (i.e., the sum of $d_{walls}$ and $d_{sensor}$ is the total distance between the electrodes 1631, 1632).

A dissipation factor for the object 1660 may also be measured in some embodiments. The dissipation factor may also be corrected for air gaps and sensor components. For a measurement with air gaps, the dissipation factor can be computed according to the equation:

$$D_{object} = D_{object+air} + \varepsilon_{object}(D_{object+air} - D_{air})\left(\frac{d_{plates}}{d_{object}} - 1\right) \quad (8)$$

wherein $D_{object}$ is the dissipation factor of the object 1660, $D_{object+air}$ is the measured dissipation factor with the object in place, and $D_{air}$ is the measured dissipation factor with the object not in place.

When the size of the air gap and/or size of the object is not known or hard to measure, the permittivity of the object 1660 and/or the dissipation factor may be computed using the Two-Fluid Method. Under the Two-Fluid Method, the capacitance of the object may be measured while in each of two different fluids. Then the capacitance of each individual fluid may be measured. In some embodiments, one of the fluids may be air. The second fluid may be selected to have known and stable dielectric properties and not react with the test object. The dielectric constant of the object may then be computed according to the equation:

$$\varepsilon_{object} = \varepsilon_{air} \frac{C_{object+fluid}C_{object+air}(C_{fluid} - C_{air}) - C_{fluid}C_{air}(C_{object+fluid} - C_{object+air})}{C_{air}(C_{object+air}C_{fluid} - C_{object+fluid}C_{air})} \quad (9)$$

wherein $\in_{air}$ is the relative permittivity of air, $C_{object+air}$ is the measured capacitance of the object when placed in air, $C_{air}$ is the measured capacitance of the air with the object not in place, $C_{object+fluid}$ is the measured capacitance of the object when placed in the second fluid, and $C_{fluid}$ is the measured capacitance of the second fluid with the object not in place.

The calculated relative permittivity of the object 1660 may then be compared to known values to determine the material of the object 1660. The known permittivity values for various materials may be saved in a memory, a database, or the like. Permittivity values for materials may include permittivity values for compounds and/or composite materials. Each material may have a plurality of permittivity values saved for different possible frequencies, temperatures, electrode angles, voltages, and times of exposure to an electric field. Alternatively, permittivity values for a default temperature and/or electrode angle may be saved and permittivity values for other temperatures and/or electrode angles may be computed from the default value. As previously discussed for displacement measurements, continuous monitoring of the electrodes 1631, 1632 during displacement measuring can be used to correct the effect of the angled electrodes on the displacement. The dielectric relaxation and/or dissipation factor for the material may also be calculated and saved in some embodiments.

A most likely material may then be selected by comparing measured values to corresponding saved values to find a best fit and/or minimize the error between the saved values and the measured values. The sensor 1600a may continuously attempt to identify the material starting at lowest possible voltage, current, and frequency values, so as to minimize the amount of energy applied to the object 1660. The voltage, current, and/or frequency may be increased incrementally either separately or together to measure the values of the capacitor as a function of the change in voltage, current, and/or frequency. The sensor 1600a may stop when a certainty or error in its decision reaches a predetermined threshold. In some embodiments, the sensor may use only the lowest possible voltage, current, and frequency to identify the object 1660.

In embodiments, the saved permittivity values may be acquired through direct measurements of known materials using the sensor 1600a. The sensor 1600a may not need to be calibrated in some embodiments when direct measurements of the permittivity values are made. In other embodiments, the permittivity values may be acquired from third parties or measured in a laboratory. Laboratory measurements may be made using an off-the-shelf measurement device, such as Hewlett-Packard's HP 16451B. Alternatively, laboratory measured permittivity values for a plurality of frequencies, temperatures, and exposure times may be stored initially, and measured permittivity values may be used to update corresponding values or may be extrapolated to provide additional values for that material. Permittivity values may be measured for compounds that do not have readily available data.

Measured values may be used to determine deviations from an ideal capacitor, such as leakage; parasitic effects; breakdown voltage; temperature deviations; inherent inductance, resistance, or dielectric loss; and the like. Linear deviations, such as leakage and parasitic effects, can be dealt with by adding virtual circuit components when computing capacitance from measured circuit properties, such as magnitude and/or phase of voltage, current, and the like. Nonlinear deviations, such as breakdown voltage, may be saved separately and referenced when analyzing measured circuit properties. Then, the power source may be controlled to remain below the breakdown voltage. For linear deviations that change the capacitance value, such as temperature, or for parasitic effects that are non-uniform over varying frequency, such as inherent inductance, resistance, or dielectric losses, the deviations can be accommodated by saving the amount of deviation for specific temperature or frequency values and/or by modifying the saved permittivity values. The temperature deviation may be saved as a capacitance deviation of parts per million per degree Celsius and may be negative or positive.

Permittivity values for different purity levels of a material or for objects that have hazardous materials on them may also be saved. The purity level of the object 1660 or existence of hazardous materials may then be monitored continuously throughout the manufacturing process. If the sensor 1600a detects impurities or hazardous material, it may alert an operator or sound an alarm. The dielectric constant of the object 1660 may be that of a chemical compound in these instances.

Once the material of the object 1660 is known, the pressure of a gripper comprising the sensor 1600a may be adjusted to ensure sufficient friction to hold the object while also ensuring the object 1660 is not damaged by the gripper. In some embodiments, the pressure of the gripper may initially be minimal. Then, the sensor 1600a may determine the material of the object. Once the material is known, properties, such as density, compressive strength, wall thickness, and the like for the material may be determined. Material properties may be saved in the memory or database storing the permittivity values. From the determined density, wall thickness, compound, and size measurements of the object 1660, a weight of the object 1660 may be determined. The gripper may then determine the pressure to be applied to the object 1660 and increase the applied pressure to that value. In some embodiments, the gripper may apply the minimum pressure necessary to handle the object 1660. If the minimum pressure necessary to manipulate the object may damage the object 1660, the gripper may notify an operator, nonetheless apply the minimum pressure required for manipulation, and/or apply the maximum pressure that will not damage the object. For operations where the objects 1660 are a known size, a predetermined pressure may be saved.

Some energy may remain in the object 1660 after the voltage differential has been removed from the movable electrodes 1631, 1632 due to polarization of the dielectric. In some embodiments, the stored energy in the object 1660 may be dissipated once the relative permittivity is determined. To do so, the electrodes 1621, 1622, 1631, 1632 may be switched back to measuring displacement. Because both plates of the capacitor are resistively tied to ground, any stored potential energy in the object 1660 may be dissipated. In alternate embodiments, both plates of the capacitor may be switched to ground for a predetermined period of time. If the capacitor remains charged for a long period of time, it may not completely discharge when briefly discharged due to dielectric absorption (also referred to as soakage or battery action). To avoid dielectric absorption, the capacitor may be charged for only a limited time, and/or the length of time for any of the above methods of discharge may be determined based on the length of time the capacitor remains charged.

Figure 16B:
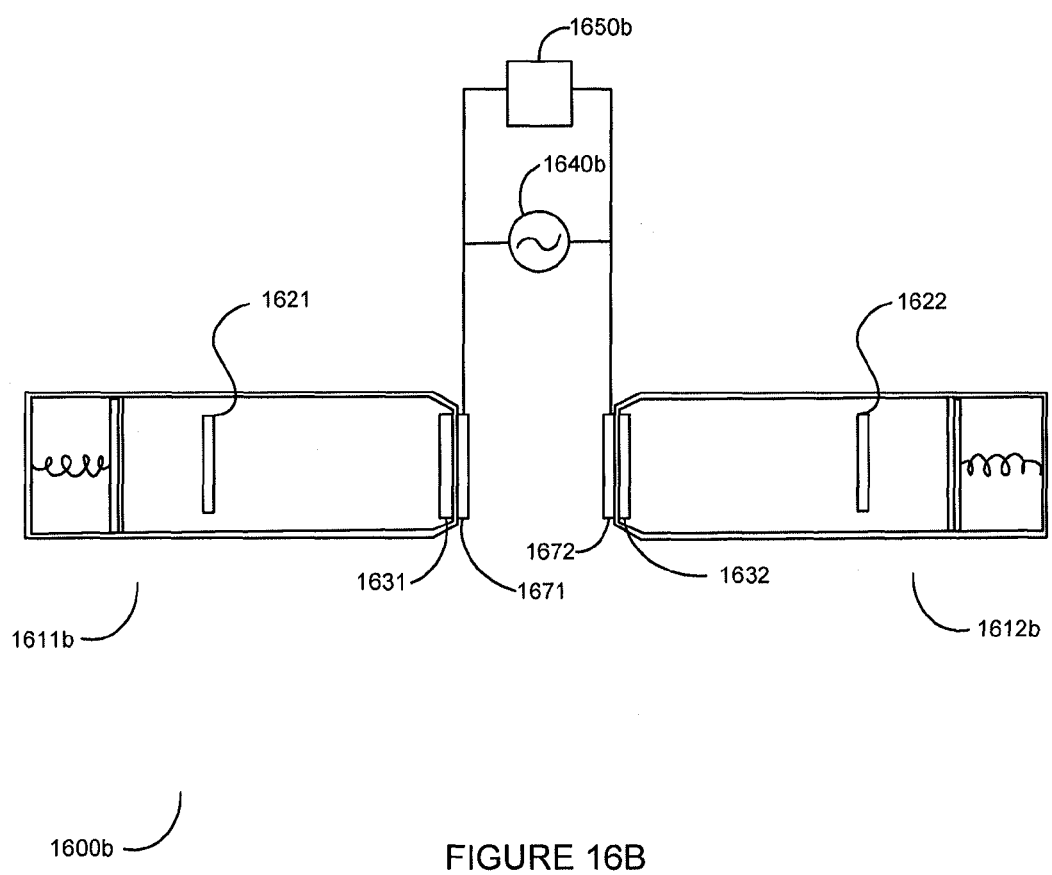
FIG. 16B is a schematic diagram of a resistivity sensor comprising opposing sensor cells.

FIG. 16B is a schematic diagram of a resistivity sensor 1600b comprising opposing sensor cells 1611b, 1612b. The resistivity sensor 1600b may be configured in a manner similar to the relative permittivity sensor 1600a, but each sensor cell 1611b, 1612b may comprise an additional external electrode 1671, 1672. In some embodiments, the external electrodes 1671, 1672 may be thin metal, conductive elastomer, conductive polymer, or thin film on the outside of the sensor cells 1611b, 1612b that can electrically couple to an object (not shown). A power source 1640b and electrical property measuring device 1650b may measure the resistance of the object in any of the manners previously discussed for measuring resistance of the conductive fluid between the electrodes 1621, 1622, 1631, 1632. In some embodiments, the electrical property measuring device 1650b may be used for measuring resistance of the object, measuring permittivity of the object, measuring capacitance between the displacement sensing electrodes 1621, 1622, 1631, 1632 (when a dielectric fluid is used for displacement measurement), and/or for measuring resistance of the conductive fluid between the electrodes 1621, 1622, 1631, 1632. The resistivity measuring device may also be used to discharge potential energy stored in the object due to capacitance measurements.

Once the resistance is measured, the resistivity of the material may computed using the equation:

$$\rho = \frac{RA}{l} \tag{10}$$

wherein $\rho$ is the resistivity of the material, R is the measured resistance, A is the cross-sectional area of the object between the external electrodes 1671, 1672, and $l$ is the distance between the external electrodes 1671, 1672. As with relative permittivity, l is the distance between the external electrodes may be determined from the displacement measurements made according to previously discussed methods. The area may be determined by characterizing the geometry of the object. In some embodiments, one or more additional sensor arrays (not shown) perpendicular to the sensor cells 1611b, 1612b may be used to determine the area of the object. Alternatively, additional sensor cells (not shown) parallel to the sensor cells 1611b, 1612b may use pressure sensors measuring pressure of the conductive fluid to detect the edges of the object. The determined resistivity may be compared to saved resistivity values to identify the object's material in a manner similar to comparing permittivity values. Corrections to the measured resistance may be made for internal sensor component resistances, temperature variations, and the like. Alternatively or additionally, resistivity values for a plurality of temperatures or a temperature coefficient may be saved.

Gallium Oxide Contacts

Gallium Oxide ($Ga_2O_3$) may be used to form a contact to which an electrode may be attached, such as for small sensors on the millimeter to micrometer scale or less. The Gallium Oxide contacts may be used with piston based sensor cells 610 and/or flexible wall sensor cells 110. The Gallium Oxide contacts may be used with sensor arrays with or without internal insulating walls to separate sensors, such as the sensor arrays 1000 or 1100. To create the contact, first, a microfluidic channel, such as a cylinder, chamber, or the like, may be filled with a gallium alloy using an applied pressure from, for example, a pump and/or capillary forces. The microfluidic channel may have at least one opening and may be filled until the gallium alloy reaches the opening.

The area outside the opening may comprise Argon gas to prevent the gallium from reacting with other elements. The pressure applied to the gallium alloy may be kept below a threshold where the gallium alloy would flow beyond the opening. The surface tension of the gallium alloy may form a round shape and/or the gallium alloy may be molded into a desired shape. Gallium oxide may then be caused to form on the gallium alloy. The gallium oxide may be formed through various methods: oxygen may be added to or replace the argon gas and the gallium alloy may be heated while in contact with the oxygen; the gallium oxide may be formed by precipitating neutralization of acidic or basic solution of gallium salt; gallium nitrate may be thermally decomposed; reaction of trimethylgallium and oxygen may be used to form a thin film of gallium oxide covering the gallium alloy; pure gallium may be used to cover the gallium alloy using sputtering or the like with the gallium oxide formed from the pure gallium; or the like.

Once a sufficiently sized layer of gallium oxide has been formed, a movable electrode may be coated onto the gallium oxide film, and/or the gallium oxide may be used as a movable electrode. In some embodiments, the movable electrode may be subdivided into multiple electrodes sharing the gallium alloy liquid in common. One or more fixed electrodes may be mounted on the other end of the microfluidic channel in a configuration similar to the sensor array 1000 and/or the sensor array 1100. In some embodiments, the electrodes may be tungsten, tantalum, columbium, titanium, molybdenum or the like. The electrodes may be attached using sputtering, ink jet printing, screen-printing, deposition, etching, or the like.

The electrodes may be connected with a wire to an integrated circuit on or off the sensor cell 110, 610 to apply power and/or measure electrical properties of the sensor cell 110, 610. Then, the electrode may be covered with an insulating and nonconductive material to prevent accidental electrical contact. Another layer of gallium oxide may be applied on top of the electrode, or silicon rubber may be applied to the electrode. The gallium oxide or silicon rubber may be added using sputtering, ink jet printing, screen-printing, deposition, etching, or the like. The sensor cells constructed according to this method may be connected in series with additional sensor cells and/or in series with an electric motor and/or configured into modules, such as the touch sensor 700 or the touch sensor 800.

Weight Measurement

The gripper may measure the mass or weight of the object. The mass or a density computed from the mass may allow a more accurate determination of the composition of the object. The gripper may measure the mass by releasing the object on a scale or balance and re-grasping the object once the measurement is complete. Alternatively, the gripper may be integrated into a balance or scale. The weight or mass of the object may be computed by subtracting the weight of the gripper without the object from the weight with the object, zeroing the balance or scale to account for the gripper weight, or the like. The balance or scale may be an analytical balance, an analytical scale, a strain gauge scale, or the like. A strain gauge may comprise a beam with a length-sensitive electrical resistor. Variations in the resistance due to deflections of the beam may be measured to determine the weight or mass.

Packaging of Grippers and Sensors

Various packages are possible for the grippers and sensors discussed herein. In a gripping system, multiple grippers and/or tools may interact with each other. For example, one gripper may hold an object while another gripper performs a manufacturing operation on the object. The manufacturing operation may be screwing two objects together, inserting the object into something else, or other specific manufacturing operations. Alternatively, one gripper may transfer an object to another specialized gripper to perform a specific operation. For example, an object may be grasped from the outside by a first gripper and then transferred to a gripper that grasps from the inside, which will allow for insertion of the object and the like.

In some embodiments, the gripper may be packaged to perform a predetermined operation. In other embodiments, the packaging may be designed to perform a more universal functionality. The packaging for the gripper may be similar to a human hand in shape and/or function. For a hand shaped gripper, sensors may be embedded into the fingers and palm. Alternatively, the sensors may be mounted on a holding fixture to indicate the object's location. Various tasks may be performed by a gripper with predetermined packaging or a universally packaged gripper, such as grasping, securing, measuring, manipulating, and/or recognizing object. Various properties may be measured to recognize the object, such as dimensions, weight or mass, dielectric constant, dissipation factor, dielectric relaxation, resistivity, and the like. Such measurements may allow for a good approximation of the object's properties, which may allow for more accurate manipulation. Multiple sensors may share a common conductive fluid and/or insulating flexible walls in some embodiments. By using a single insulating flexible wall over many cells, pistons and shafts of movable electrodes may be stabilized, contaminants may be eliminated between sensors, and performance of a robotic hand may be improved. Alternatively, or in addition, the contact cells may be stacked closely together to eliminate contaminants and reduce the area of the sensor walls that contain the sensors and do not perform electrical functions. The walls of the sensors may be minimized to minimize the area between electrical sensors.

Figure 17:
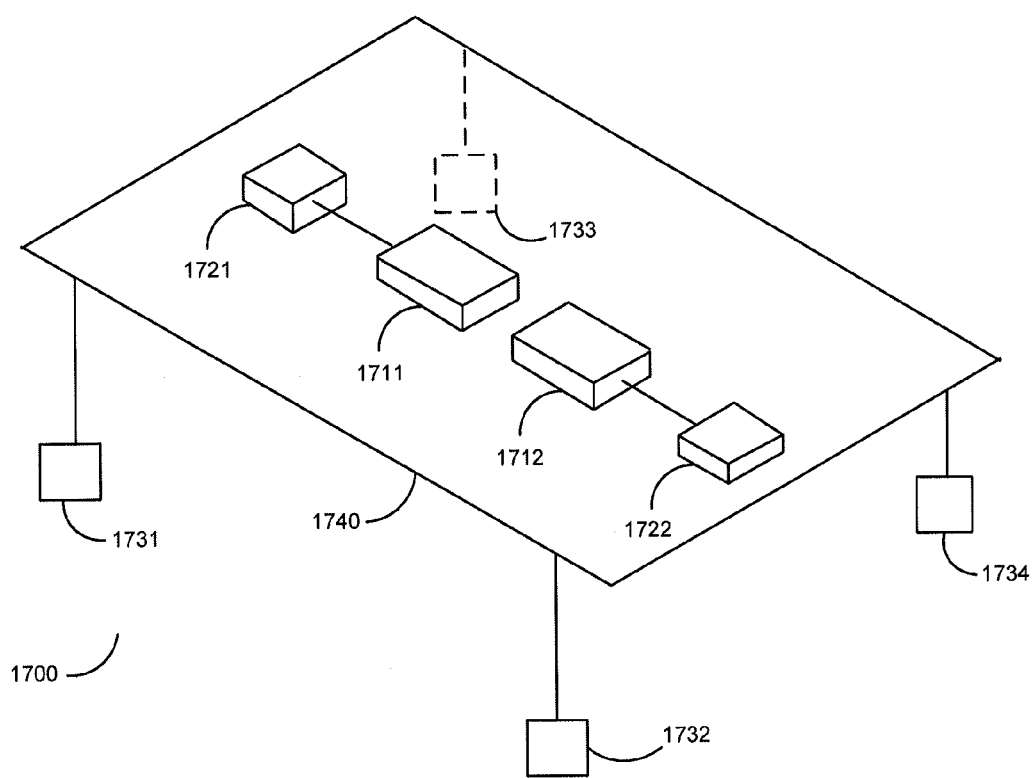
FIG. 17 is a schematic diagram of a gripper package comprising electric motors in series with displacement sensors.

FIG. 17 is a schematic diagram of a gripper package 1700 comprising actuators 1721, 1722 (e.g., electric motors, linear hydraulic actuators, or the like) in series with displacement sensors 1711, 1712. In the illustrated embodiments, there may be two displacement sensors 1711, 1712 and/or arrays of displacement sensors and two corresponding actuators 1721, 1722, but one to six displacement sensors or more, each containing one or more modules and/or each with corresponding electric motors, may be used in other embodiments. The actuators 1721, 1722 may be electric motors able to position the displacement sensors 1711, 1712 very accurately with lead screws through small incremental movements of measurable displacements. The actuators 1721, 1722 and displacement sensors 1711, 1712 may be mounted on a rotating indexing table and/or a table 1740 that can adjust the angle of the object. Actuators 1731, 1732, 1733, 1734 (e.g. electric motors) located at the edges of the table 1740 may adjust the table 1740. Such tables may be available from Hass Automation Inc. and IntelLiDrives Inc.

The distance of the movement of the lead screw may be added to the movement of the displacement sensors to compute the total movement of each sensor. The displacement sensors 1711, 1712 may comprise multiple sensor cells in parallel and series with each other, and the sensor cells in series may be summed to compute the movement of the displacement sensors. The total displacement may be used to calculate the geometry of an object being grasped. For very small objects, including microelectromechanical systems (MEMS) and microfluidic devices, the displacement sensors 1711, 1712 may comprise a single layer of sensor cells. The sensor cells in the single layer may share a single flexible wall subdivided into multiple electrodes as illustrated in FIG. 11. Feedback from pressure sensors in the displacement sensors 1711, 1712 and/or the displacement calculations may be used to accurately control movement of the actuators 1721, 1722, such as electric motors and lead screws, to a millionth of an inch. Calibration and measurements may be performed in a manner similar to method 900.

In other embodiments, the displacement sensors 1711, 1712 may be attached to the end of robotic arms (not shown) as end effectors. The robotic arms may be able to move the displacement sensors 1711, 1712 to multiple locations on an object. This may allow displacement measurements to be made around the entire object to completely map the surface of the object. Alternatively, measurements may be made until a material of the object is determined. A rotating indexing machine (not shown) may also or alternatively be used to rotate the displacement sensors 1711, 1712 and/or the object for measuring and manipulation. For rotating robotic arms, the distance displaced by the displacement sensors 1711, 1712 through robotic arm movement may be computed according to the equation:

$$S = \theta r \quad (11)$$

wherein S is the distance displaced, θ is the angle in radians, and r is the radius of the rotation. The net displacement in two orthogonal axes may be computed according to the equations:

$$S_x = r \cos \theta \quad (12a)$$

$$S_y = r \sin \theta \quad (12b)$$

wherein $S_x$ is the net displacement in a first axis and $S_y$ is the displacement is the net displacement in a second orthogonal axis. Robotic arms may be available from KUKA Robotics Corp., Yaskawa Motoman Robotics, and FANUC Robotics, and indexing machines may include the TR Series from Ganro Industrial Corp. Alternatively, a radially moving hydraulic joint may be used.

The displacement sensors 1711, 1712 may also be incorporated into the hands (not shown) of a robot (not shown). The sensors may be located on all sides of the robotic hands. Two hands from separate arms may be used to enclose an object for pattern recognition, displacement measurements, capacitance measurements, and material determinations. The hands may further comprise fingers (not shown) that can be inserted into smaller places. In some embodiments, the hands and/or fingers on each hand may directly oppose one another to make measurements. In other embodiments, the hands and/or fingers may be at known angles. For performing capacitance measurements and the like, circuits from each hand may run to a common location, such as a controller or base station (not shown) to complete the circuit.

Figure 18:
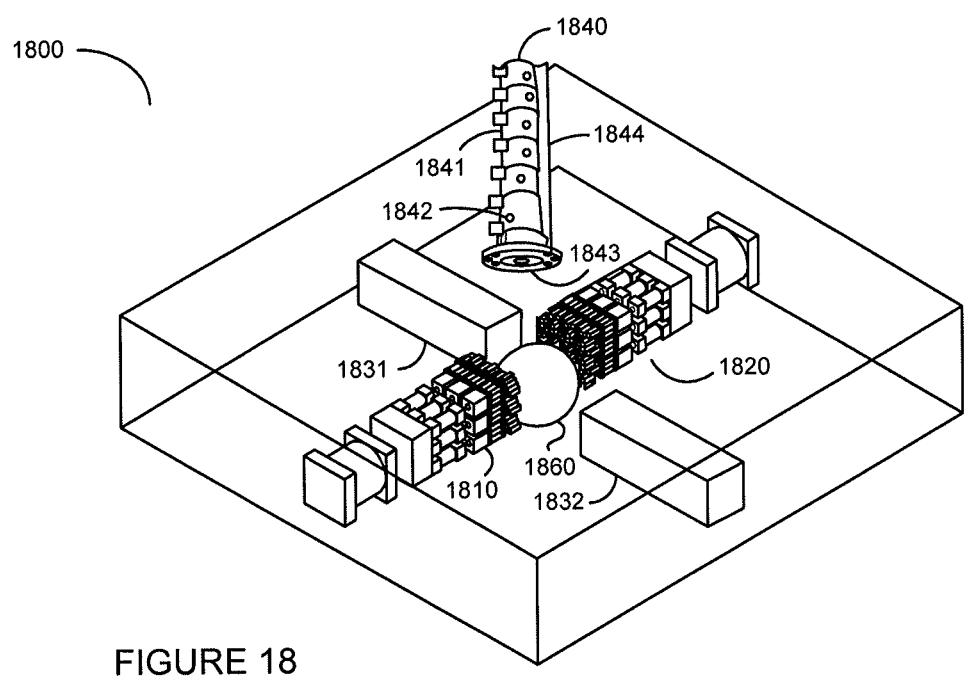
FIG. 18 is a side view of a quick-release gripping system with a cross-sectional view of a rotary joint.

FIG. 18 is a side view of a quick-release gripping system 1800 with a cross-sectional view of a rotary joint 1840. A fixed dimension gripper may comprise a pair of gripping sensor arrays 1810, 1820 with a maximum opening into which an object 1860 may be inserted. The fixed dimension gripper may grip the object 1860 from the inside or from the outside. The fixed dimension gripper may further comprise object constraining blocks 1831, 1832. In other embodiments, the object constraining blocks 1831, 1832 may be replaced by additional gripping sensor arrays 1810, 1820.

The rotary joint 1840 may be used to deliver a fluid to the object 1860 and/or to control the hydraulic cylinders in the sensor arrays 1810, 1820. The fluid may be water, oil, paint, conductive fluid, dielectric fluid, or the like. The rotary joint 1840 comprises a sheath 1844 with stationary inlets 1841 into which fluids may be input from stationary sources. Rotational outlets 1843 may output the fluids to the object 1860, and/or fluid transfer may be used in the sensors or grippers 1810, 1820. The rotational outlets 1843 may be rotated without disrupting the flow of fluids. Conversion holes 1842 may rotate with and transfer fluid to the rotational outlets 1843 while also accepting fluids from the stationary inlets 1841 via cyclical chambers. In embodiments, the rotary joint 1840 may also be able to transfer electrical or optical power including data using silver coated ball bearings, wire brush, conductive rings, liquid metal, or the like. Exemplary rotary joints 1840 may be the FO197 from Moog Corporation or Multiple Passage Systems from Rotary Systems, Inc.

Figure 19:
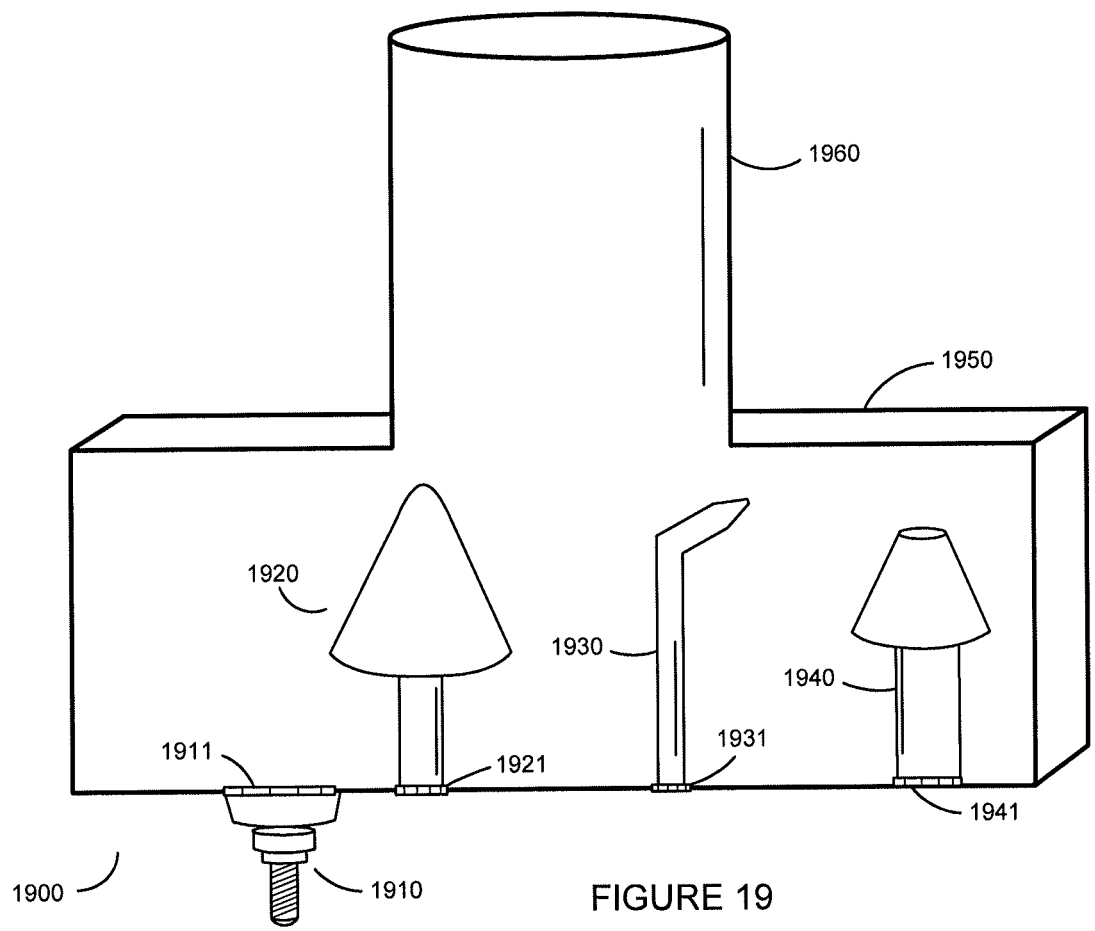
FIG. 19 is a side view of a quick-change turret that may comprise a rotary joint.

FIG. 19 is a side view of a quick-change turret 1900 that may comprise a rotary joint 1840. The quick-change turret 1900 may comprise a plurality of tools 1910, 1920, 1930, 1940, such as a drill 1910, a deburring tool 1920, a welding unit 1930, a fluid nozzle 1940, end mills (not shown), vacuum grippers (not shown), conventional grippers (not shown), and the like, to operate on an object. The tools 1910, 1920, 1930, 1940 may be exchanged with the quick release gripping system 1800 within a robotic arm. One gripper, such as gripper 700, 800b, 1100, 1700, 1800, or the like, may secure an object while the robotic arm uses the tools 1910, 1920, 1930, 1940 to perform operations on the object. It will be understood by those of skill in the art that several grippers and/or robotic arms may operate on a single or multiple objects at the same time and that grippers may be exchanged for tools.

The tools 1910, 1920, 1930, 1940 may be located on a turret head 1950, while a neck 1960 may comprise a rotary joint 1840. In some embodiments, the quick-change turret 1900 may further comprise one or more gripping sensor arrays. In some embodiments, a quick-release gripping system 1800 may act as a vice while the quick-change turret 1900 operates on the object or transfers tools to another gripper for operations on objects. If the quick-change turret 1900 comprises gripping sensor arrays, the quick-change turret may insert the object in and remove the object from the quick-release gripping system 1800. For a quick-change turret 1900 with gripping sensor arrays, a rotary joint 1840 for the quick-change turret 1900 may be required to rotate in at least one axis, transfer electrical power, transfer fluid, transfer data, open and close the gripper, and the like.

A tool 1910, 1920, 1930, 1940 may be selected by rotating to the proper tool and/or by folding down the tool of interest using hinges 1911, 1921, 1931, 1941. Tool selection may be controlled hydraulically, electrically, and/or pneumatically. A processor (not shown) may control operation of the quick-change turret 1900 including positioning and which tool 1910, 1920, 1930, 1940 to use. As a gripping system 1800 grasps and recognizes an object or is exchanged for a tool 1910, 1920, 1930, 1940, the processor may determine which tool 1910, 1920, 1930, 1940 to use and begin operating on the object, which may be held by another gripper. The gripping system 1800 may be exchanged for a tool 1910, 1920, 1930, 1940, or the gripping system 1800 may grasp a tool 1910, 1920, 1930, 1940.

Figure 20:
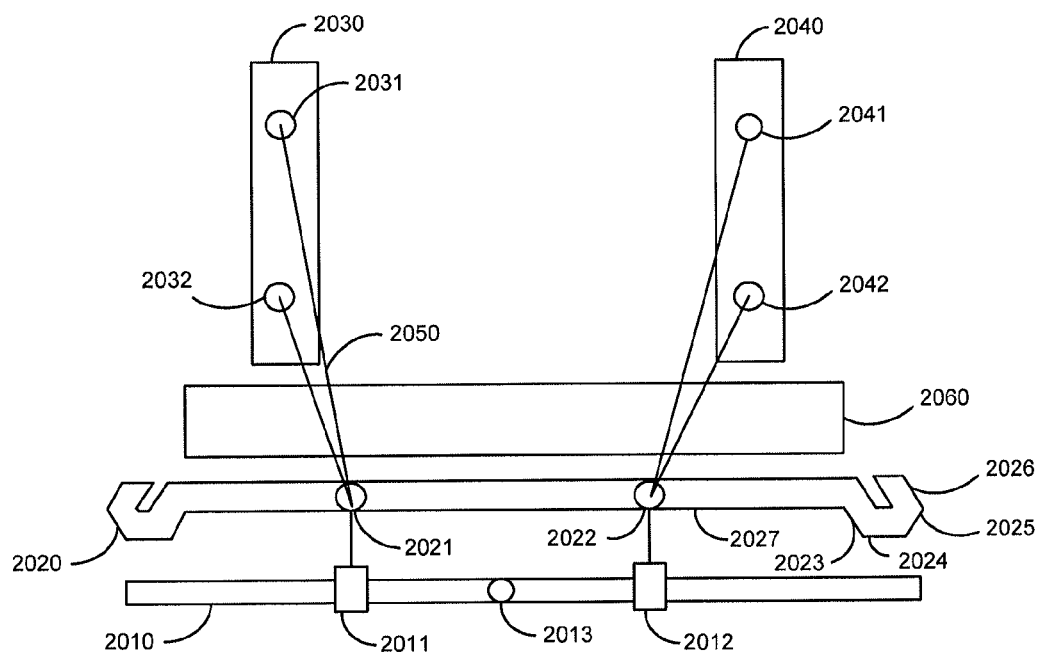
FIG. 20 is a cross-section view of a cam driven robotic gripper with a cam guide for manipulating gripping sensor arrays.

FIG. 20 is a cross-section view of a cam driven robotic gripper 2000 with a cam guide 2020 for manipulating gripping sensor arrays 2030, 2040, 2060. The gripping sensor arrays 2030, 2040, 2060 may comprise two cam-controlled jaws 2030, 2040 that grip with a base 2060. To manipulate the jaws 2030, 2040, an electric motor 2013 may turn a lead screw 2010. Two oppositely threaded nuts 2011, 2012 may move towards each other or away from each other depending on the direction the electric motor 2013 turns. Additionally or alternatively, the lead screw 2010 may have opposite threads on each side of its center point. The nuts 2011, 2012 may be attached to guide pins 2021, 2022 or guide balls located within the cam guide 2020. The guide pins 2021, 2022 also may be moved towards or away from each other with the operation of the electric motor 2013. Alternatively, the jaws 2030, 2040 may be manipulated by hydraulic displacement sensors, such as the sensor 600, to move the cam guides 2021, 2022, and the nuts 2011, 2012 may or may not be connected to the end of the piston shaft. One or more connecting lines 2050, such as wire, hinges, metal, or the like, may connect the guide pins 2021, 2022 to the jaws 2030, 2040 using bolts 2031, 2032, 2041, 2042, screws, pins, or the like. The connecting lines 2050 may be complex hinges that comprise multiple joints.

Different sections 2023, 2024, 2025, 2026, 2027 of the cam guide 2020 may be configured to angle the jaws 2030, 2040 in different directions. For example, when the guide pins 2021, 2022 are in section 2027, the jaws 2030, 2040 may be at a 90 degree angle to the base 2060. As the guide pins 2021, 2022 pass through section 2023, the jaws 2030, 2040 may rotate until they are parallel with the base 2060. In section 2024, the jaws 2030, 2040 may move laterally while continuing to be parallel with the base 2060. Section 2025 may move the jaws 2030, 2040 rotationally to return them to a 90 degree angle relative to the base 2060. Finally, section 2026 may cause the jaws 2030, 2040 to return to parallel with the base 2060 and to close on the base 2060 so sensors in the sensor arrays 2030, 2040, 2060 are completely covered.

Different sections 2023, 2024, 2025, 2026, 2027 may allow the gripper 2000 to perform different functions. For example, while the jaws 2030, 2040 are at 90 degree angles in section 2027, the gripper 2000 may be able to close on an object and hold it like a vice. In section 2024, when the jaws 2030, 2040 may be parallel to the base 2060, the gripper 2000 may be able to interact with another gripper (not shown) to grasp an object too large for the gripper 2000 to hold by itself. By returning the guide pins 2021, 2022 to section 2023 while grasping the large object, the jaws 2030, 2040 can be angled to improve the grip on the object. Pressure sensors in the sensor arrays 2030, 2040, 2060 may ensure that pressure is distributed evenly on the object, which will make the gripper 2000 self-centering. During section 2026, when the sensors are covered, the sensor arrays 2030, 2040, 2060 may be protected from damage or contamination. In some embodiments, there may be more than one cam guide 2020, such as a cam guide (not shown) on the lower end of the jaws 2030, 2040, which may have angles to account for the turning of the jaws 2030, 2040. The jaws 2030, 2040 can be further separated into separate fingers (not shown), which may be controlled by hydraulically, pneumatically, electrically, or the like. The fingers may move independently or together to grasp smaller objects or perform intricate operations before or after the gripper has identified the object being manipulated.

Figure 21A:
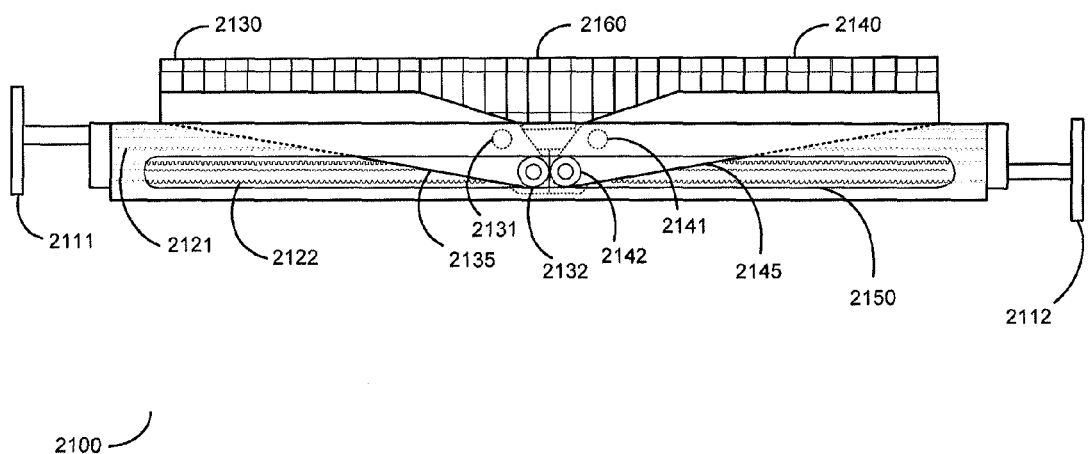
FIGS. 21A and 21B are side perspective views of a robotic gripper when side sensor array panels are in a flat position.
Figure 21B:
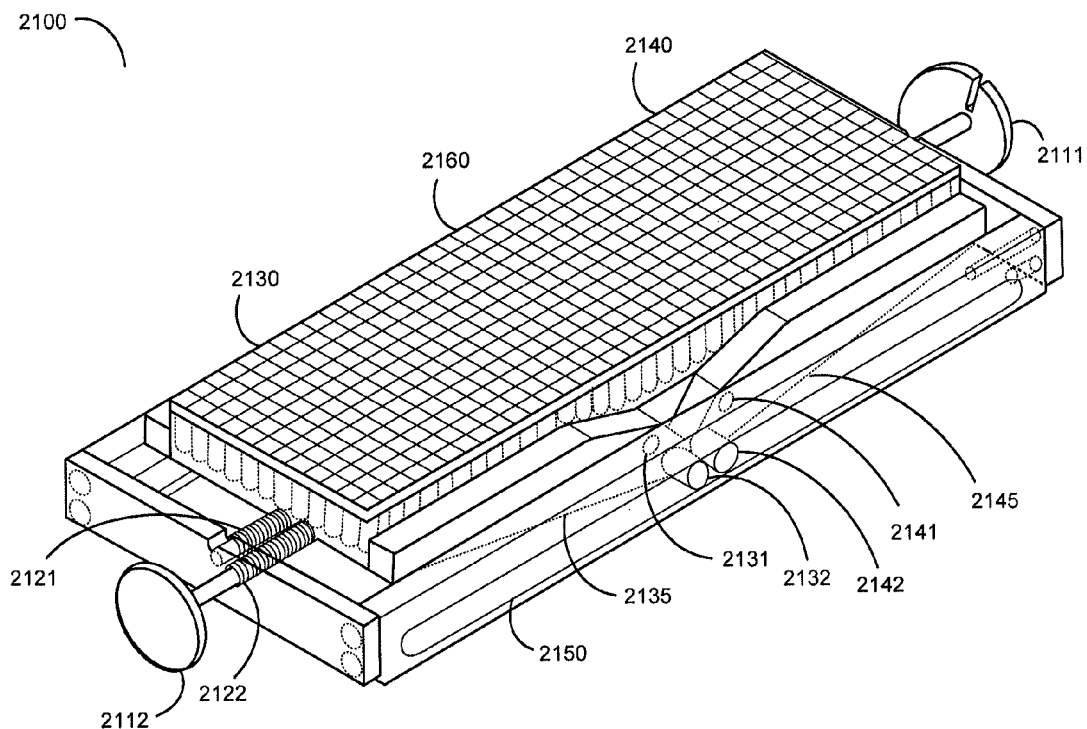
Figure 22A:
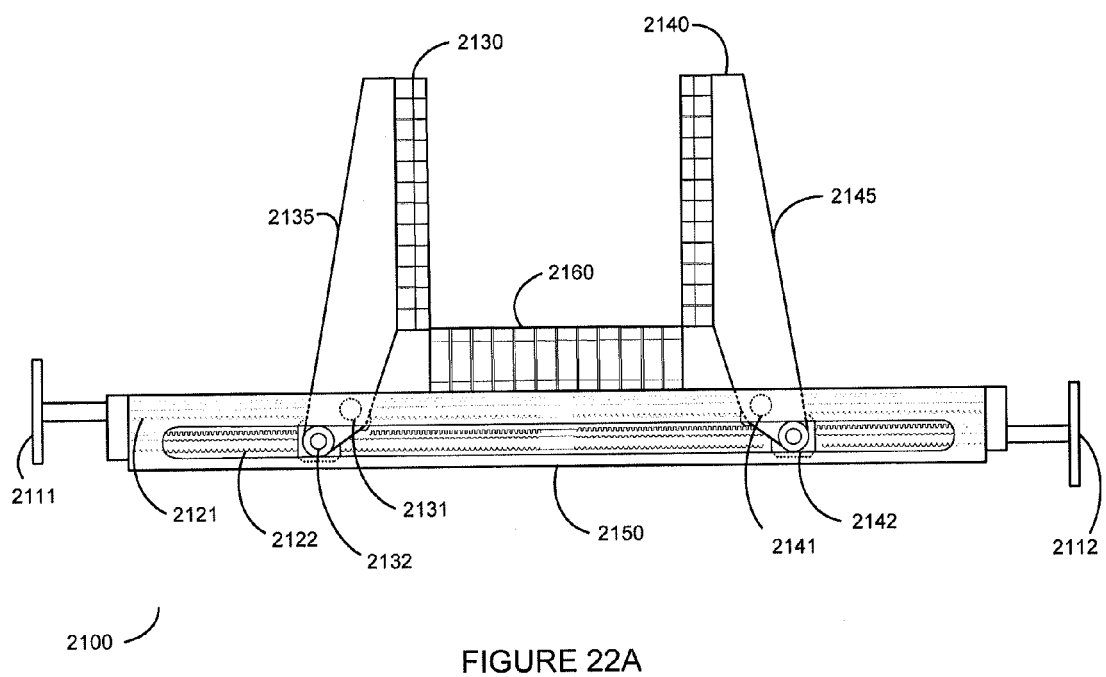
FIGS. 22A and 22B are side perspective views of the robotic gripper when the side sensor array panels are perpendicular to the bottom sensor array panel.
Figure 22B:
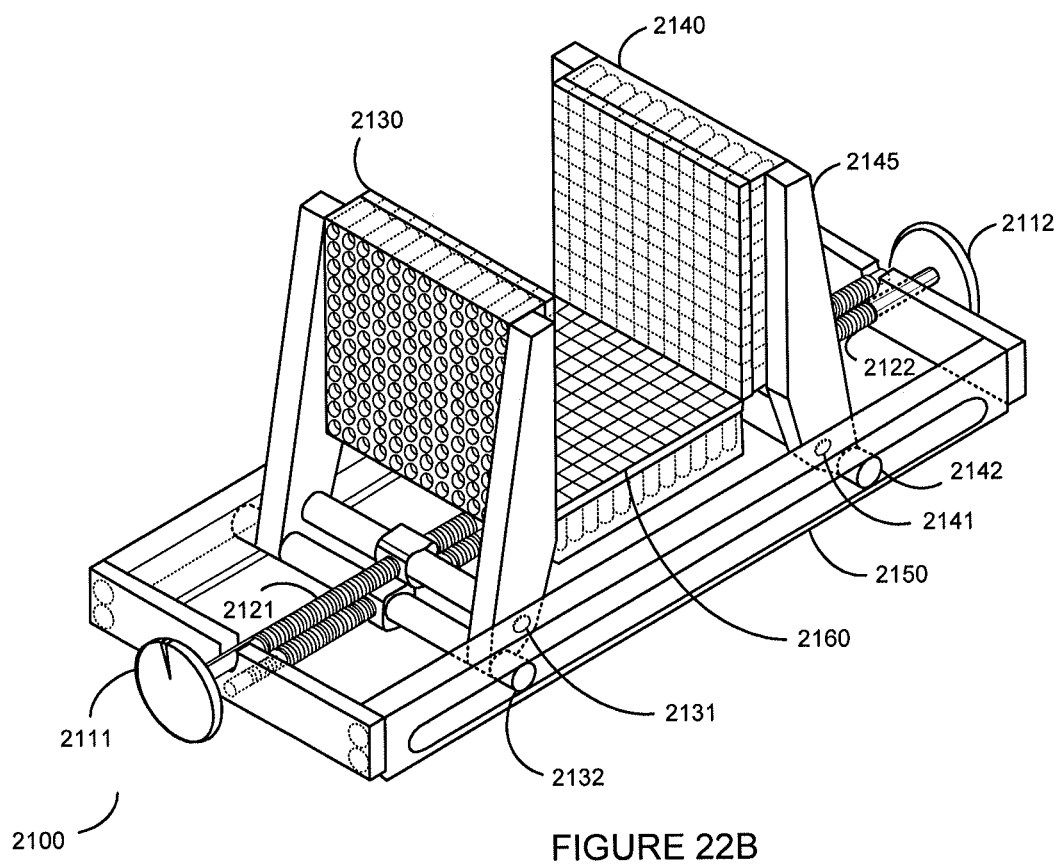
Figure 23:
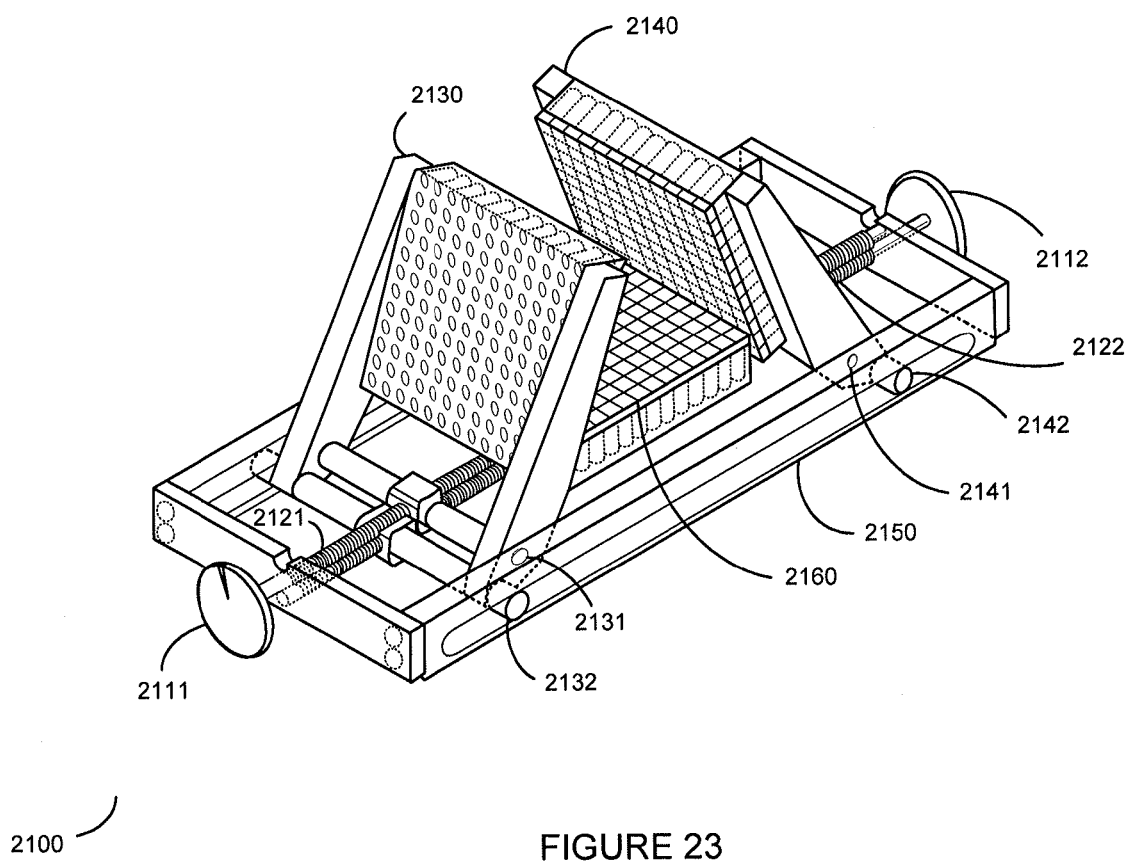
FIG. 23 is a side perspective view of the robotic gripper when the side sensor array panels are in an acutely angled position.

FIGS. 21A, 21B, 22A, 22B, 23 are side perspective views of a robotic gripper 2100 comprising lead screws 2121, 2122 to adjust the position of sensor array panels 2130, 2140, 2160. In some embodiments, the lead screws 2121, 2122 may be pistons of a linear hydraulic actuator. FIGS. 21A and 21B are side perspective views of the robotic gripper 2100 when the side sensor array panels 2130, 2140 are in a flat position. FIGS. 22A and 22B are side perspective views of the robotic gripper 2100 when the side sensor array panels 2130, 2140 are perpendicular to the bottom sensor array panel 2160. FIG. 23 is a side perspective view of the robotic gripper 2100 when the side sensor array panels 2130, 2140 are in an acutely angled position. In the illustrated embodiment, knobs 2111, 2112 control the turning of the lead screws 2121, 2122. In alternate embodiments, motors, cranks, pulleys, or the like may be used to turn the lead screws 2121, 2122, and/or hydraulic cylinders, pistons, and shafts may be used instead of or in addition to the lead screws 2121, 2122. A processor (not shown) may control movement of the lead screws 2121, 2122. The processor may secure an object (not shown) with the gripper and use information gathered from the sensor array panels 2130, 2140, 2160 to determine how to operate on the object with another gripper and/or tool (not shown).

The lead screws 2121, 2122 may be coupled to the side sensor array panels 2130, 2140 by braces 2135, 2145. Both lead screws 2121, 2122 may be turned simultaneously in a similar direction to cause the braces 2135, 2145 and the side sensor array panels 2130, 2140 to move laterally towards or away from the bottom sensor array panel 2160. Both lead screws 2121, 2122 may be turned in contrasting directions and/or only one lead screw 2121, 2122 to cause the braces 2135, 2145 to rotate about respective rotational axes 2131, 2141. The braces 2135, 2145 may rotate the side sensor array panels 2130, 2140 relative to the bottom sensor array panel 2160. Each brace 2135, 2145 may also include a rod 2132, 2142 configured to interface with one or more channels 2150. The one or more channels 2150 may support the rods 2132, 2142 and/or constrain their movement to a desired path.

Integrated Robot Power Source

Mobile robots may be powered by a battery. There may be a tradeoff between the capacity of the battery and the total weight and/or the total volume of the robot. The energy capacity per unit volume of the robot may be referred to as its energy density and the energy capacity per unit mass of the robot may be referred to as its specific energy density. For some robots, a battery of suitable weight and volume may provide less than an hour of operating time. To save weight and volume, batteries may be incorporated into structural components of the robot to serve a structural function in addition to providing energy. Such incorporation may allow for increased energy density and/or increased specific energy density. For a robot with a predetermined weight and/or volume, the increased energy density and/or specific energy density may translate into an increased operating time. Structural components may comprise skin, walls, skeletal components, and/or the like. Other applications for integrated power sources may include powering electric vehicles. For example, batteries may be included in the vehicle's body panels or frame.

Figure 24A:
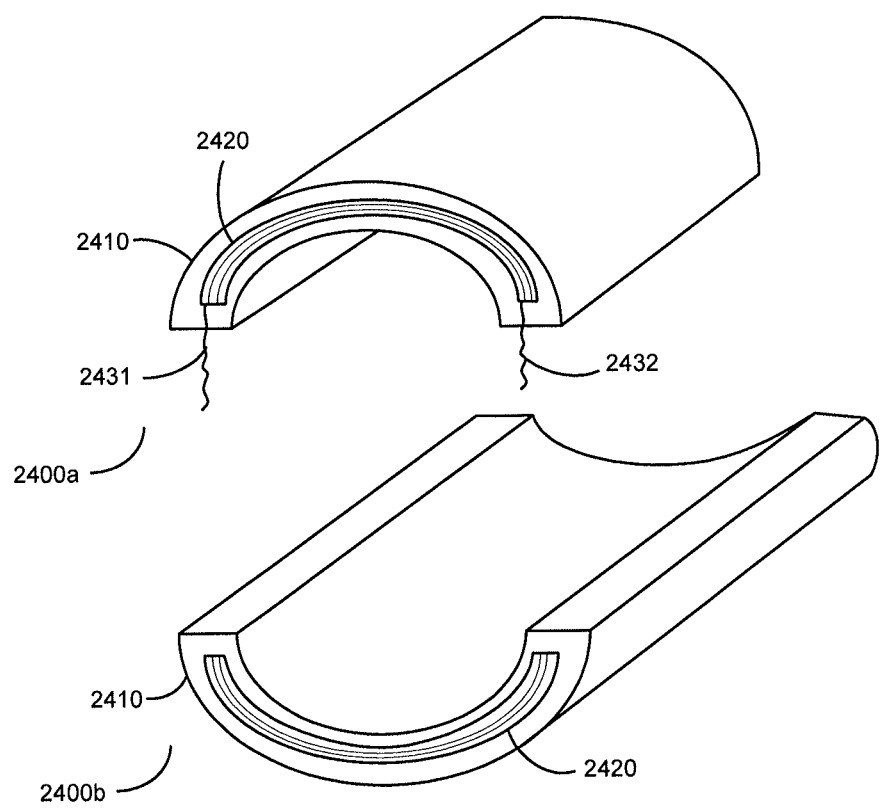
Figure 24B:
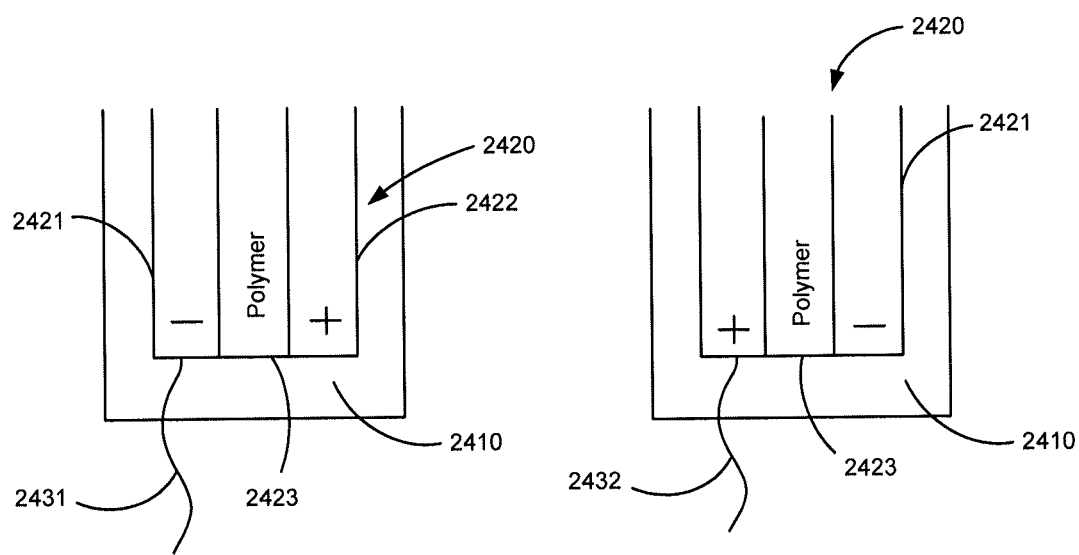

FIGS. 24A and 24B are cross-section views of skin panels 2400a,b configured to power a robot, such as to power a robotic gripper, to power robot mobility, and/or the like. In some embodiments, the skin panels 2400a,b may comprise a battery 2420 to store electricity and provide power when required. The battery 2420 may comprise an anode 2421, a cathode 2422, and a separator/electrolyte 2423. The battery 2420 may be surrounded by a wall 2410 that holds and protects the battery 2420. As a result, separate packaging is not required for the battery 2420, which can save weight and space and produce a high energy density and/or a high specific energy density for the robot.

Wires 2431, 2432 may connect the battery 2420 to external components. The wires 2431, 2432 may be connected to both a charging and a discharging apparatus and/or both a charging and a discharging port. The wires 2431, 2432 may connect to other batteries, positive and negative battery contact points, input and output power ports, or robot elements. The wires 2431, 2432 may connect to a quick release contact for external connection of the battery 2420 to other batteries, a charging power source, a discharging power drain, or the like. The wires may be incorporated into a contact element, such as one known to those of skill in the art. In some embodiments, the wall 2410 may completely surround the battery with the wires 2431, 2432 perforating the wall 2410 as the only external connections to the battery 2420.

The skin panels 2400a,b may be molded into a desired shape. For example, the skin panels 2400a,b may be shaped to conform to and encase or cover body parts of a robot, such as the legs, arms, torso, body, or the like. A plurality of skin panels 2400a,b may be fastened to one another to assemble an entire skin to cover the robot. For example, a pair of skin panels 2400a,b may be two halves configured to encircle an individual body part. The skin panels 2400a,b may be fastened together by various methods including screw and bolt, clips, or the like.

The wall 2410 may be rubber, silicon, polymer, polycarbonate polymer, or the like. The wall 2410 may be a flexible wall. The wall 2410 may comprise multiple layers with different layers configured to perform different functions. The materials that the wall 2410 is comprised of may be selected to provide a desired flexibility or rigidity and/or other desired properties. In some embodiments, the battery 2420 may ignite and/or explode when punctured or damaged. Accordingly, the wall 2410 may be configured to flow, elongate, and/or expand to enter and seal any punctures. The sealed punctures may be electrically isolated by the wall 2410 to prevent short circuits between cells or other hazardous conditions. Alternatively, or in addition, the wall 2410 may include an outer layer comprising a polycarbonate resin thermoplastic, such as Lexan®, to prevent punctures or damage to the battery 2420.

In some embodiments, the battery 2420 may be a rechargeable lithium battery, such as a lithium polymer battery, a lithium ion battery, and/or a thin film lithium battery. The battery 2420 may be shaped to conform to the radius and/or angle of a desired body part. The battery 2420 may be formed and shaped by injection molding, deposition, and/or the like. The anode 2421, cathode 2422, and/or separator/electrolyte 2423 may be flexible and/or may comprise a plurality of layers. In some embodiments, the wall 2410 may be formed over the battery 2420. Alternatively, the battery 2420 may be inserted into a preformed wall 2410. The battery 2420 may comprise a plurality of battery cells. The battery cells may be off-the-shelf products, such as those produced by Leyden Energy Inc., Quallion LLC, LG Chem Power, Johnson Controls, or A123 Systems. The battery cells may be wired in parallel and/or series to achieve a desired voltage and energy capacity. Further, batteries 2420 from multiple panels 2400a,b may be wired together in parallel and/or series to increase the voltage and/or energy capacity.

The battery 2420 may include a pressure sensor (not shown) configured to detect increases in pressure, which may be indicative of a dangerous build up of gases. Charging may be interrupted or stopped when the pressure exceeds a predetermined level. The pressure sensor may be piezoresistive, PVDF, hydrostatic, a liquid column, aneroid, Bourdon, diaphragm, bellows, air pressure gradient, optoelectronic, Fabry-Perot, a strain gauge, a Pirani vacuum gauge, a capacitive pressure sensor, or the like. The battery 2420 may also or instead include a pressure relief valve (not shown) configured to release gases building up in the battery 2420 when a relief pressure is exceeded. The battery 2420 may include a temperature sensor configured to monitor battery temperature during charging and discharging. The battery-charging profile may be adjusted based on the detected temperature.

Figure 25:
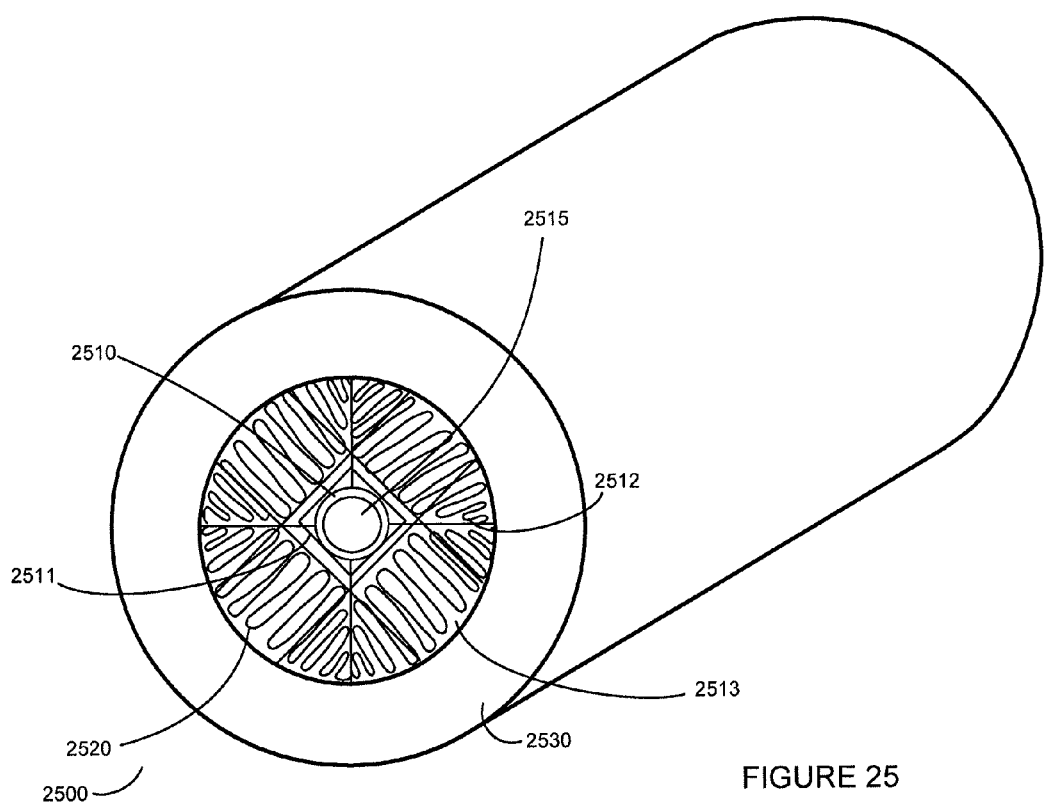
FIG. 25 is a cross-section view of a skeletal component comprising a plurality of integrated batteries.

FIG. 25 is a cross-section view of a skeletal component 2500 comprising a plurality of integrated batteries 2520, 2530. The skeletal component may comprise an inner core 2510 around which the plurality of batteries are wrapped. The inner core 2510 may be elongated and cylindrical, such as tube and/or pipe shaped, in some embodiments. The inner core 2510 may comprise a strong and/or light-weight material such as titanium, tungsten, osmium, carbon fiber, aluminum, magnesium, and/or the like. The high strength material may maintain stability and decrease the possibility of deformation of the inner core 2510.

The inner core 2510 may comprise a hollow interior section 2515 through which wires, fluids, or the like may be passed. Much of the infrastructure for a robot may be incorporated into the inner core 2510 including electric power transfer, fluid power transfer, data transfer, monitoring and control components, and the like. Monitoring and control components may include pressure and/or temperature sensors for the batteries 2520, 2530, multiplexers, fluid flow meters, switches to control charging and discharging of the batteries 2520, 2530, voltage meters for the batteries 2520, 2530, and the like. The wires may couple the batteries 2520, 2530 to electric motors, hydraulic pumps, charging interfaces, processing units, and/or the like, and/or the wires may transmit data between various components of the robot. The fluid may be transmitted by a hard plastic pipe, such as a polyvinyl chloride (PVC) pipe, polycarbonate polymer, or the like, that is encircled by the inner core 2510. The PVC pipe may reinforce the inner core 2510. Alternatively, the fluid may be transferred with no additional tubing. In some embodiments, the inner core 2510 may act as a hydraulic cylinder with a piston and a rod and with fill and drain sections as previously described. Data and power may be transferred via a separate tube, which may or may not be within the inner core 2510 and may run though the center of the piston and shaft if included. The fluid may be pressurized to strengthen the inner core 2510.

The core 2510 may be substantially circumscribed by an inner battery 2520. The inner battery 2520 may substantially conform to the shape of the core 2510. A plurality of base plates 2511 may surround the core to provide support and structure to the inner battery 2520 and the core 2510. Additionally, support plates 2512 may separate the inner battery 2020 into a plurality of sections and/or encase individual battery cells. The base plates 2511 and/or support plates 2512 may also comprise strong and/or light-weight materials such as those previously discussed. An individual battery cell may occupy multiple sections, and/or an entire battery cell may be in a single section. For example, in the illustrated embodiment, four battery cells occupy twelve sections to form the inner battery 2520. In alternate embodiments, twelve separate batteries may be contained in the twelve sections or different desired multiples may be used. The individual sections may be stacked together to encircle the inner core 2510. A fill material 2513, such as a thermoplastic or the like, may fill gaps between battery windings within a section to create a smooth concentric outer surface. In other embodiments, there may be no base plates 2511 and/or support plates 2512, and the inner battery 2520 may be wound concentrically around the inner core 2510. The outer battery 2530 may be wrapped around the smooth concentric outer surface and substantially circumscribe the inner battery 2520. The outer battery 2530 may be enclosed in a casing (not shown). The casing may be a non-conducting material, such as plastic, rubber, or the like. In an embodiment, the outer casing may be a polycarbonate polymer, such as Lexan®.

The outer battery 2530 and/or the cells of the inner battery 2520 may be coupled in series and/or parallel to achieve a desired voltage and/or electrical charge capacity. Similarly, the number of cells or the size of the batteries may be adjusted to achieve a desired capacity. Some batteries, such as lithium or lithium ion batteries, may become dangerously overcharged if the cells are charged unevenly. Accordingly, the batteries 2520, 2530 may be discharged and recharged in a manner that equalizes the voltage among batteries. For example, discharging and recharging may be controlled by power switching between charging and/or discharging individual battery cells. Such power switching may also allow for charging and discharging of cells with different voltages and/or capacities. Each individual battery cell may be controlled by a corresponding switch. Battery cells that are determined to be overcharged may be removed from charging. Overcharging may be detected from voltage measurements, gas pressure measurements, temperature measurements, or the like. Voltage monitoring may be used for applied charging voltage control and/or for regulation of voltage through switching. Control circuitry for charging and discharging may be connected to the batteries 2520, 2530 by wires that pass through the hollow section 2515 of the inner core 2510, and/or the control circuitry may be integrated into the batteries 2520, 2530.

Figures 26A, 26B:
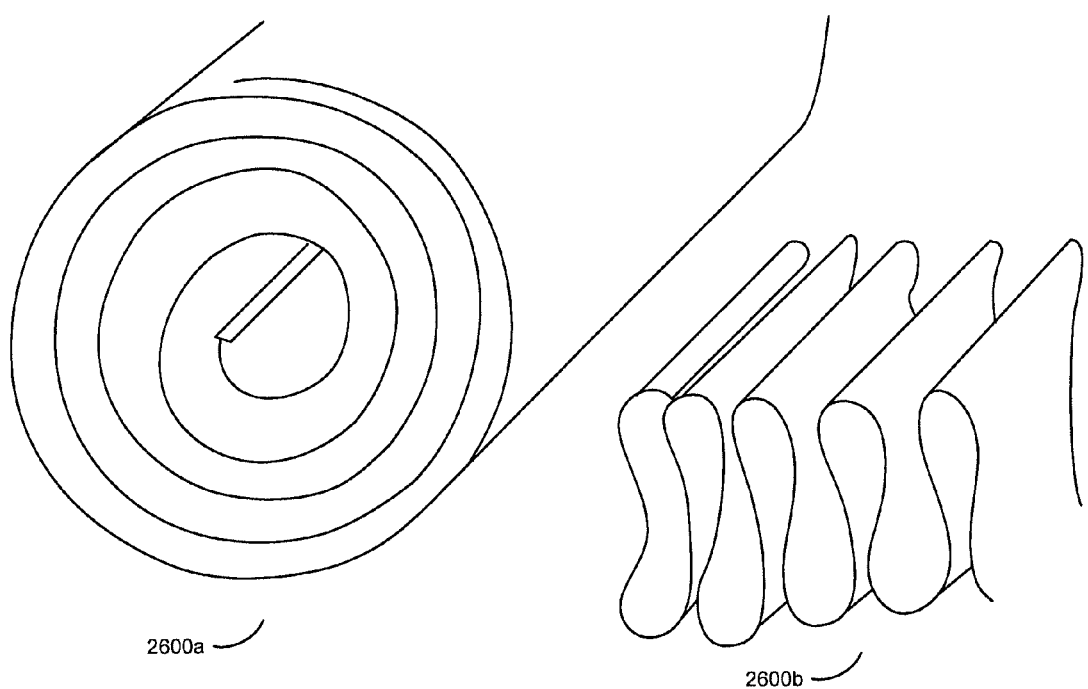
FIGS. 26A and 26B are front perspective views of different types of battery windings.

FIGS. 26A and 26B are front perspective views of different types of battery windings. A concentric battery winding 2600a may be wrapped about itself to form a plurality of layers. Alternatively, a parallel battery winding 2600b may comprise a plurality of substantially parallel, stacked layers. In other embodiments, windings may be perpendicular to each other. The direction of the winding may be referred to as its grain and/or grain structure. The grain structure of the battery windings 2600a, 2600b may be chosen to reinforce and strengthen the skeletal component. In an embodiment, the inner battery 2520 may include the parallel battery winding 2600b, and the outer battery 2530 may include the concentric battery winding 2600a. The winding 2600a of the outer battery 2530 may be substantially perpendicular to those of the inner battery 2520 to increase strength. Alternative battery designs, such as prismatic grids, may also or instead be incorporated into the winding design.

FIGS. 27A and 27B are cross-section views of sections 2700a, 2700b of the inner battery 2520. The windings 2710a, 2710b in each section 2700a, 2700b may be insert molded into that section to most efficiently use the space. The sections 2700a, 2700b may be assembled about the inner core 2710 to form the inner battery 2720. FIG. 27C is a cross-section view of a winding layer 2740 comprising an anode 2741, a cathode 2742, and an electrolyte 2743. Anode and cathode wires 2711a,b and 2712a,b may be coupled to the anode 2741 and the cathode 2742 respectively and may protrude from the sections 2700a, 2700b to provide external connections to the battery cells. The wires 2711a,b and 2712a,b may couple battery cells to each other and/or may connect to other robot components, charging ports, and/or discharging ports. A single pair of negative and positive leads may couple the skeletal component to other robot components, or there may be multiple pairs of leads for the batteries 2520, 2530 or sections 2700a, 2700b. Battery components may be available from Leyden Energy Inc., Quallion LLC, LG Chem Power, 3M, Johnson Controls, and A123 Systems.

The windings 2710a, 2710b may be tightly wound in the sections 2700a, 2700b to most efficiently use the space in the sections 2700a, 2700b and to increase the strength of the skeletal component 2500. The fill material 2513 may add to the strength and density as well as maintain the windings 2710a, 2710b in a tightly wound position. The packing of the sections 2700a, 2700b about the inner core 2510 may also be performed within very tight tolerances to maximize the density and strength of the skeletal component. Additionally, the wires 2711a,b and 2712a,b may be fed through a close tolerance tube or pipe. The tube may be made of a material comprising titanium, graphite, carbon fiber, and/or the like. For lithium polymer or lithium ion batteries, the inner and outer batteries 2520, 2530 may be able to flex thereby absorbing external stresses and reducing stresses on the inner core 2510. Thus, the structural stability of the inner core 2510 may be preserved despite significant flexing or bending of the outer layers of the skeletal component 2500.

Figure 28:
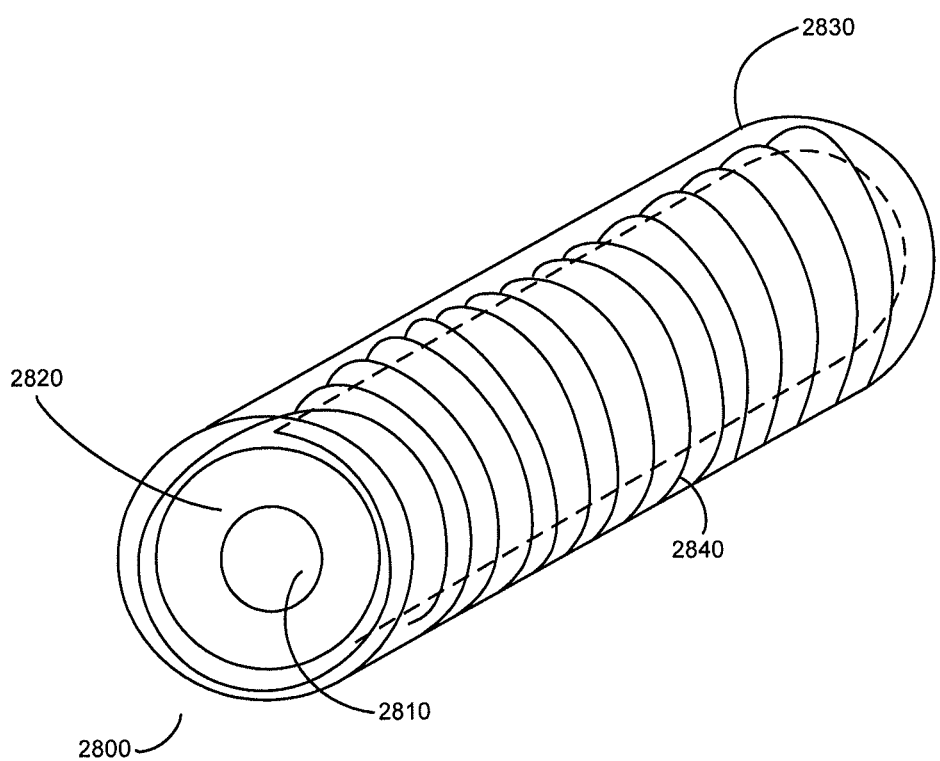
FIG. 28 is a front perspective view of a battery comprising a heating element.

FIG. 28 is a front perspective view of a battery 2800 comprising a heating element 2840. The battery 2800 may have a limited operating temperature range outside of which the performance of the battery degrades. The heating element 2840 may be configured to maintain the battery 2800 within the operating range. For example, the heating element 2840 may be a resistive heating element comprising a resistive wire. Alternatively or in addition, a thermoelectric element may be configured to cool and/or heat the battery 2800.

The heating element 2840 may wrap around the outer battery 2820 but be inside the casing 2830. Alternatively or in addition, the heating element 2840 may wrap around the inner core 2810. The base plates 2511 and/or support plates 2512 may comprise the heating element 2840 in some embodiments, and may be combined with an outer heating element in the casing 2830 to seal the heated battery environment. The heating element may be as close to the battery as possible while still being electrically insulated from the battery. The heating element may be round, such as being helically shaped, or it may also be square, rectangular, or the like. Heating elements 2840 may be used with skin panels comprising batteries and/or skeletal components with batteries.

Additionally, heating elements 2840 may be used with the displacement sensor cells. The precision of the displacement sensor cells may be affected by changes of temperature. Accordingly, the heating elements 2840 may increase the operational range of the gripper by maintaining the gripper at a substantially constant temperature. The temperature control of the gripper may be maintained by heating the conductive or dielectric fluid inside a reservoir, by a heating blanket in contact with the electrodes, and/or with heating elements embedded in the casing or skin of the gripper. For example, the gripper may include resistive wire and/or elements in the fluid reservoir and/or the gripper enclosure. Alternatively, the gripper may grasp a heating element, and/or a heat blanket, heated gloves, or clothing with heating elements may be applied to sections of a mobile robot. Temperature sensors in the gripper contacts, gripper enclosure, battery, joints, and/or the fluid reservoir may monitor the gripper and its components to accurately sense the temperature and allow corrections to the temperature to be made. Alternatively or in addition, for a sensor cell with an electrolyte, conducting fluid, such as a KCl electrolyte, or a dielectric fluid, the operating temperature range may be adjusted by changing the molar concentration of the electrolyte or by the addition of antifreeze.

Joints and Skeletal Components

A skeleton for a robot may include a plurality of joints and skeletal components configured to provide form and structure to the robot. The skeletal components may include an inner core with male and/or female ends. The inner core may couple to and/or include an end cap, couple to other skeletal components, couple to one or more joints, and/or the like. The skeletal component may provide support and allow for the transfer of fluid, electrical power, data, or the like. The joints may couple together skeletal components and allow movement in one or more degrees of freedom. The joints may allow skeletal components to rotate relative to one another in a manner similar to the bones in a human body rotating about a joint. For example, the joints may be configured to move skeletal components in a manner similar to the movement of fingers, elbows, waists, knees, wrists, shoulders, and/or the like. Other joints may also be included to allow the robot to perform any desired movement. The joints may include end caps to allow them to interface with the skeletal components.

Figure 29A:
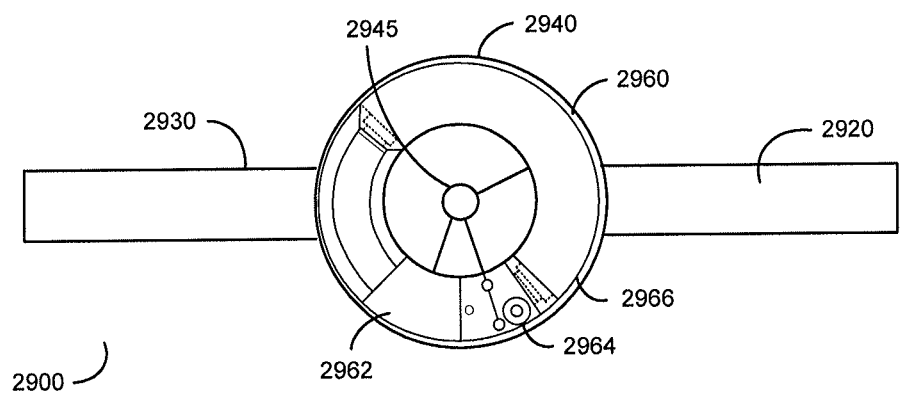
FIGS. 29A and 29B are front and top perspective views of a rotational hydraulic joint.
Figure 29B:
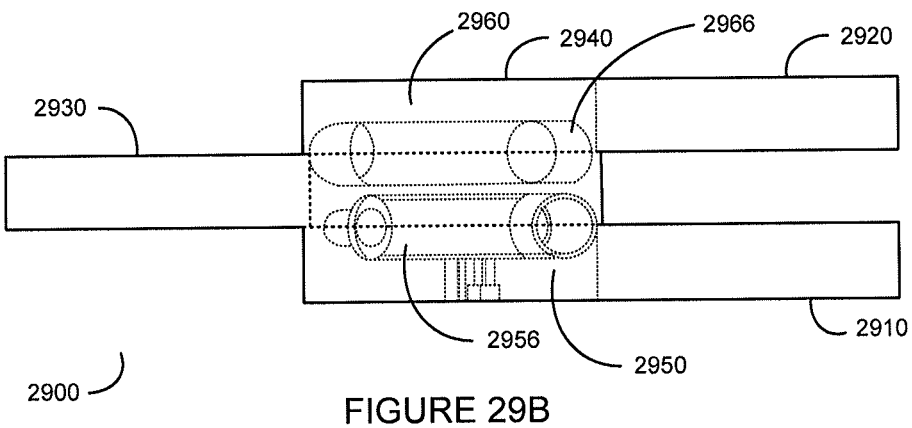

In an embodiment, the robotic joint may be composed of three sections assembled and held together by a rotating connector. The rotating connector may couple and transfer fluid power, electrical power, and/or data. FIGS. 29A and 29B are front and top perspective views of a rotational hydraulic joint 2900. The rotational hydraulic joint 2900 may include a center shaft 2930 and two outer shafts 2910, 2920 extending radially from a cylindrical coupling 2940, which couples the center shaft 2930 to the two outer shafts 2910, 2920. The cylindrical coupling 2940 may allow the center shaft 2930 to rotate relative to the two outer shafts 2910, 2920. The rotational joint may be constructed of a high strength material, such as polycarbonate polymer, titanium, steel, aluminum, or the like.

A pin 2945 through the center of the cylindrical coupling 2940 may be the axis about which the center shaft 2930 rotates. The pin 2945 may be a rotary joint, such as rotary joint 1840, configured to transfer fluid, hydraulic power, electrical power, data, and/or the like between the outer shafts 2910, 2920 and the center shaft 2930. Alternatively, the pin 2945 may be a simple rod that does not transfer any fluid, hydraulic power, electrical power, or data. The pin 2945 may include bearings to facilitate rotation.

The center shaft 2930 may couple to a first skeletal component (not shown) and the outer shafts 2910, 2920 may couple to a second skeletal component (not shown) and allow the skeletal components to rotate relative to one another. The high strength joint 2900 may couple to high strength inner cores of the skeletal components. Alternatively, the center and/or outer shafts 2910, 2920, 2930 may couple to one or more additional joints to create a composite joint with multiple degrees of freedom. The center shaft 2930 may include a male end configured to mate with a female end of a skeletal component, and the outer shafts 2910, 2920 may couple to an end cap with a female end configured to mate with a male end of a skeletal component. Alternatively, the center and/or outer shafts 2910, 2920, 2930 may be configured to mate with male and/or female ends of the skeletal components instead.

Figure 29C:
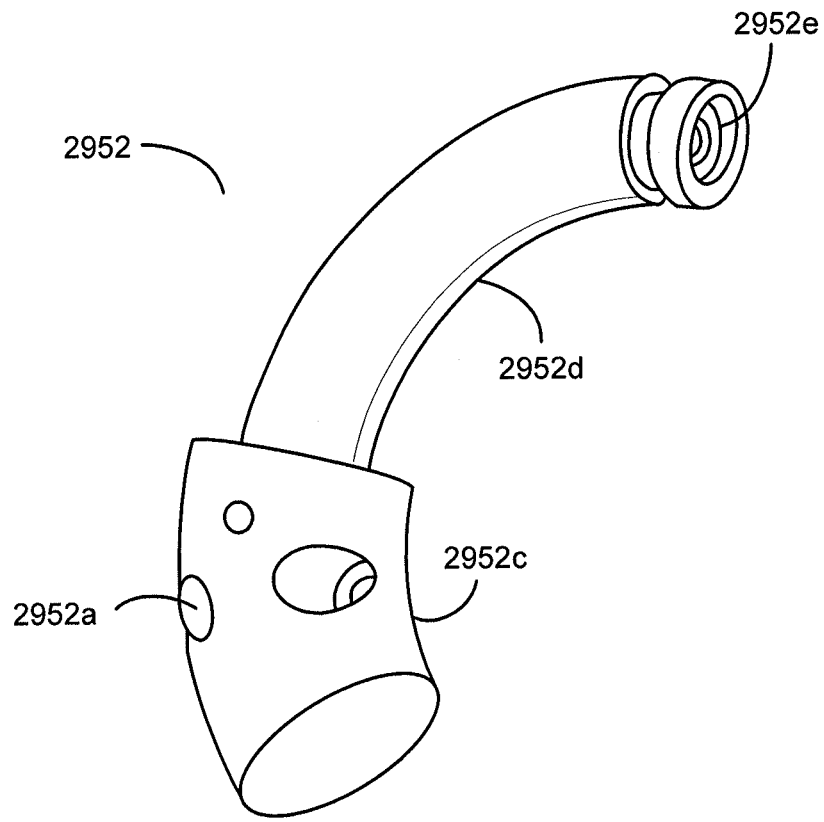
FIGS. 29C and 29D are front perspective views of the piston and the end cap that may be used in a rotational hydraulic joint.
Figure 29D:
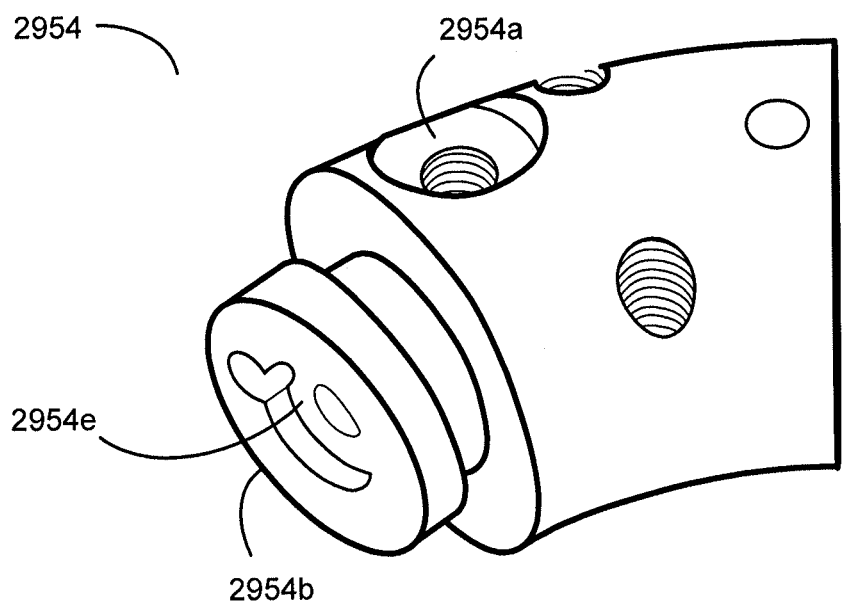
Figure 29E:
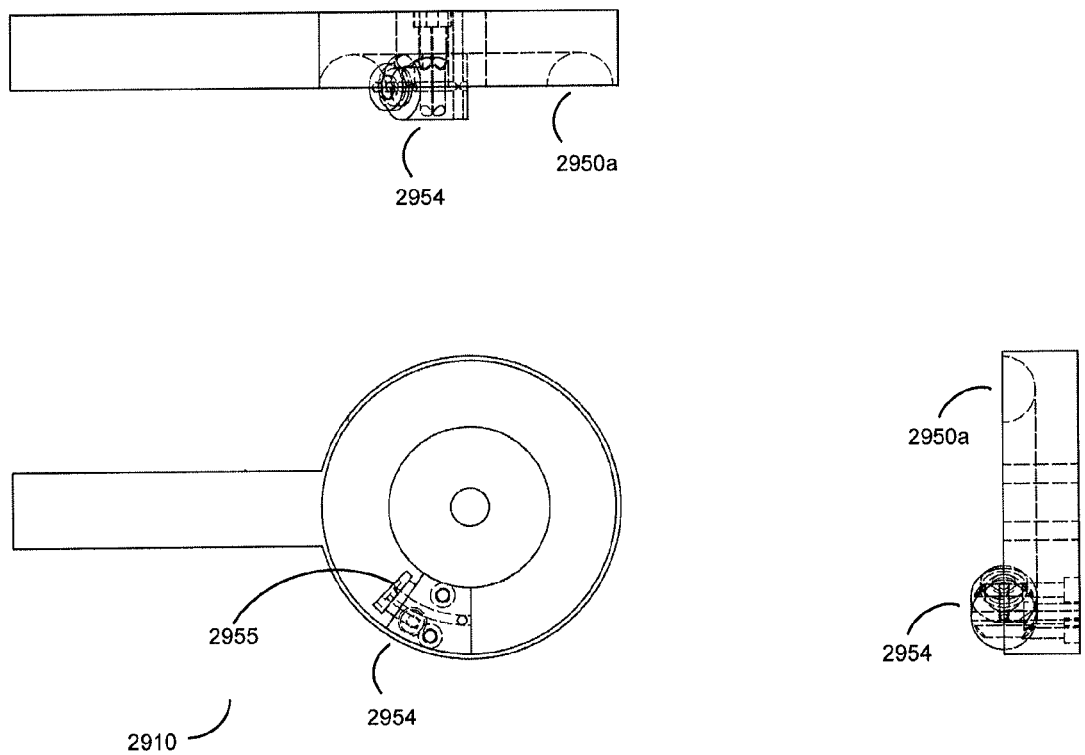
FIGS. 29E-29H are cross-section views of the center and outer shafts and the rotational hydraulic joint assembled therefrom.

The cylindrical coupling 2940 may be hydraulically actuated to cause rotation of the center shaft and may measure the extent of rotation. The cylindrical coupling 2940 may include two torus-shaped cavities 2950, 2960. In other embodiments, the cylindrical coupling 2940 may include one cavity or three, four, or more cavities. The joints may act as two hydraulic cavities 2950, 2960. One cavity 2960 may extend the joint and the other cavity 2950 may retract the joint. Approximately one half of each cavity 2950a, 2960a may be in the outer shafts 2910, 2920, and the mating half for each cavity 2950b, 2960b may be in the center shaft 2930. Pistons 2952, 2962 in each cavity 2950, 2960 may be permanently attached to the center shaft 2930. The center shaft 2930 may be a part of the piston 2952, 2962 and shaft. The center shaft 2930 may be an extension of the piston shaft and piston 2952, 2962. End caps 2954, 2964 may be permanently attached to the outer shafts 2910, 2920. Referring also to FIGS. 29C-F, each cavity 2950, 2960 may include the piston 2952, 2962, the bladder end cap 2954, 2964, and a bladder 2956, 2966. The pistons 2952, 2962, which are illustrated in FIG. 29E, may both be affixed to and/or integrated into the center shaft 2930 to cause the center shaft 2930 to rotate when the pistons 2952, 2962 move within the cavities 2950, 2960. The bladder end caps 2954, 2964, which are illustrated in FIGS. 29C and 29D, may be stationary relative to the outer shafts 2910, 2920. The bladders 2956, 2966 may each be permanently affixed at one end to their respective piston 2952, 2962 and permanently affixed at the other end to their respective bladder end cap 2954, 2964. The bladders 2956, 2966 may be attached and/or sealed to the pistons 2952, 2962 and bladder end caps 2954, 2964 by mechanical means, chemical means, and/or the like.

In the illustrated embodiment, a retraction cavity 2950 may be configured to cause the center shaft 2930 to retract towards the outer shafts 2910, 2920 when the retraction bladder 2956 is filled with fluid, and an extension cavity 2960 may be configured to cause the center shaft 2930 to extend away from the outer shafts 2910, 2920 when the extension bladder 2966 is filled with fluid. In each case, as the bladder 2956, 2966 is filled, the opposing bladder 2956, 2966 may be permitted to empty and compress (not shown). The compressed bladder 2956, 2966 may fold inside itself and around the piston 2952, 2962 as it is compressed. In other embodiments, one cavity may perform both extension and retraction. Smaller joints may have less fluid leakage when two or more cylinders are used. During expansion or compression of the bladders 2956, 2966, the cavities 2950, 2960 may ensure that the bladders 2956, 2966 retain their shape. The bladders 2956, 2966 may be fitted into a sleeve that moves with the bladder to prevent counter rotational friction (not shown). Fill and/or drain ports (not shown) may allow fluid to be added and removed from the bladders 2956, 2966. The fluid may be carried by hoses and/or pipes (not shown) external to the joint 2900 and/or by cavities and/or channels (not shown) in the center and/or outer shafts 2910, 2920, 2930. Thus, movement of the joint and any attached skeletal components may be controlled via hydraulic actuation.

The cavities 2950, 2960 may each form a hydraulic measuring cell. The pistons and shafts 2952, 2962 may each include a movable electrode 2953, 2963, and the bladder end caps 2954, 2964 may each include a fixed electrode 2955,

2965. The movable electrodes 2953, 2963 may move along circular paths defined by the cavities. The bladders 2956, 2966 may fill with conductive or dielectric fluid. The bladders 2956, 2966 may reduce leakage of the fluid and electrically insulate the fluid from the walls of the cavities 2950, 2960, which may allow the walls to include high-strength, lightweight metals. Variations in the resistance and/or capacitance between the movable electrodes 2953, 2963 and the fixed electrodes 2955, 2965 may be measured to determine the distance between the electrodes 2953, 2955, 2963, 2965 in the manner discussed above.

Figure 29F:
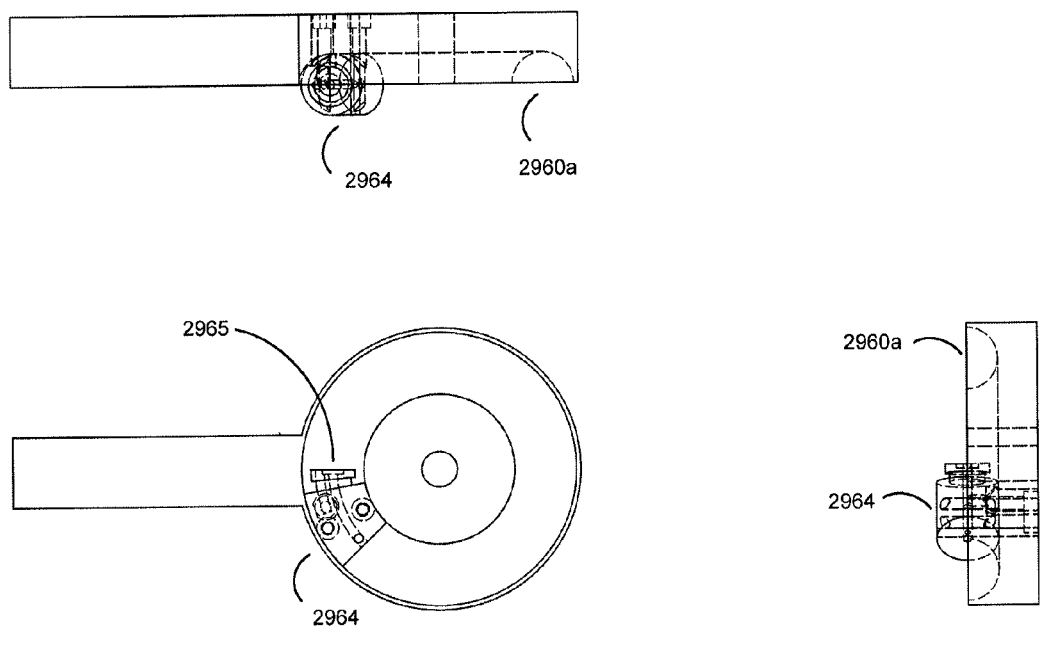
Figure 29G:
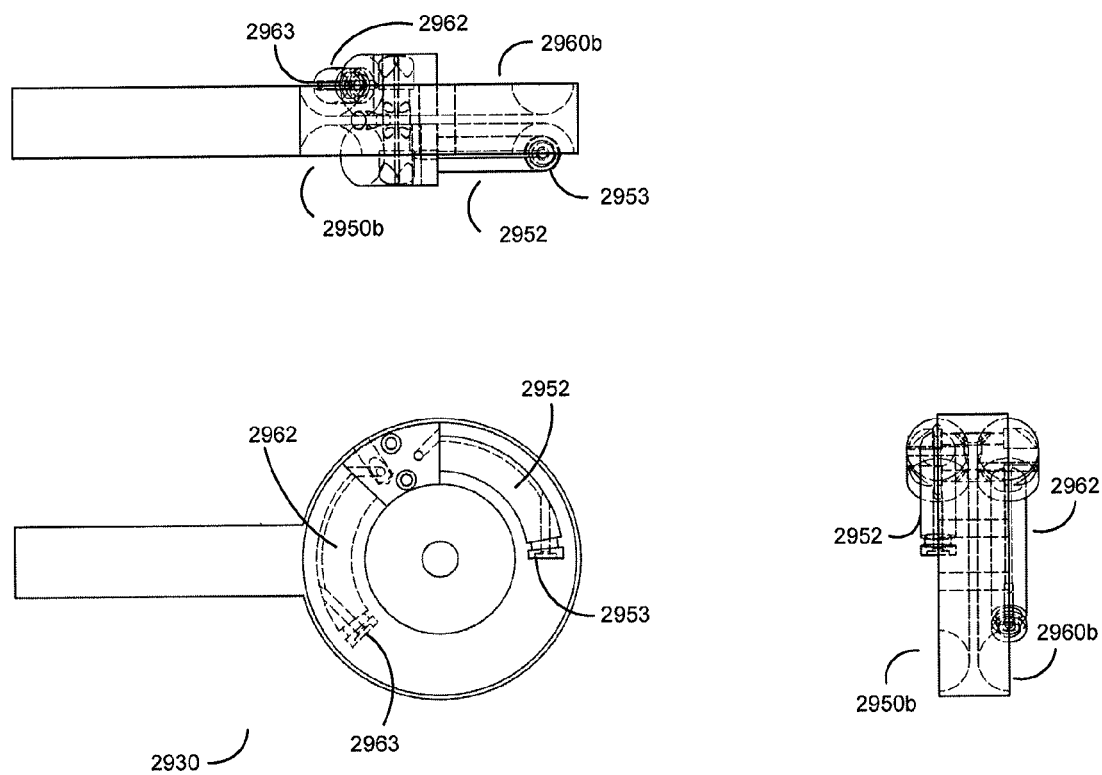
Figure 29H:
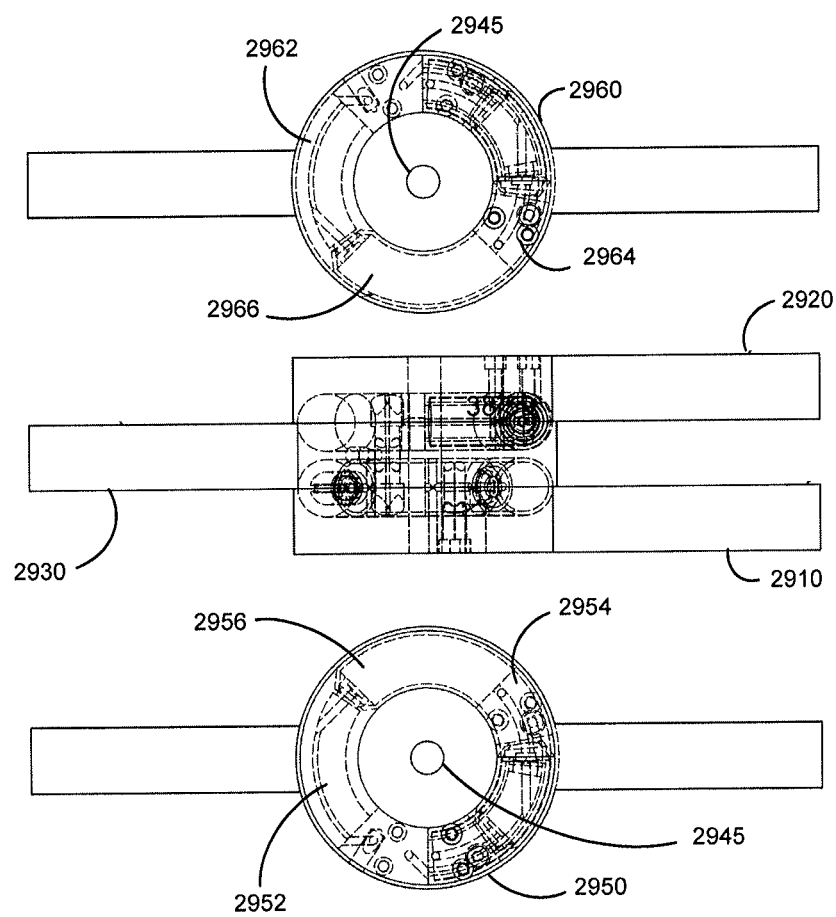

Because the piston and piston shafts 2952, 2962 may rotate relative to the bladder end cap 2954, 2964, the distance may be converted to an angle of the center shaft 2930 relative to the outer shafts 2910, 2920 and/or an angle of a skeletal component coupled to the center shaft 2930 relative to a skeletal component coupled to the outer shafts 2910, 2920 with a vertex at the cylindrical coupling 2940 (e.g., an angular displacement). The angle may be expressed in units of radians, gradians, degrees, minutes of degrees, and/or the like. Displacement measuring cells may be configured to measure displacement linearly, rotationally, and/or along any curve or shape with any desired units of measurement. FIG. 29F depicts front, top, and bottom views of the radial actuator. The bladders 2956, 2966 are shown in the fully extended position for clarity. During actual use, one bladder 2956, 2966 may be fully closed while the other is fully opened. For example, in this embodiment, the bladder 2966 may be fully opened, and the bladder 2956 may be fully closed. In the fully opened position, the sensor electrodes 2953, 2955, 2963, 2965 may be furthest apart, and in the fully closed position, the sensor electrodes 2953, 2955, 2963, 2965 may be closest together. The displacement between the electrodes 2953, 2955 in the retraction chamber 2950 may increase as the angle between the center and outer shafts 2910, 2920, 2930 decreases, whereas the displacement between the electrodes 2963, 2965 in the extension chamber 2960 may decrease as the angle between the center and outer shafts 2910, 2920, 2930 decreases. A processor (not shown) may compute the angle between the center and outer shafts 2910, 2920, 2930 from the electrical property measurements and may account for the different displacement-angle relationships in each cavity 2950, 2960. The processor may also reconcile the angles computed from the measurements in each cavity, such as by averaging the results or the like.

A calibration process similar to steps 902 to 906 of method 900 may be used to calibrate the angle measurements; Electrical property measurements from the maximum extension, minimum extension, maximum retraction, and/or minimum retraction positions may be compared with stored maximum and minimum joint angles and/or measured maximum and minimum joint angles to calibrate electrical property measurements from the rotational hydraulic joint. The computed angles for one or more joints may allow the processor to accurately determine the position and/or location of one or more grippers, one or more skeletal components, the limbs of the robot, hands, feet, and/or an object being gripped using trigonometry. The computed angles may allow the geometry of an object being gripped to be determined, and/or may enhance control over movements of the robot.

FIGS. 29C and 29D are front perspective views of the piston 2952 and the end cap 2954 that may be used in a rotational hydraulic joint. The piston 2952 and end cap 2954 may each include a bladder interface 2952b, 2954b configured to couple to the bladder 2956. A plurality of ports 2952a, 2954a may be configured to add and/or remove fluid from the bladder 2956, to electrically couple to displacement sensor electrodes 2952e, 2954e, and/or to transfer power and/or data. In an embodiment, only the piston 2952 or only the end cap 2954 may have ports 2952a, 2954a. The piston 2952 may include a piston head 2952c and a piston rod/shaft 2952d. The electrodes 2952e, 2954e may be located in the piston rod bladder interface 2952b and/or end cap bladder interface 2954b. Lead wires may extend from the electrodes 2952e, 2954e into the piston 2952 and end cap 2954. The lead wires may be insert injection molded into the end caps 2954, 2964 and/or piston rods 2952, 2962. As a result, fluid may not be able to leak along the lead wires. The bladders 2956, 2966, pistons 2952, 2962, and end caps 2954, 2964, may completely seal the fluid without the use of O-rings and may eliminate the possibility of leaking under normal circumstances.

FIGS. 29C-29F are cross-section views of the center and outer shafts 2910, 2920, 2930 and the rotational hydraulic joint 2900 assembled therefrom. The center shaft 2930 and each outer shaft 2910, 2920 may be manufactured separately as shown in FIGS. 29C-29E. The outer shafts 2910, 2920 may each include half of a cavity 2950a, 2960a, and the center shaft may include the opposing half of each cavity 2950b, 2960b. The half cavities 2950a,b, 2960a,b in each shaft 2910, 2920, 2930 may have the same radius. The outer shafts 2910, 2920 may contain the bladder end caps 2954, 2964, and the center shaft may contain the pistons 2952, 2962. The bladders 2956, 2966 may be inserted, and the center and outer shafts 2910, 2920, 2930 may be coupled together to form the rotational hydraulic joint 2900 as shown in FIG. 29F. The pin 2945 may attach the center and outer shafts 2910, 2920, 2930 together.

Figure 30A:
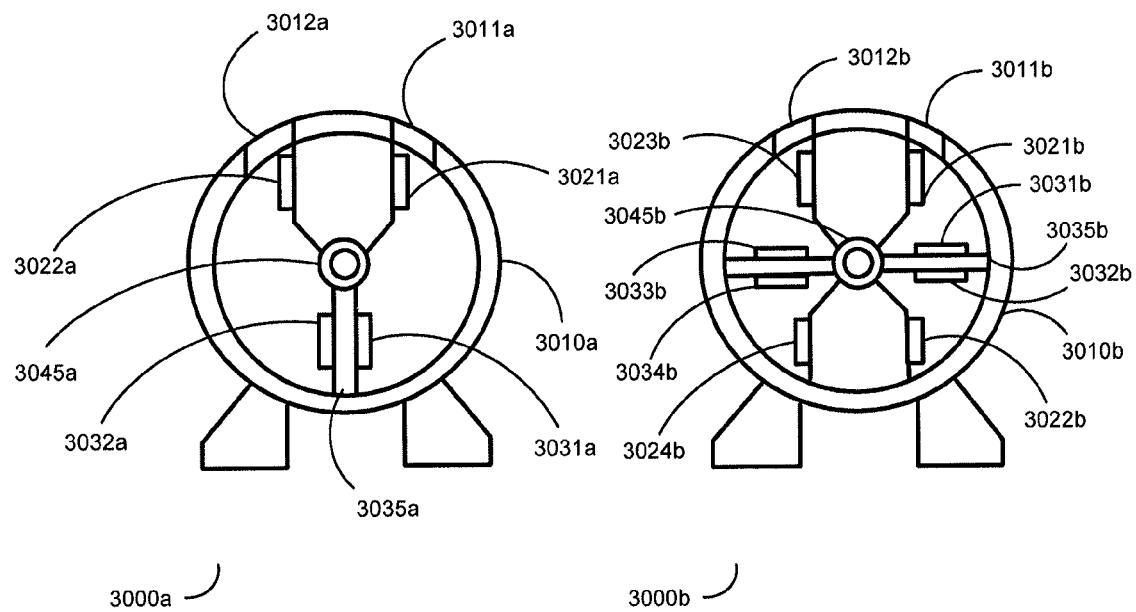
FIGS. 30A and 30B are cross-section views of additional rotational hydraulic joint embodiments.
Figure 30B:
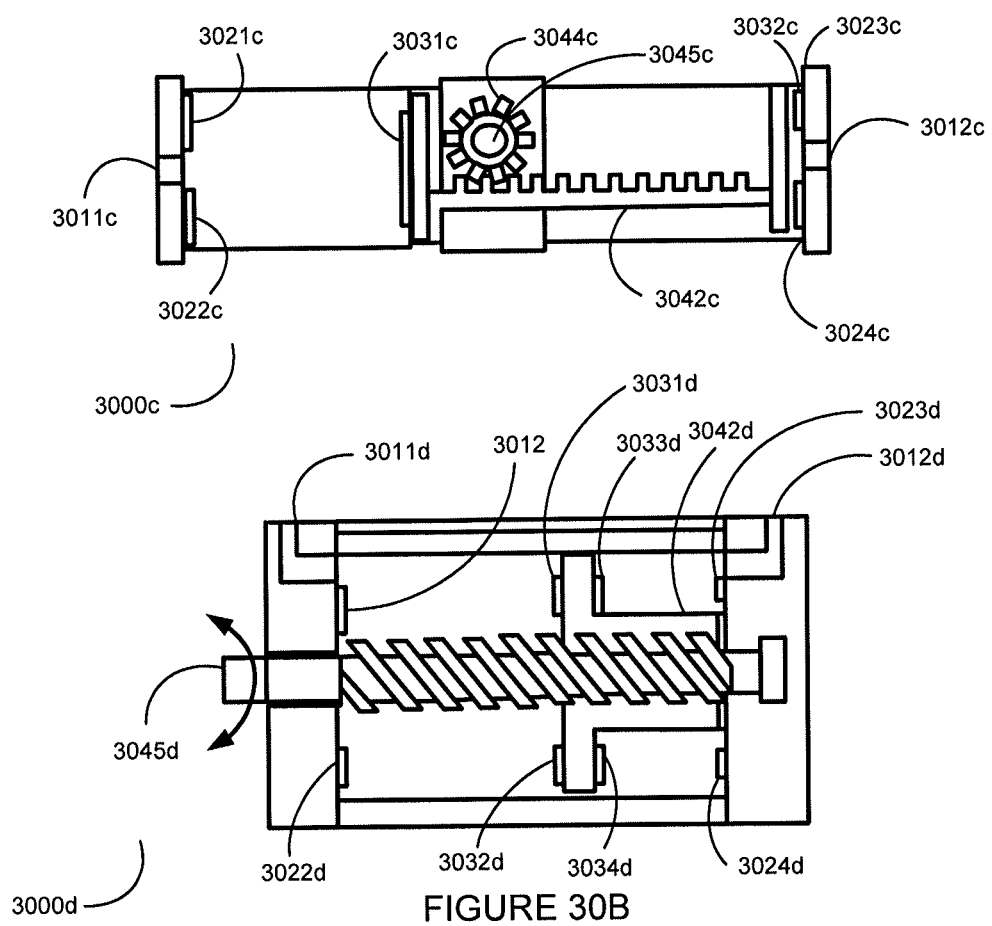

FIGS. 30A and 30B are cross-section views of additional rotational hydraulic joint embodiments 3000a-d. More joints and additional background on fluid dynamics are disclosed in Fluid Power Ebook Edition 1 and Fluid Power Ebook Edition 2 by Bud Trinkel, which are hereby incorporated by reference herein in their entirety. A first rotary hydraulic joint embodiment 3000a may include a single vane 3035a, and a second rotary hydraulic joint embodiment 3000b may include a double vane 3035b. Clockwise and counterclockwise ports 3011a,b, 3012a,b may allow injected fluid to rotate the vanes 3035a,b clockwise and counterclockwise. The vanes 3035a,b may be coupled to a center pin 3045a,b and may cause the center pin 3045a,b to rotate concomitantly with the vanes 3035a,b. The rotating center pin 3045a,b may cause one or more shafts (not shown) coupled to the center pin 3045a,b to rotate relative to one or more shafts (not shown) coupled to a housing 3010a,b.

One or more movable electrodes 3031a,b, 3032a,b, 3033b, 3034b may be affixed to the vanes 3035a,b, and one or more stationary electrodes 3021a,b, 3022a,b, 3023b, 3024b may be affixed to chamber dividers 3025a,b. The electrodes 3021a,b, 3022a,b, 3023b, 3024b, 3031a,b, 3032a,b, 3033b, 3034b may be used to determine the angle of the shafts coupled to the center pin 3045a,b relative to the shafts coupled to the housing 3010a,b.

A third rotary hydraulic joint embodiment 3000c may include a rack 3042c and pinion gear 3044c coupled to a center pin 3045c. A fourth rotary hydraulic joint embodiment 3000d may include a non-rotating piston 3042d and a spiral shaft 3045d. Inlets 3011c,d, 3012c,d may allow injected fluid to cause the rack 3042c and/or the non-rotating piston 3042d to move laterally. The pinion gear 3044c and the spiral shaft 3045d may translate the lateral movement of the rack 3042c and the non-rotating piston 3042d respectively into rotational motion. The center pin 3045c and/or the spiral shaft 3045d may rotate one or more shafts (not shown) coupled to the center pin 3045c and/or the spiral shaft 3045d relative to one or more shafts (not shown) coupled to a housing 3010c,d. Stationary and movable electrodes 3021c,d, 3022c,d, 3023c, d, 3024c,d, 3031c,d, 3032c,d, 3033d, 3034d may be used to determine the angle of the shafts coupled to the center pin 3045c and/or the spiral shaft 3045d relative to the shafts coupled to the housing 3010c,d.

Figure 31:
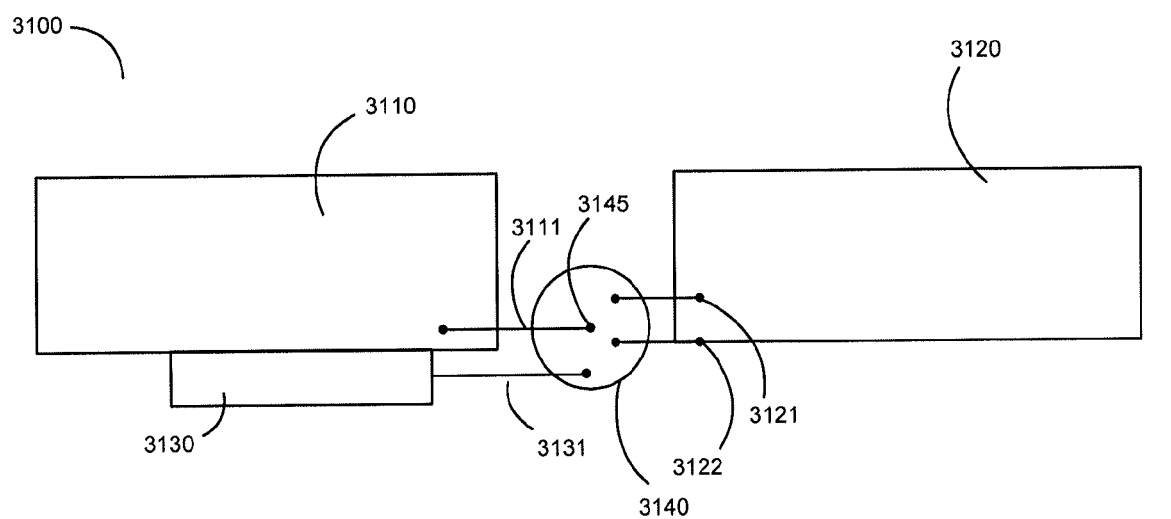
FIG. 31 is a schematic diagram of a mechanical joint rotated by a linear hydraulic cylinder.

FIG. 31 is a schematic diagram of a mechanical joint 3100 rotated by a linear hydraulic cylinder 3130. The mechanical joint 3100 may be configured to rotate a second sensor 3120 relative to a first sensor 3110. The first and second sensors 3110, 3120 may be coupled to a pivot 3140. The second sensor 3120 may be coupled to the pivot 3140 by a pair of fixed joints 3121, 3122. The first sensor 3110 may include a fixed joint 3111 coupled to an axis of rotation 3145 for the pivot 3140. The first sensor 3110 may also be coupled to the hydraulic cylinder 3130, which may be coupled to the pivot 3140 by a connecting rod 3131. The hydraulic cylinder 3130 may apply a force to the connecting rod 3131 and move the connecting rod 3131 longitudinally relative to the first sensor 3110. The pivot 3140 may translate the longitudinal movement from the connecting rod 3131 into rotation. The pivot 3140 may rotate the fixed joints 3121, 3122 and therefore the second sensor 3120 about the axis of rotation 3145. As a result, the second sensor 3120 may rotate relative to the first sensor 3110. The hydraulic cylinder 3130 may include a displacement measuring cell (not shown) that can be calibrated to allow a processor (not shown) to determine the angle of the second sensor 3120 relative to the first sensor 3110 based on the measurement of electrical properties.

Figure 32:
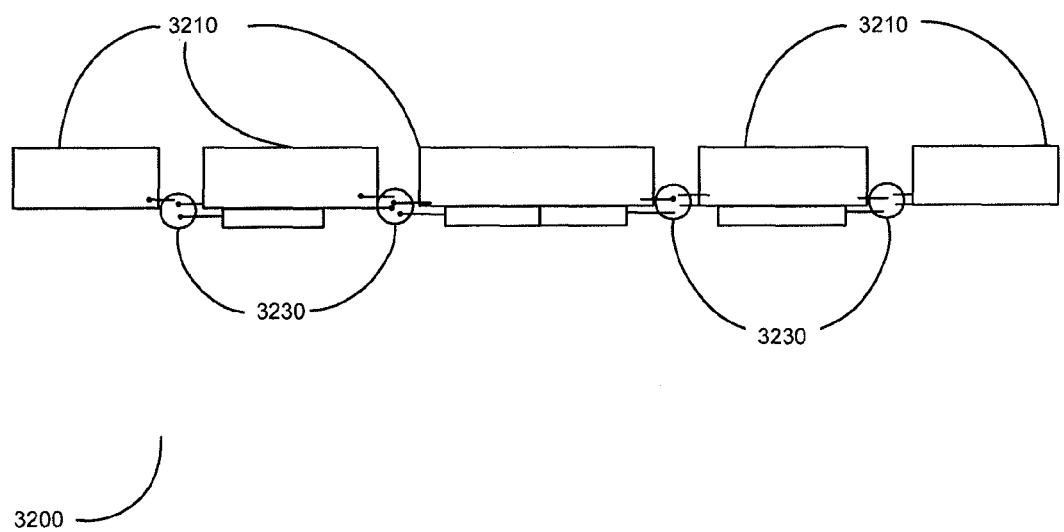
FIG. 32 is a schematic diagram of a plurality of sensors coupled by a plurality of mechanical joints to form a robotic finger.

FIG. 32 is a schematic diagram of a plurality of sensors 3210 coupled by a plurality of mechanical joints 3230 to form a robotic finger 3200. The robotic finger 3200 may be configured to behave like a human finger and/or may have more or fewer joints 3230 than a human finger. The mechanical joints 3230 may allow a plurality of sensor 3210 to encircle multiple sides of an object (not shown) and grasp the object. A processor (not shown) may use displacement measurements from the plurality of sensors 3210 and knowledge about the angle of each mechanical joint 3230 to determine the geometry of the object. Multiple fingers 3200 may be used to determine the geometry more completely, such as by interlocking about the object. For example, one finger 3200 may form a first U-shape in the Y and Z-axes while another may form a second U-shape in the X and Z-axes that is inverted in the Z-axis relative to the first U-shape.

Figure 33A:
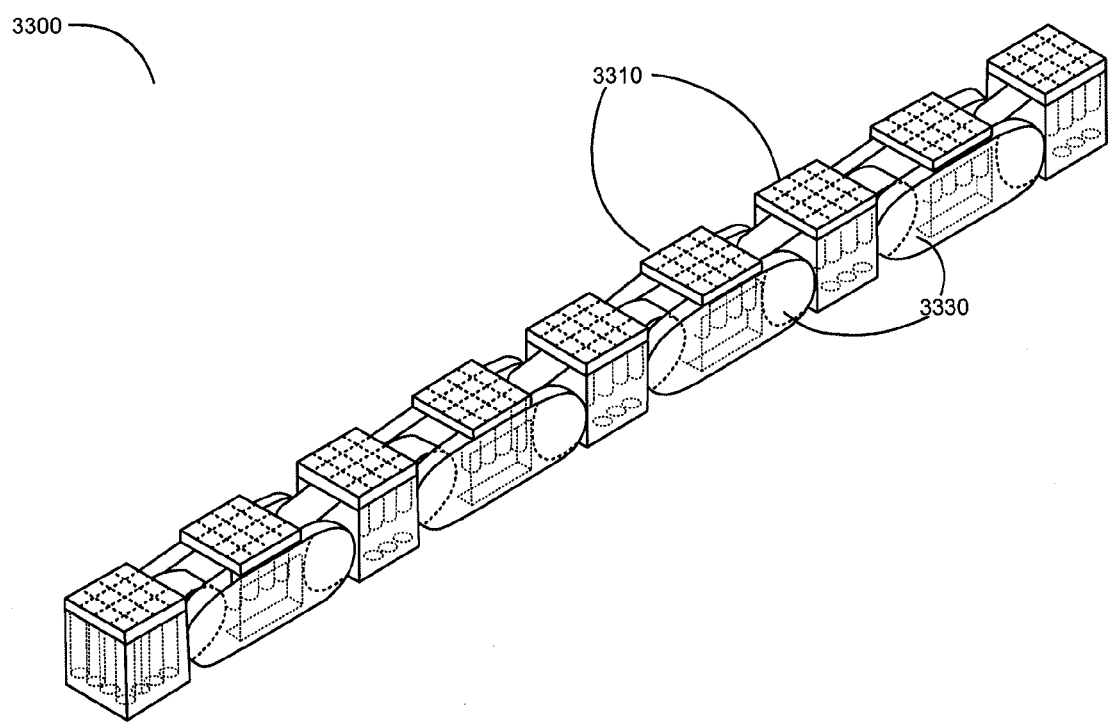
FIGS. 33A-33C are side perspective views of various configurations of a robotic finger formed from a plurality of sensors coupled by a plurality of joints.
Figure 33B:
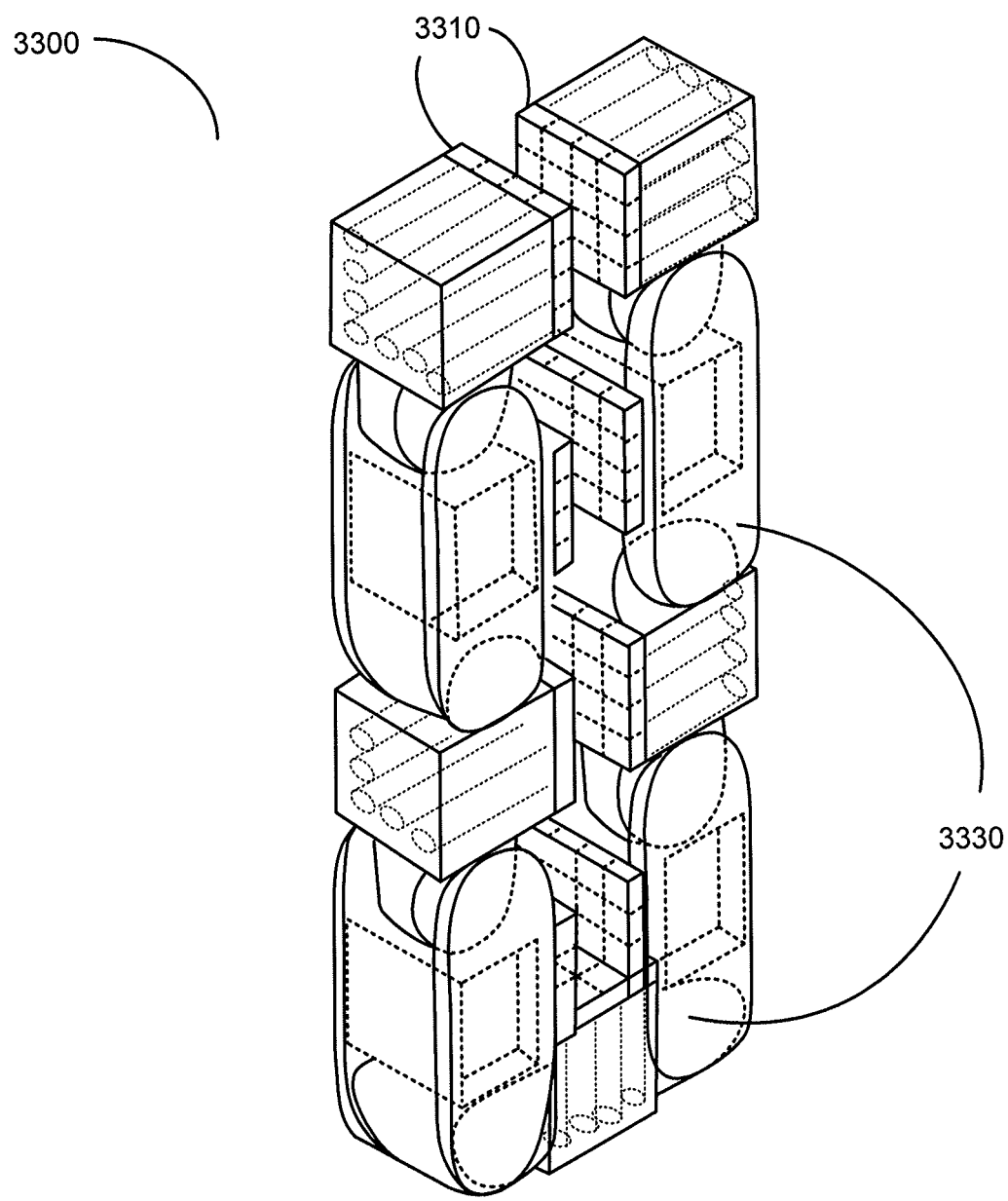
Figure 33C:
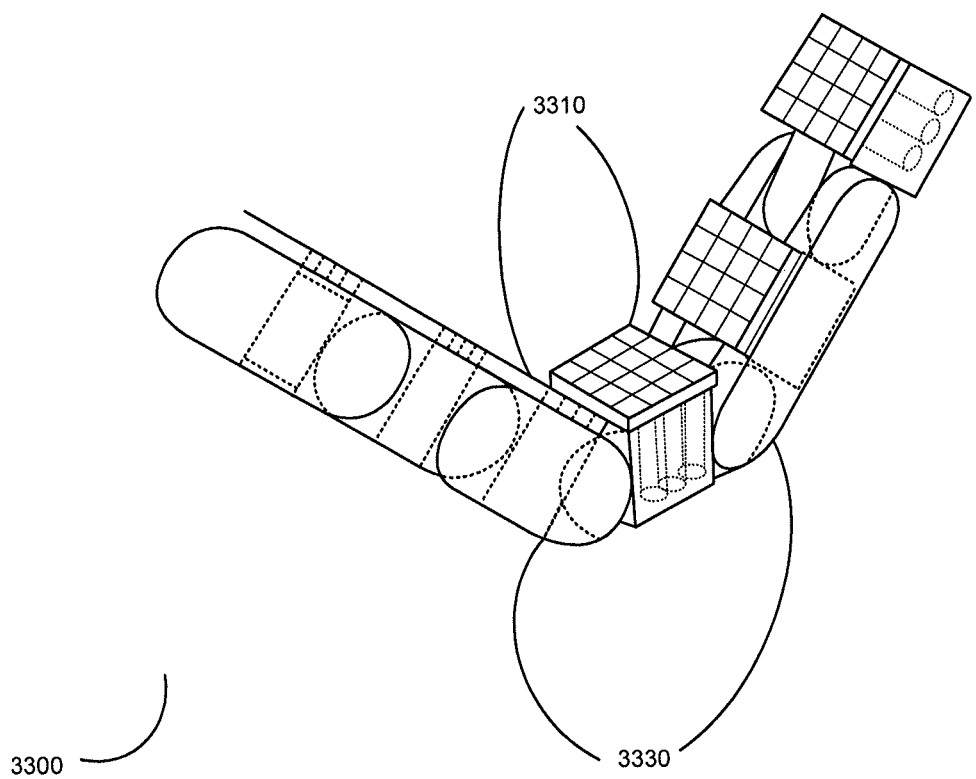

FIGS. 33A-33C are side perspective views of various configurations of a robotic finger 3300 formed from a plurality of sensors 3310 coupled by a plurality of joints 3330. The sensors 3310 may be a series of linear displacement measuring modules, such as the sensor module 700. In an embodiment, the sensor arrays 3310 of the robot fingers may be one-inch modules, such as the sensor 700. The plurality of joints 3330 may include rotational hydraulic joints, mechanical joints operated by linear hydraulic cylinders, and/or the like. The joints 3330 may be rotated to form desired shapes with the robotic finger 3300. In FIG. 33A, all of the joints 3330 are at 0° angles resulting in a flat surface. The robotic finger 3300 may be placed in the flat position as part of calibration and/or before an object (not shown) is grasped. In FIG. 33B, one sensor 3310 has joints 3330 on each side of it rotated to 90° angles to form a U-shape. The maximum rotation for each finger joint 3330 may be 90° or may be more or less than 90°. The illustrated configuration may be used as part of calibration and/or may be used to grasp opposing sides of an object (not shown) and/or to determine the geometry of the opposing sides. In other configurations, one or more joints at 0° angles may separate the two joints at 90° angles to form a wider base to the U-shape. FIG. 33C illustrates two joints 3330 at 45° angles on each side of a sensor 3310. The smaller angles may allow the finger 3300 to grasp a larger object (not shown). Additional joints 3330 may also be rotated to 45° to more completely encircle and enclose the object. The fingers 3300 may be able to grasp an object, and the radial robotic joints 3330 may be able to determine the grosser dimensions of the object through angle measuring sensors, such as the sensor 2900. The linear displacement sensor modules 700 may be able to give a higher resolution to the surface of a grasped object.

Figure 34:
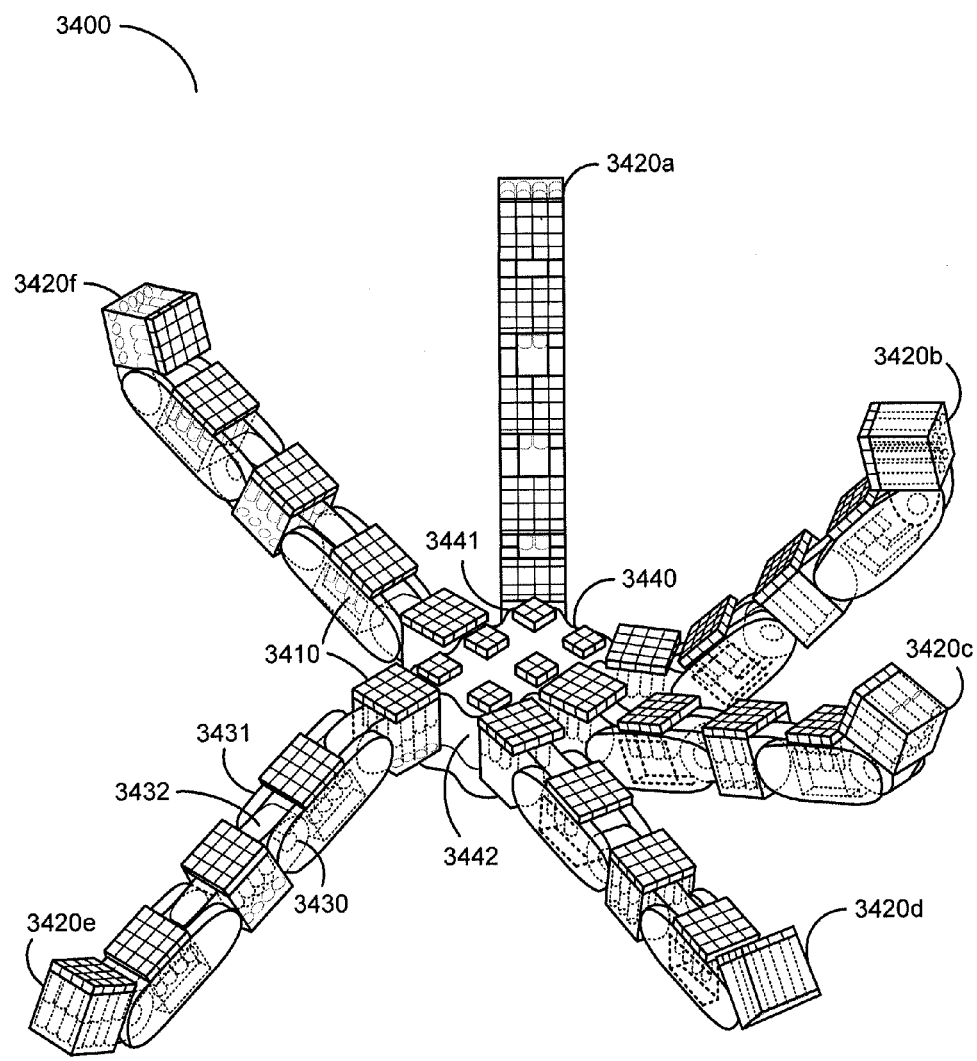
FIG. 34 is a front perspective view of a robotic hand comprising a plurality of fingers.

FIG. 34 is a front perspective view of a robotic hand 3400 comprising a plurality of fingers 3420a-f. In the illustrated embodiment, there may be six fingers. Alternatively, the finger 3300 may behave like a two-finger assembly. Each finger 3420a-f may include one or more linear sensor arrays 3410. The linear sensor arrays 3410 may include linear hydraulic actuators in series with contact sensors. The linear hydraulic actuators may include one or more linear displacement measuring cells with pistons, and the contact sensors one or more linear displacement measuring cells without pistons. Each finger 3420a-f may also, or instead, include one or more rotational hydraulic actuators 3430 configured to measure rotational displacement. The rotational hydraulic actuators 3430 may couple outer finger segment shafts 3431 to an inner finger segment shaft 3432. In the illustrated embodiment, each finger 3420a-f is composed of four rotational hydraulic actuators 3430, and each section contains outer finger segment shafts 3431 and an inner finger segment shaft 3432. In some embodiments, greater than or less than four rotational hydraulic actuators 3430 may be used per finger 3420a-f. The fingers 3420a-f may be connected to a palm 3440. Each finger 3420a-f may be coupled to the palm 3440 by a corresponding rotational hydraulic joint 3442, which may be able to rotate the corresponding finger 3420a-f laterally. The palm 3440 may also include a plurality of linear sensor arrays 3441.

The linear sensor arrays 3410, 3441 and/or the rotational hydraulic actuators 3430, 3442 may include internal bladders to contain conductive hydraulic fluid and prevent leaks. The bladders may completely seal the linear sensor arrays 3410, 3441 and the rotational hydraulic actuators 3430, 3442 without the use of O-rings and eliminate leaking under normal operating conditions. The hydraulic fluid in the linear sensor arrays 3410, 3441 may have positive pressure. When contact pressure is applied to the linear sensor arrays 3410, 3441, fluid may be forced out of the sensor arrays, and the bladders may roll up around corresponding internal pistons. The force from the contact pressure may act like a spring to remove the fluid, roll up the bladders, and cause the linear sensor arrays 3410, 3441 to conform to the object applying the contact pressure. The conformity may allow a geographic model to be determined from the displacement measurements of the linear sensor arrays 3410, 3441.

The flow of fluid into and out of the linear sensor arrays 3410, 3441 and/or rotational hydraulic actuators 3430, 3442 may be controlled by a plurality of control valves (not shown). In some embodiments, there may be one or two control valves for each linear sensor array 3410, 3441 and/or two control valves for each rotational hydraulic actuator 3430, 3442. One control valve may control extension and another control valve may control retraction. Alternatively, two control valves may control all of the rotational hydraulic actuators 3430, 3442 and/or linear sensor arrays 3410, 3441, or there may be two control valves for each finger 3420a-f. In an embodiment, opposing fingers (e.g., the fingers 3420a and 3420b) may operate in a manner similar to an index finger and thumb, and there may be common control valves for each set of joints. For example, a first joint in each of the two fingers may be controlled by two control valves, and the second, third, and fourth pairs of joints would each have a pair of common control valves. Alternatively, or in addition, two pairs of the fingers 3420a-f may be controlled by two control valves, and one pair may behave like an index finger and thumb and be controlled by another two, four, or eight control valves.

A pair of the fingers 3420a-f may be able to grasp small objects and/or tools, such as tweezers. Two pairs of the fingers 3420a-f may close, and the remaining pair may stay straight to manipulate objects. One or more gripping algorithms may be used to control the fingers 3420a-f according to the type of grip desired. The gripping algorithms may provide for precise control when using a pair of the fingers 3420a-f. A separate gripping algorithm or instance of a gripping algorithm may control each pair of the fingers 3420a-f.

The linear sensor arrays 3410, 3441 may be filled with fluid before an object is grasped. The control valves may allow fluid to drain from the linear sensor arrays 3410, 3441 as the object is grasped, which may only require one or two control valves per linear hydraulic actuator 3410, 3441 and/or one or two control valves for a plurality of linear hydraulic actuators 3410, 3441 (e.g., one or two control valves may control all draining). Pressure regulation may be used to ensure only the desired amount of fluid is permitted to drain. The pressure may be balanced between drain valve switching, pressure on the contact walls to cause the bladder to roll up, and pressure on the object being gripped. The wall thickness of the bladder may also affect rolling of the bladder and/or the applied pressure.

The rotational hydraulic actuators 3430, 3442 and the linear sensor arrays 3410, 3441, including the linear hydraulic actuators and the contact sensors, may be used to create a geographic model of an object being grasped. Measurements from the rotational hydraulic actuators 3430, 3442 and trigonometry may be used to create a gross model of the object. The linear sensor arrays 3410, 3441 may be used to determine fine details of the object and create a fine model with higher resolution. There may be gaps between the linear sensor arrays 3410, 3441, so several methods may be used to model the object where the gaps are. The model may be interpolated and/or extrapolated to fill in the gaps. The hand 3400 may move and/or index around the object to fill in any gaps. Because the locations of the gaps may be known, determined, and/or stored by the processor, the movements can be configured to ensure a fine model of every part of the object is created. Alternatively, or in addition, two hands 3400 may be used to grip the object and enclose the object on six or more or fewer sides. The method of filling in gaps may depend on the particular application and whether interpolation and/or extrapolation is sufficient or if a model created completely from measurements is required.

Figure 35:
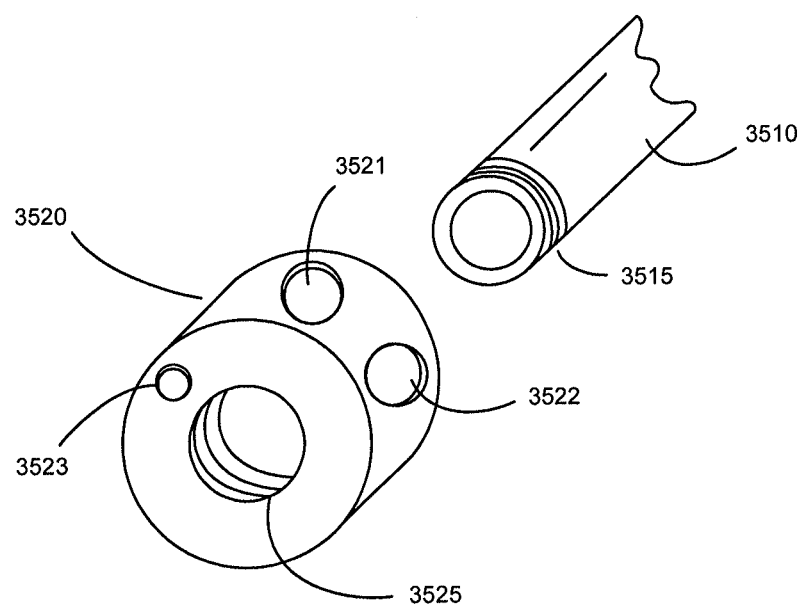
FIG. 35 is a front perspective view of an end cap that may be coupled to an inner core.

FIG. 35 is a front perspective view of an end cap 3520 that may be coupled to an inner core 3510. The inner core 3510 may be the male end of a skeletal component and/or joint. The end cap 3520 and inner core 3510 may have threads 3515, 3525 that interface to removeably couple the end cap 3520 to the inner core 3510. The end cap 3520 may comprise a fluid port 3521, an electrical power port 3522, and a data port 3523 to transfer fluid, electrical power, and data respectively to other robot components. External attachments to the power ports may be used to charge, discharge, and/or couple in series and/or parallel the batteries 2520, 2530 of the skeletal system. The ports may be located on the sides and/or the end of the end cap 3520. The ports 3521, 3522, 3523 may be self-sealing to allow for quick disconnection of the skeletal component 2500 from the robot without sparking or fluid loss for battery maintenance, repair, and replacement. Corresponding ports with which the end cap ports 3521, 3522, 3523 interface may also be self-sealing.

Alternatively or in addition, the inner core 3510 may interface with a joint, such as the rotational hydraulic joint 2900, the rotational hydraulic joints 3000a-d, the mechanical joint 3100, the robotic fingers 3300, or the like, to allow for moving and orienting a skeletal component 2500. The joint may include a quick release connection that removeably couples with a quick release system of the skeleton. The joint may be a prismatic, ball, screw, pin and socket, revolute joint, or the like. The joint may be a compound joint with a predetermined number of degrees of freedom. For example, the joint may be a hip with 3 degrees of freedom; a knee with 1 degree of freedom; an ankle with 2 degrees of freedom; an arm, including a shoulder, elbow, and wrist, with 7 degrees of freedom; a back with a plurality of degrees of freedom; or the like. The joint may be actuated by electric motor, hydraulic means, pneumatic means, or the like. Electrical power, data, and fluid may be passed through the joint to reduce wiring, hoses, and cables, and/or a rotary joint may be used to transfer electrical power. The inner core 3510 and joint may be connected by a thread and screw, quick release flange, or the like. For example, the inner core 3510 may have flanges on either or both ends that connect the inner core 3510 to the joint. A quick release connection may allow discharged batteries 2520, 2530 to be quickly replaced. Thus, panels in the robot may be opened to remove and exchange skeletal components, and/or the skin may be removed to replace the inner skeleton battery structure. The skeleton and skin may both have integrated batteries, so replacement of the skin batteries creates access to the inner skeleton battery structure for replacement. Robotic joints may be available from Boston Dynamics, Fanuc, Kuka, and Motoman Robotics.

Figure 36:
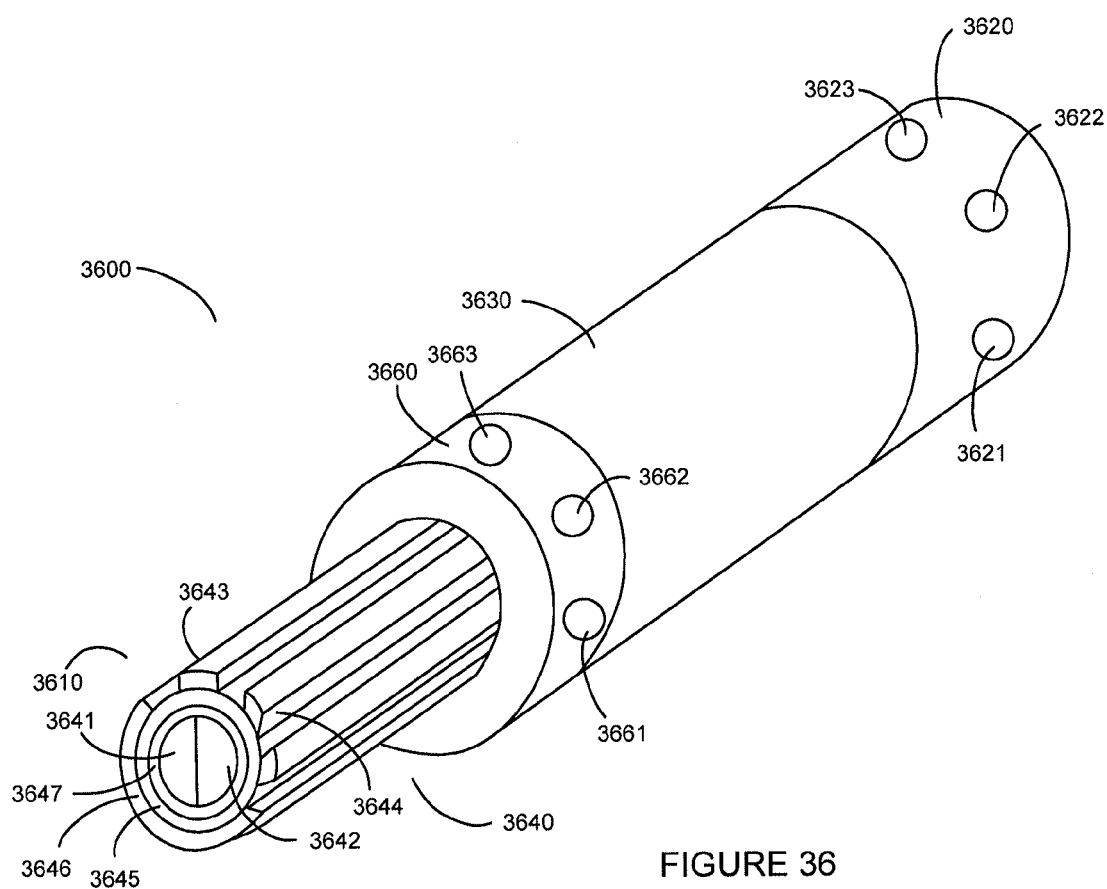
FIG. 36 is a front perspective view of a skeletal component with a male end and a female end.

FIG. 36 is a front perspective view of a skeletal component 3600 with a male end 3610 and a female end 3620. The male end 3610 may be configured to mate with the female end 3620, which may allow multiple skeletal components to be coupled to one another. The male and/or female ends 3610, 3620 may also be configured to mate with female and/or male receptacles of joints, such as the rotational hydraulic joint 2900, the mechanical joint 3100, or the like. The skeletal component 3600 may include an integrated battery 3630 surrounding an inner core 3640. The integrated battery 3630 may be cylindrically wound around the inner core 3640, such as using windings 2600a with or without additional support battery windings 2600b. The female end 3620 and an output section 3660 may enclose and/or bound the battery 3630 on each end to prevent longitudinal displacement of the battery 3630 relative to the inner core 3640. The battery may be electrically coupled to at least one of the output section 3660 and the female end 3620. For example, the female end 3620 may include one or more simple and/or complex switches, such as switching power supplies, configured to switch the battery 3630 into and out of charging and discharging circuits to optimize battery and power usage.

The female end 3620 and the output section 3660 may each include hydraulic fluid ports 3621, 3661, electrical power ports 3622, 3662, data ports 3623, 3663, and/or the like. Fluid, electrical power, and/or data may be transferred from the female end 3620 to the output section 3660 and/or from the output section 3660 to the female end 3620. The fluid ports 3621, 3661 may be divided into two sections. One section may transfer fluid to and/or from one or more extension chambers (e.g., extension chamber 692 and/or extension cavity 2960) in one or more grippers, joints, and/or skeletal components, and the other section may transfer fluid to and/or from one or more retraction chambers (e.g., retraction chamber 694 and/or retraction cavity 2950) in one or more grippers, joints, and/or skeletal components. Alternatively, the female end 3620 and output section 3660 may each have two fluid ports (not shown); one fluid port may be for extension and one may be for retraction. In an embodiment, the female end 3620 may receive fluid from a pump directly or indirectly (e.g., the fluid port 3623 may be in fluid communication with the pump), and the output section 3660 may transfer the fluid to other components directly or indirectly.

Alternatively, or in addition, fluid, electrical power, and/or data may be transferred by the inner core 3640. The inner core 3640 may transfer fluid, electrical power, and/or data to a joint, to other skeletal components, and/or to other robotic systems. A plurality of non-interconnected fluid chambers 3641, 3642 may transport fluid longitudinally through the center of the inner core 3640. A first chamber 3641 may transfer fluid to and/or from one or more extension chambers and a second chamber 3642 may transfer fluid to and/or from one or more retraction chambers. Each chamber 3641, 3642 may include an insulator sleeve (not shown) configured to insulate the conductive fluid from the inner core 3640. The insulator sleeve may divide the cavity in the inner core 3640 into the two chambers 3641, 3642. In an embodiment, the first and second chambers 3641, 3642 may deliver fluid to a joint (not shown) connected directly to the skeletal component 3600, and the output section fluid port 3661 may deliver fluid to joints and skeletal components further away (not shown). In other embodiments, the first and second chambers 3641, 3642 may deliver fluid to both directly connected and further away joints and skeletal components.

The inner core 3640 may include one or more highly conductive surface elements 3643, 3644 extending longitudinally along the outside of the inner core 3640. The highly conductive surface elements 3643, 3644 may comprise silver, gold, copper, aluminum, and/or the like. One or more surface elements 3643 may transfer electrical power, and one or more surface elements 3644 may transfer data. Alternatively, or in addition, the surface elements 3643, 3644 may be a thin film divided into a plurality of transfer lines. The electrical power transferred by the surface elements 3643 may be used to charge and/or discharge batteries 3630 in the skeletal component 3600 or in other skeletal components (not shown) and/or to power devices and components throughout a robot (not shown). The power transfer lines may be sized based on the expected electrical current requirements. The number of data lines may correspond to the requirements for communication between the joints, hands, feet, and the like with a controller and/or a PLC. Some joints may not need or transfer electrical power or data, so an insulator (not shown) may cover the surface elements 3643, 3644 at the male end 3610 in some embodiments. A core cylinder 3645 may provide form and strength to the inner core 3640. The core cylinder 3645 may be made from a high-strength, lightweight material, such as titanium, aluminum, carbon fiber, and/or the like. Insulators 3646, 3647 may electrically insulate the core cylinder 3645 from the fluid chambers 3641, 3642 and/or surface elements 3643, 3644 to prevent undesirable short circuits that might otherwise result. The fluid chambers 3641, 3642 and surface elements 3643, 3644 may be coupled to the ports 3621, 3622, 3623, 3661, 3662, 3663 of the female end 3620 and/or output section 3660.

Figure 37:
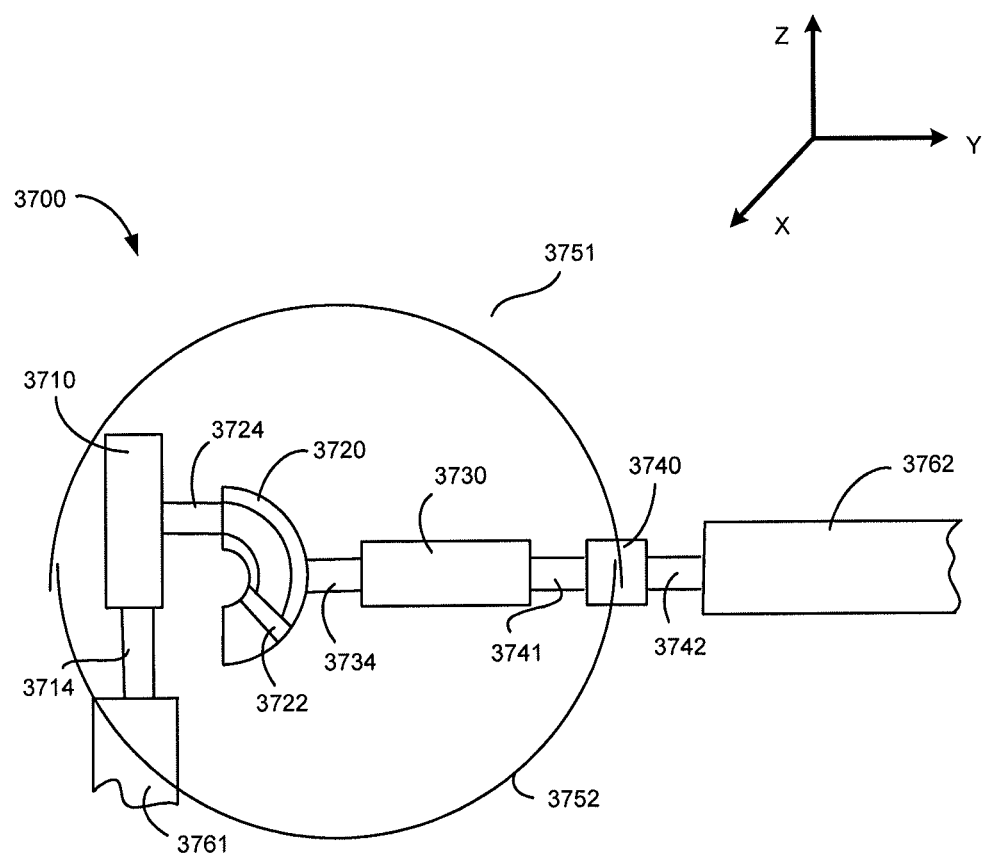
FIG. 37 is a schematic diagram of a compound ball joint with three degrees of freedom.

FIG. 37 is a schematic diagram of a compound ball joint 3700 with three degrees of freedom. The compound ball joint 3700 may include three constituent joints 3710, 3720, 3730, each having a single degree of freedom. More or fewer constituent joints 3710, 3720, 3730 may be included in other embodiments. Each constituent joint 3710, 3720, 3730 may be configured to rotate in a different orthogonal plane. For example, in the illustrated embodiment, a first constituent joint 3710 may rotate in the XZ plane, a second constituent joint 3720 may rotate in the YZ plane, and a third constituent joint 3730 may rotate in the XY plane. The constituent joints 3710, 3720, 3730 may each include a semicircular cavity through which a piston 3722 rotates. The constituent joints 3710, 3720, 3730 may each comprise the rotational hydraulic joint 2900. The constituent joints 3710, 3720, 3730 may be connected together by second and third piston shafts 3724, 3734. The third joint 3730 may rotate the first and second joints 3710, 3720, and the second joint 3720 may rotate the first joint 3710. Thus, a first skeletal component 3761 coupled to the first piston shaft 3714 may be rotated in one or more of the three orthogonal planes by the constituent joints 3710, 3720, 3730. Each constituent joint 3710, 3720, 3730 may include a measuring cell, such as the measuring cell in the rotational hydraulic joint 2900, to determine the angle of rotation of the constituent joint 3710, 3720, 3730. A processor (not shown) may compute the position of the first skeletal component 3761 using trigonometry.

In an embodiment, the constituent joints 3710, 3720, 3730 include semicircular cavities and the piston shafts 3714, 3724, 3734 are also semicircular with a similar radius to allow the pistons 3722 to traverse the semicircular cavities. Each constituent joint 3710, 3720, 3730 may allow a maximum rotation of 90°, 135°, 180°, 225°, 240°, 270°, 360°, and/or the like. The pistons 3722 may or may not have one or more sets of ball bearings (not shown) to facilitate movement along the semicircular cavity. Also, a ring of ball bearings (not shown) may be in contact with the shaft 3714, 3724, 3734 where the shaft 3714, 3724, 3734 exits the semicircular cavity. The ball bearings may reduce stress on the piston 3722 movements and/or increase the amount of weight that may be applied to the piston 3722. A single semicircular cavity may be used for both retraction and extension. The constituent joints 3710, 3720, 3730 may include two end caps (not shown) coupled to each piston 3722 by two bellow bladders (not shown). The bellow bladder through which the piston shaft 3714, 3724, 3734 travels may surround the piston shaft 3714, 3724, 3734 to prevent leaking. In other embodiments, the constituent joints 3710, 3720, 3730 may include the rotational hydraulic joint 2900, the mechanical joint 3100, or the like.

A control module 3740 may be configured to adjust the position of the constituent joints 3710, 3720, 3730. The control module 3740 may include six control valves (not shown). A pump (not shown) may apply positive pressure to a fluid, and the control valves may direct the fluid to one or more desired locations for movement of the constituent joints 3710, 3720, 3730. One control valve for each joint may control filling and draining of the extension chamber, and one control valve for each joint may control filling and draining of the retraction chamber. In other embodiments, there may be two control valves per chamber of each joint to control fluid flow into and out of the chambers. The control valves may be coupled to the constituent joints 3710, 3720, 3730 by hoses (not shown) and/or through a first control module connector 3741. In other embodiments, the control valves may be located in the joints that they control. The processor and/or a PLC may signal to the control module 3740, which valves to open and which to close. The control module 3740 may also include a multiplexer configured to multiplex together the signals and/or electrical property measurements from each joint.

Male and female housing components 3751, 3752 may house the constituent joints 3710, 3720, 3730 and may leave only the control module 3740 and a first skeletal component 3761 exposed for external connection. The male housing component 3751 may be coupled to the control module 3740, and the female housing component 3752 may be coupled to the first constituent joint 3710. A second control module connector 3742 and the first piston shaft 3714 may emerge from the housing to couple the compound ball joint 3700 to skeletal components 3761, 3762. The second control module connector 3742 may be the male end of the second skeletal component 3762, and a flange (not shown) may couple the second control module connector 3742 to the control module 3740. The skeletal components 3761, 3762 may or may not include integrated batteries and/or may be fingers or finger joints. Fluid, electrical power, and/or data may be delivered to the compound ball joint 3700 from the skeletal components 3761, 3762 and/or vice versa.

Figure 38:
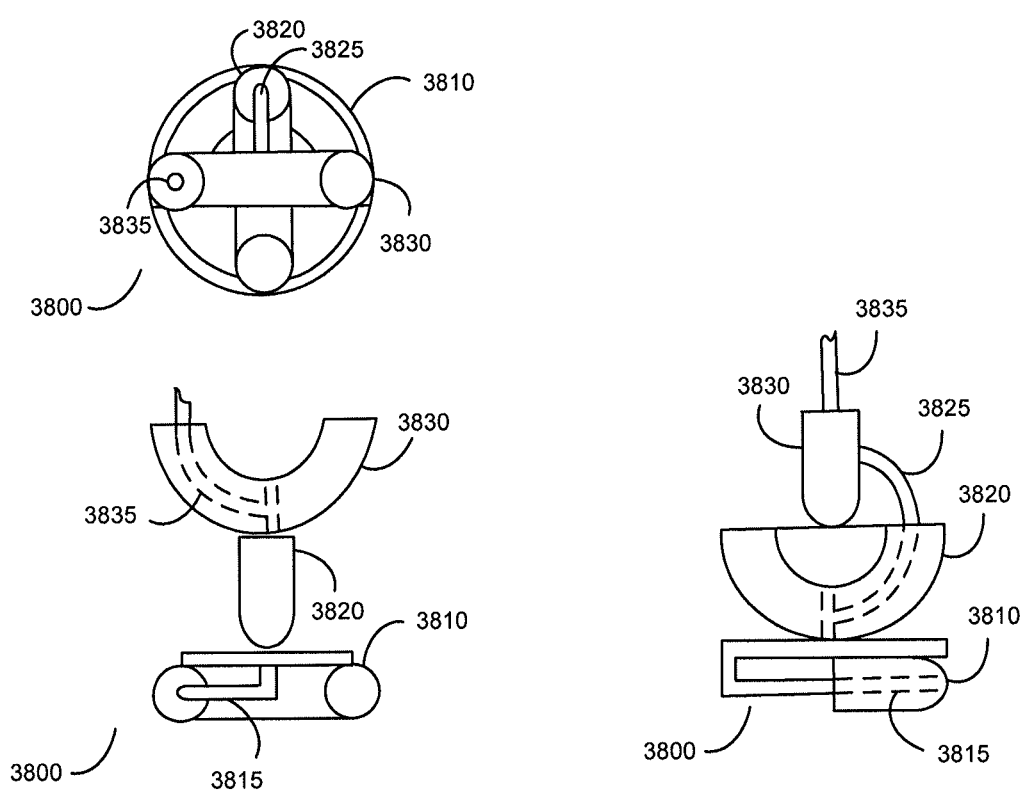
FIG. 38 includes top, front, and side perspective views of a compact, compound joint.

FIG. 38 includes top, front, and side perspective views of a compact, compound joint 3800. The compact, compound joint 3800 may include three constituent joints 3810, 3820, 3830, each having a single degree of freedom. More or fewer constituent joints 3810, 3820, 3830, such as only two constituent joints 3810, 3820, may be included in other embodiments. The constituent joints 3810, 3820, 3830 may have a configuration similar to that of the constituent joints 3710, 3720, 3730 in the compound ball joint 3700 and/or may include rotational hydraulic joints 2900, mechanical joints 3100, and/or the like. Each constituent joint 3810, 3820, 3830 may be configured to rotate in a different orthogonal plane. The constituent joints 3810, 3820, 3830 may be closer to each other than the constituent joints 3710, 3720, 3730 in the compound ball joint 3700 to reduce the volume of the compact, compound joint 3800. For example, each constituent joint 3810, 3820, 3830 may be positioned with at least one portion near the center of one or more adjacent constituent joints 3810, 3820, 3830. Piston shafts 3815, 3825, 3835 may couple the constituent joints 3810, 3820, 3830 together. The piston shafts 3815, 3825, 3835 may be coupled to adjacent constituent joints 3810, 3820, 3830 near their center.

Figure 39:
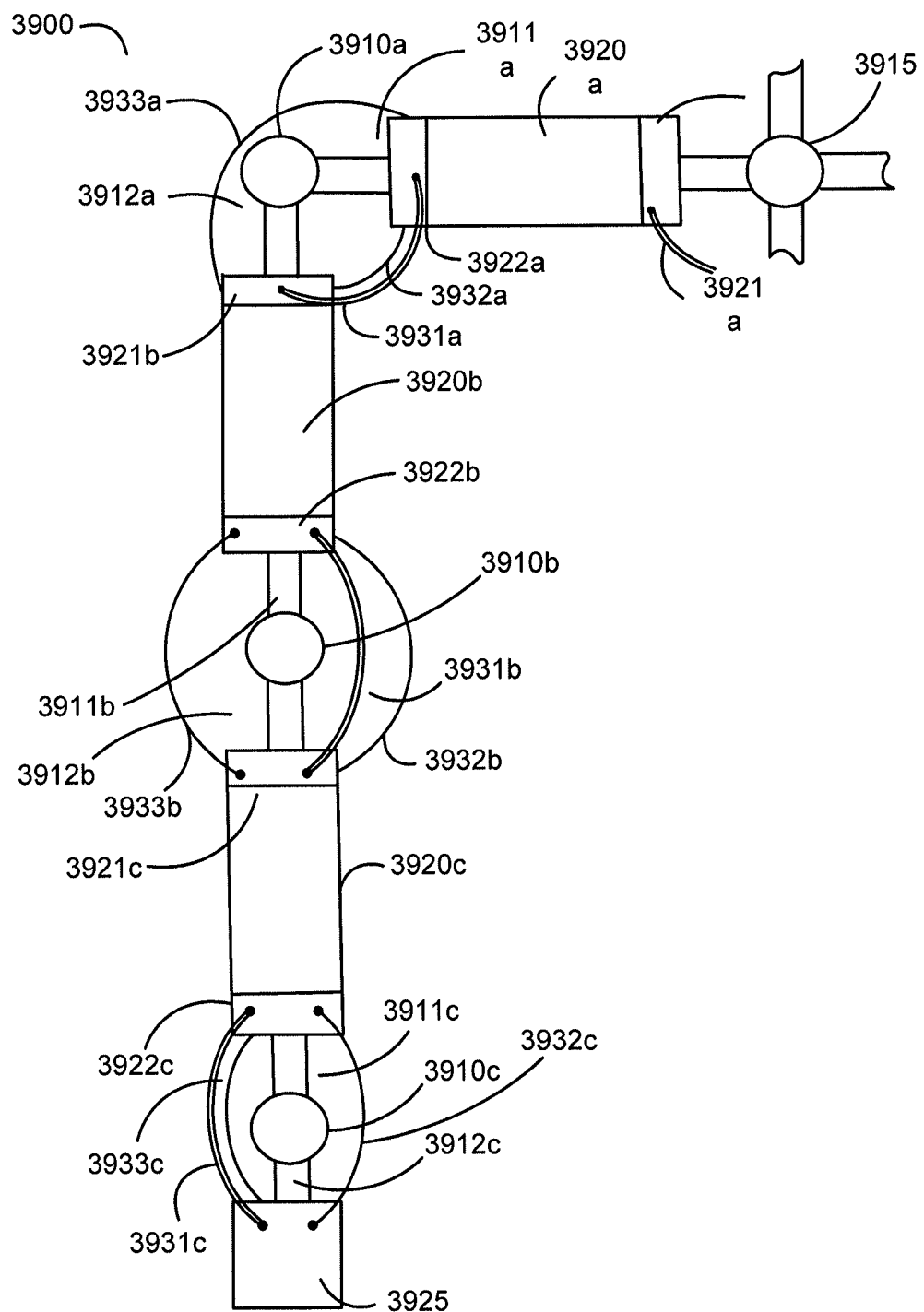
FIG. 39 is a schematic diagram of an arm including a plurality of joints with multiple degrees of a freedom and a plurality of skeletal components.

FIG. 39 is a schematic diagram of an arm 3900 including a plurality of compound joints 3910a-c with multiple degrees of a freedom and a plurality of skeletal components 3920a-c. The joints 3910a-c and skeletal components 3920a-c may include male and female connections that may interface with one another. Flanges, fittings, or the like may also or instead be used to attach the joints 3910a-c and skeletal components 3920a-c. The arm 3900 may be part of a larger skeletal system for a robot. For example, a spinal joint 3915 may couple a head (not shown), another arm (not shown), additional spine joints (not shown) coupled to a waist (not shown) and/or legs (not shown), and/or the like to a proximal end of the arm 3900. The arm 3900 may include or couple to a hand 3925 or other gripper at a distal end, such as the hand 3400. The arm 3900 may be configured to have a functionality similar to that of a human arm. Accordingly, a shoulder joint 3910a may have three degrees of freedom, an elbow joint 3910b may have one degree of freedom, and a wrist joint 3910c may have two degrees of freedom. Those of skill in the art will understand the joints 3910a-c may have more or fewer degrees of freedom depending on the desired application of the arm 3900.

The arm 3900 may be configured to transfer fluid, electrical power, data, and/or the like to components of the arm 3900 and/or components outside the arm 3900. The fluid, electrical power, and data may be conveyed by the joints 3910a-c and skeletal components 3920a-c. Transfer lines, such as wires 3932a-c, 3933 a-c, hoses 3931a-c, or the like, may transfer fluid, electrical power, and/or data between skeletal components 3920a-c instead of or in addition to the joints 3910a-c. Some embodiments may not include transfer lines apart from the joints 3910a-c and skeletal components 3920a-c and may instead transfer fluid, electrical power, and/or data through the joints 3910a-c and/or skeletal components 3920a-c.

The skeletal components 3920a-c may include one or more control modules 3921a-c, 3922a-c. The skeletal components 3920a-c may each include a plurality of batteries (not shown) that have their charging regulated and/or controlled by a first control module 3921a-c in each skeletal component 3920a-c. The first control modules 3921a-c may include and/or be communicatively coupled with temperature, pressure, and/or voltage sensors that monitor the temperature, pressure, and/or voltage of the batteries. The first control modules 3921a-c may also include control mechanisms and/or circuitry configured to regulate charging and discharging of the batteries. The first control modules 3921a-c may monitor and control a charge profile for the batteries by switching a charging current. An exemplary charge profile is disclosed in U.S. Pat. No. 5,633,576 to Rose et al., which is hereby incorporated herein by reference in its entirety. The first control modules 3921a-c may monitor and control the voltage of each battery as a function of measured temperature, pressure, charging voltage, discharging voltage, and/or the like.

A second control module 3922a-c in each skeletal component 3920a-c may transfer fluid, electrical power, and/or data to the joints 3910a-c and/or the hand 3925. In some embodiments, only fluid and data may be output to the joints 3910a-c. The joints 3910a-c may include a joint control module, such as the control module 3740, inside the joint housing. The joint control module may include a plurality of valves to control extension and retraction of the joints 3910a-c in one or more degrees of freedom in the manner previously discussed. A plurality of joint connections 3911a-c, 3912a-c may convey fluid, electrical power, and/or data between the joints 3910a-c and the skeletal components 3920a-c and/or the hand 3925. In some embodiments, second joint connections 3912a-c may only provide a mechanical connection and may not transfer fluid, electrical power, and/or data. First joint connections 3911a-c for each joint 3910a-c may be comprised of a male receptacle from the skeletal component 3920a-c and a female receptacle from the joint 3910a-c, which may interface to transfer fluid, electrical power, and/or data between the skeletal component 3920a-c and the joint 3910a-c.

Figure 40:
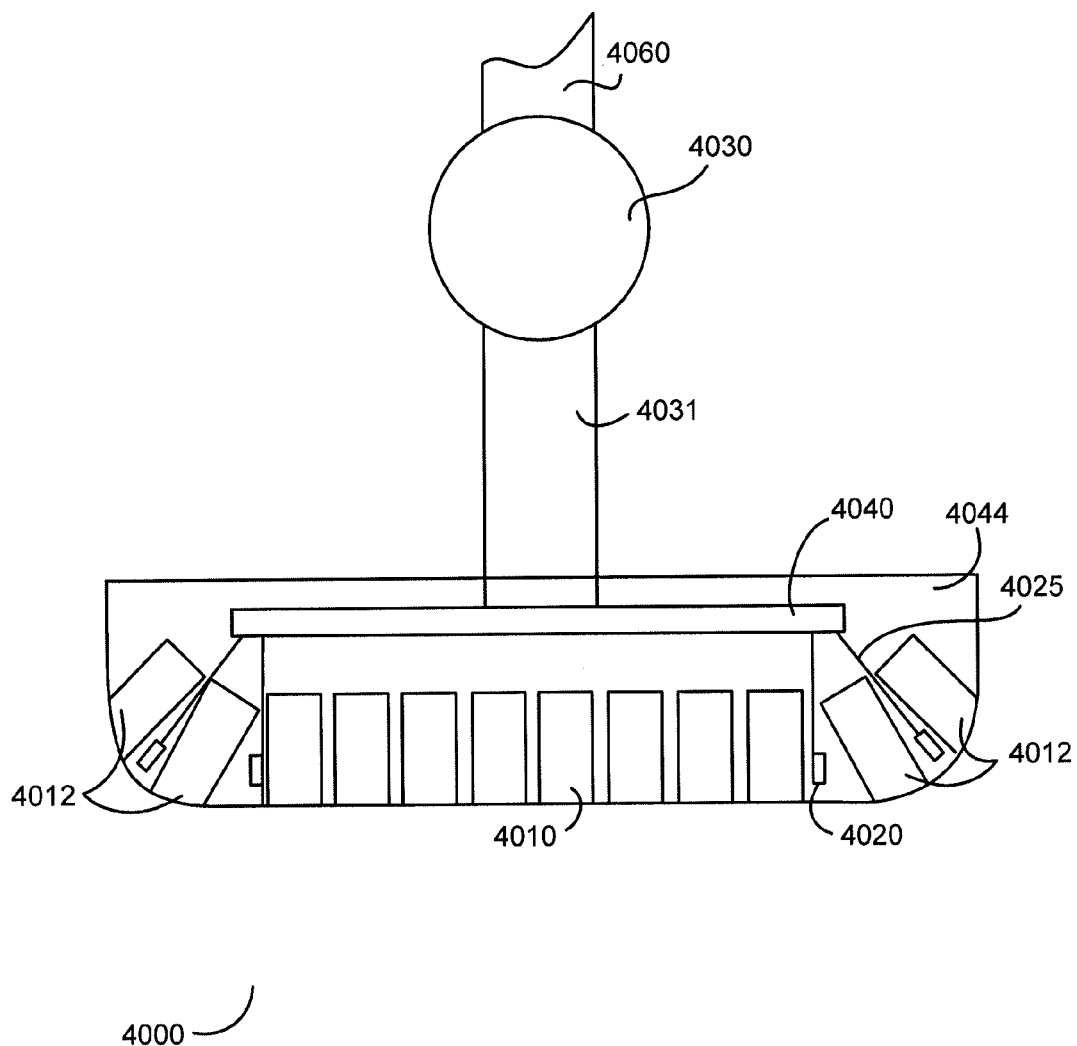
FIG. 40 is a schematic diagram of a robotic foot configured to provide mobility and balance.

FIG. 40 is a schematic diagram of a robotic foot 4000 configured to provide mobility and balance. The robotic foot 4000 may be connected to a robot skeletal component 4060 by an ankle ball joint 4030. A mechanical connection 4031 may couple the ankle ball joint 4030 to the foot 4000. The foot 4000 may include a plurality of sensors 4010, 4012, 4020 that can be used to determine balance. A support element 4040, stabilizers 4025, and a housing 4044 may provide structure and stability to the foot 4000. The support element 4040 may comprise a hard material, such as thermoplastic or metal.

The ankle ball joint 4030 may be configured to have two, three, or more or fewer degrees of freedom. The ankle ball joint 4030 may include one or more rotational hydraulic joints (not shown) configured to control movement of the foot 4000 and/or measure the angle of the foot 4000 relative to the robot skeletal component 4060. A processor (not shown) may control movement of the ankle ball joint 4030 to maintain balance based on feedback from the sensors 4010, 4012, 4020, measurements of the angle of the ankle joint 4030, measurements of the angles of other joints (not shown), and/or measurements and/or determinations of the speed of movement. In an embodiment, the foot 4000 may walk using a rolling effect similar to the rolling from heel to toe of a human foot during walking/running. The foot 4000 may be symmetrical and able to roll forward and backward or in three or four possible directions, and/or the foot 4000 may be unsymmetrical and only able to roll in one direction.

The foot 4000 may comprise a plurality of hydraulic linear displacement sensors 4010, 4012 in contact with the bottom of the foot 4000. In some embodiments, the linear displacement sensors 4010, 4012 may include hydraulic cylinders with pistons and not include hydraulic cylinders without pistons, because the foot 4000 may require less perpendicular resolution and higher resilience to strong forces. The linear displacement sensors may be configured with components able to withstand the higher pressures that may result from supporting the weight of a robot. In an embodiment, each linear displacement sensor 4010, 4012 may have a contact surface area of 1 square inch, and there may be a 12 by 4 array of linear displacement sensors 4010, 4012. Fewer linear displacement sensors 4010, 4012 may be suitable in other embodiments.

The linear displacement sensors 4010, 4012 may be configured to measure the contour of the ground and/or to measure the pressure on each sensor 4010, 4012. The contour and/or pressure measurements may be sent to the processor for use in determining weight shifting, weight distribution, and/or the like to maintain balance. A geographic contour map may be computed from displacement measurements by the linear displacement sensors 4010, 4012. The linear displacement sensors 4010, 4012 may be configured to detect rolling, shifting, and/or moving objects under the foot 4000 (e.g., when the foot 4000 is standing on marbles). Pressure sensors may be used to determine the pressure in each of the linear displacement sensors 4010, 4012, and/or the pressure may be determined from the displacement of each piston. Absolute and/or relative pressures may be computed. A robot may be loaded with a weight. The displacement of the linear displacement sensors 4010, 4012 may be load dependent for a given hydraulic line pressure, and the weight or mass of the load may be determined by the displacement of the sensors in the linear displacement sensors 4010, 4012. The load may be determined by knowing the weight of the robot, and the amount of pressure needed to linearly displace the pistons in the linear displacement sensors 4010, 4012. In some embodiments, the total weight of the robot including any load may be used to determine the pressure. The displacement-to-pressure calculation may be calibrated with any changes in load, and/or changes in load may be detected by the linear displacement sensors 4010, 4012. Angled linear displacement sensors 4012 may included angled end effectors and may detect ground contour, pressure, and/or shear forces as the foot 4000 leaves or touches the ground during rolling.

The linear displacement sensors 4010, 4012 may be able to level or alter the angle of the foot 4000 and/or conform the foot 4000 to the ground by regulating the pressure of fluid in each of the linear displacement sensors 4010, 4012. In an embodiment, the pressures may be equalized. The pressure in the linear displacement sensors 4010, 4012 may be controlled in response to the changing contact area during walking, such as when the foot 4000 is rolled during walking. The foot 4000 may include one or more pressure control valves (not shown) configured to regulate the pressure of each linear displacement sensor 4010, 4012. The pressure control valves may regulate the pressure with respect to the total weight of the robot and/or any load carried. The pressure control valves may regulate the pressure based on a known load.

The foot 4000 may comprise one or more shear sensors 4020. The shear sensors may be located between one or more of the linear displacement sensors 4010, 4012. The shear sensors 4020 may be coupled to the support element 4040 by stabilizers 4025. The shear sensors 4020 may be used to determine the coefficient of friction between the foot 4000 and the ground. The coefficient of friction may be computed based on the pressure, total weight, angle, and/or shear force experienced by the foot 4000. The processor may use the determined coefficient of friction to improve mobility and/or balance on surfaces with different coefficients of friction. For example, a plurality of walking algorithms may be stored, and one or more appropriate walking algorithm may be selected based on the determined coefficient of friction. Alternatively, the parameters of one or more walking algorithms may be changed based on the determined coefficient of friction. The walking algorithms may control movement of the linear displacement sensors 4010, 4012 and/or ankle ball joint 4030. Measurements on a plurality of dry and/or wet surfaces, such as ice, sand, dirt, concrete, etc., may be used for calibration. The shear sensors 4020 may be configured to measure shear from when the foot 4000 first touches the ground until the foot 4000 leaves the ground even if the foot 4000 is rolled. Exemplary shear sensors may include piezoresistive sensors, PVDF sensors, and/or the like. The shear sensors 4020 may include cantilevers configured to be perpendicular to the ground as the foot rotates.

The housing 4044 may be an elastic sheet comprising thermoplastic, an elastomer, such as rubber, or the like. The housing 4044 may be configured to have a large coefficient of friction with certain and/or most materials, and/or the housing 4044 may include texture and/or roughness configured to increase traction. In some embodiments, the foot 4000 and/or the housing 4044 may include a plurality of pressure sensors instead of or in addition to the linear displacement sensors 4010, 4012. The pressure sensors may be used to determine a weight and/or pressure distribution pattern. An array of pressure sensors may be able to determine the scalar differences of the distribution of pressure. The pressure sensors, shear sensors 4020, and/or linear displacement sensors 4010, 4012 may be insert molded into the housing 4044.

Figure 41A:
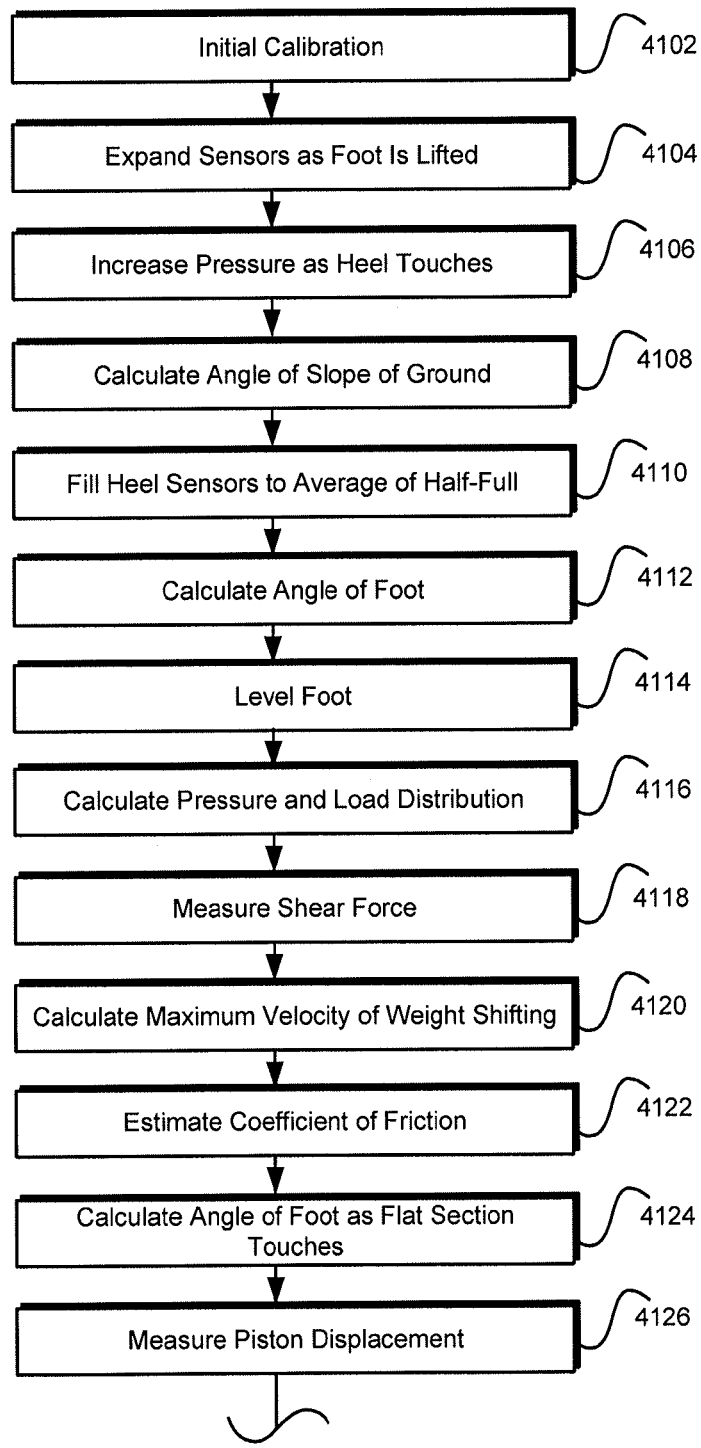
FIG. 41 is a flow diagram of a method for walking using the robotic foot.
Figure 41B:
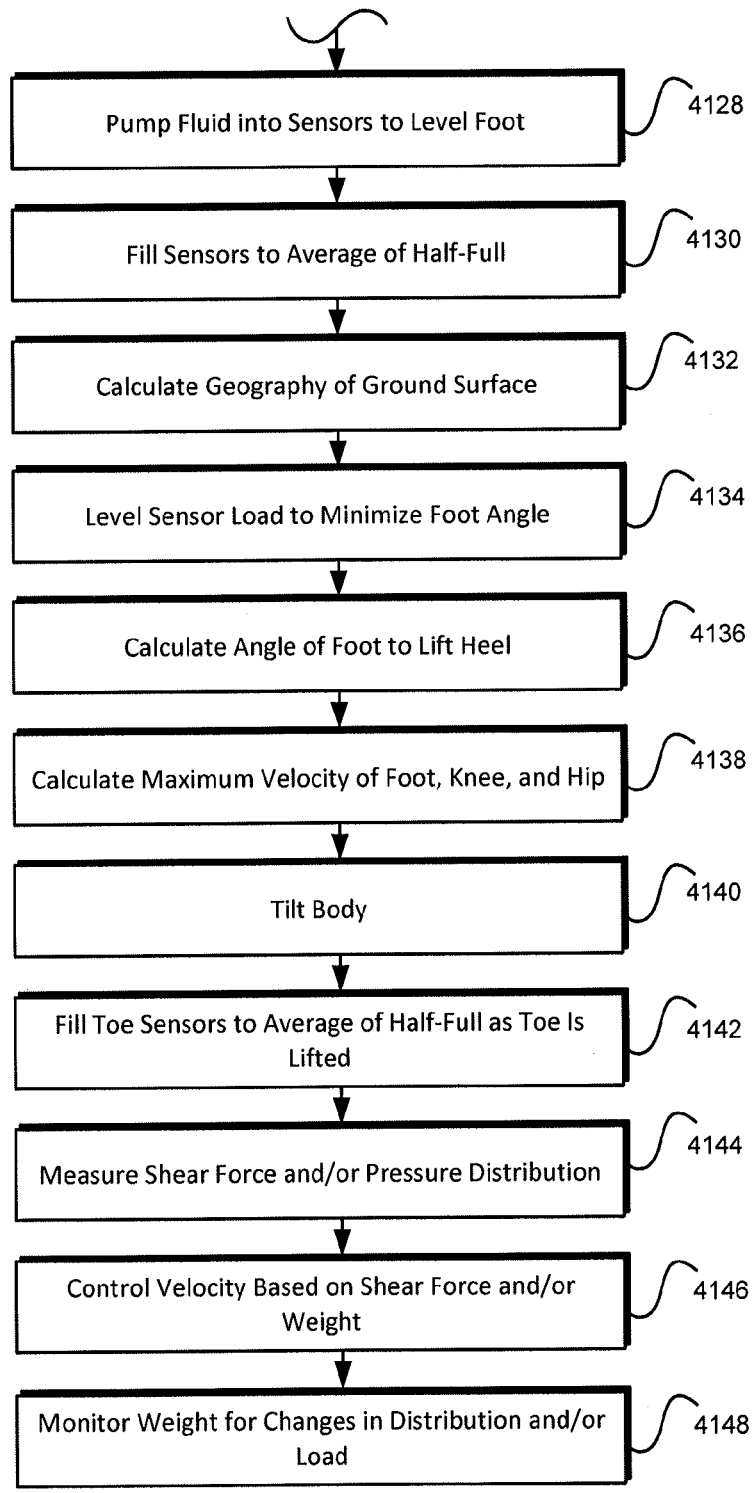

FIG. 41 is a flow diagram of a method 4100 for walking using the robotic foot 4000. Various configurations of the robotic foot 4000 may be used with the method 4100 for walking. In an embodiment, the flat section of the robotic foot 4000 may include an 8 by 4 array of linear displacement sensors 4010 and heel and toe sections of the robotic foot 4000 may each include 2 by 4 array of linear displacement sensors 4012. The linear displacement sensors 4010, 4012 may be configured to act as hydraulic actuators and may each have a surface area of 1 square inch. The shear sensors 4020 may be located between the linear displacement sensors 4010, 4012 as needed. A hydraulic pump may output a pressure of 30 psi. Higher pressures may be used in some embodiments depending on the application. A robot supported by the robotic foot 4000 may be 150 lbs. with a maximum load of 80 lbs. The hydraulic fluid may be distributed and/or controlled by servo control valves. The heel, toe, and flat section may each have a single separate servo control valve that controls the corresponding section in common. A separate algorithm may be used to control the ankle joint 4030. The separate ankle algorithm may allow the ankle 4030 to angle the foot to conform to a desired surface, and/or a maximum tilt angle may be programmed into the processor. The ankle 4030 may be configured to enable higher force on specific portions of the foot's linear displacement sensors 4010, 4012. Ankle shifting may be detected on shifting surfaces, such as rocks, when the weight is shifted from one foot to the other, and weight distribution can be adjusted to correspond to surface stability.

The method 4100 may begin with initial calibration 4102 of the robot and load. Calibration may include mapping electrical property measurements for maximum and minimum extension positions to displacements, determining the weight of the robot and/or load, and/or the like. When walking begins, the robotic foot 4000 may be lifted from the ground, and all the linear displacement sensors 4010, 4012 may be expanded 4104 to the maximum extension position and filled with fluid. The robotic foot 4000 may return to the ground heel first. As the heel touches the ground, the force from the contact may push fluid out of the linear displacement sensors 4012 in the heel. A processor may detect that the linear displacement sensors 4012 are contracting and activate servo valves to increase 4106 pressure in and add fluid to the linear displacement sensors 4012 in the heel. From measurements by the linear displacement sensors 4012 in the heel, the processor may calculate 4108 the angle of the slope of the ground.

The processor and servo control valves may maintain 4110 the linear displacement sensors 4012 at a level of half-full based on the measurements from the linear displacement sensors 4012. The level of the fluid within the linear displacement sensors 4012 may be averaged, and the average level may be maintained at half-full. The processor may calculate 4112 the angle of the robotic foot 4000. Based on the calculations, the robotic foot may be leveled 4114 by actuating the linear displacement sensors 4012. The processor may calculate 4116 the pressure distribution and/or the load attributed to each linear displacement sensor 4012. The load attributed to each linear displacement sensor may be calculated from the foot angle, hydraulic fluid pressure in the linear displacement sensors 4012 of the heel, displacement measured by the linear displacement sensors 4012, total robot weight, and/or the like. The shear force (e.g., deflection of cantilevers within the shear sensors 4020) may be measured 4118. A maximum velocity for shifting weight between feet may be calculated 4120 based on the shear force, estimated load, ground slope, weight distribution, foot angle, and/or the like. A coefficient of friction may be estimated 4122 from the total weight, velocity, pressure distribution, shear force, and/or the like.

As the flat section of the foot touches the ground, the processor may calculate 4124 the angle of the robotic foot 4000. The processor may measure 4126 piston displacement in the linear displacement sensors 4010 in the flat section of the robotic foot 4000. If some of the linear displacement sensors 4010 do not move during contact, the lack of movement may indicate that those linear displacement sensors 4010 are not touching the ground and/or bearing weight. Fluid may be pumped 4128 into the linear displacement sensors 4010 to level the robotic foot 4000. The processor may fill 4130 the linear displacement sensors 4010 to half-full. The processor may attempt to make all the linear displacement sensors 4010 half-full. If it is not possible to make all the linear displacement sensors 4010 half-full, the processor may settle with the average fluid height for the linear displacement sensors 4010 being half-full. Filling 4130 the linear displacement sensors 4010 may comprise increasing the pressure in the linear displacement sensors 4010 until the linear displacement sensors 4010 are distributed from maximum to minimum. In some embodiments, the pressure may be increased in only linear displacement sensors 4010 making contact with the ground.

The processor may calculate 4132 the geography of the ground surface from linear displacement measurements by the linear displacement sensors 4010. A pressure distribution profile may be used to level 4134 the load among the linear displacement sensors 4010 and minimize the angle of the robotic foot 4000. The processor may calculate 4136 the angle of the robotic foot 4000 necessary to lift the foot off the ground when rolling the foot from heel to toe. The angle may be calculated 4136 while the ankle joint 4030 rotates and the leg lifts to remove the heel and flat section of the robotic foot 4000 off the ground. The robotic foot 4000 may be held at an angle that maximizes pressure distribution on the toe section. The maximum velocity of the foot 4000, knee, and/or hip sections are calculated 4138 from the shear force, estimated coefficient of friction, pressure distribution, total weight, ground slope, and/or the like. The body may be tilted 4140 to correspond to the maximum velocity of the hip and/or the slope of the ground.

The linear displacement sensors 4012 in the toe may be filled 4142 to an average of half-full as the toe rotates, lifts, and pushes from the ground based on displacement measurements by the linear displacement sensors 4012. The processor may attempt to make the average fluid height half-full and as many of the linear displacement sensors 4012 half-full as possible. The shear force and/or pressure distribution may be measured 4144. The velocity may be controlled 4146 based on the shear force detected and/or the weight measurement. The maximum possible velocity may be directly proportional to the shear force detected with a higher shear force allowing for a faster possible velocity. The weight may be monitored 4148 for changes in distribution and/or load.

The total weight of the robot and load may be calculated from the pressure distribution of the linear displacement sensors 4010, 4012, the pressure output from the servo control valves, and/or the cumulative deflection of the pistons of the linear displacement sensors 4010, 4012 when all the weight is on one foot. The calculated value for total weight may be carried over from the previous step if no change is detected, and/or the weight may be detected with each step from the linear displacement sensor 4010, 4012 measurements and/or the hydraulic valve pressure necessary to elevate the foot as a load is lifted. The values for weight and coefficient of friction may be estimated as the heel touches the ground, as the flat section touches the ground, and/or as the toe leaves the ground. An initial estimated weight and/or mass may be determined from the weight of the robot without load. The weight of the robot without load may be input into and/or stored by the robot. The maximum velocity, acceleration, and/or deceleration may be calculated from the momentum (mass times velocity) of the robot, the estimated coefficient of friction between the foot and the ground surface, and/or the like. The maximum acceleration and/or deceleration may be the maximum change in velocity that will not cause the robotic foot 4000 to slip. If a loss of traction and/or slipping is detected, a new coefficient of friction may be calculated based on the amount of force being applied when the slipping occurred. The shear sensors 4020, linear displacement sensors 4010, 4012, displacement sensors in the ankle 4030, knee, and/or hip, and/or the like can be monitored to detect slipping. The processor may closely monitor slippage as a variable used when calculating the coefficient of friction.

It may be advantageous to keep a relatively low applied pressure to the linear displacement sensors 4010, 4012 before contact is made with the ground and increase the pressure as contact is made with the ground. Continuous feedback from the linear displacement sensors 4010, 4012, the shear sensors 4020, and/or the servo control valves may allow the processor to make instantaneous adjustments to the pressure in the linear displacement sensors as various changes in conditions are detected, such as a change in the perceived weight. The linear displacement sensors 4010, 4012 may be calibrated for weight as a function of servo control valve pressure regulation.

Figure 42:
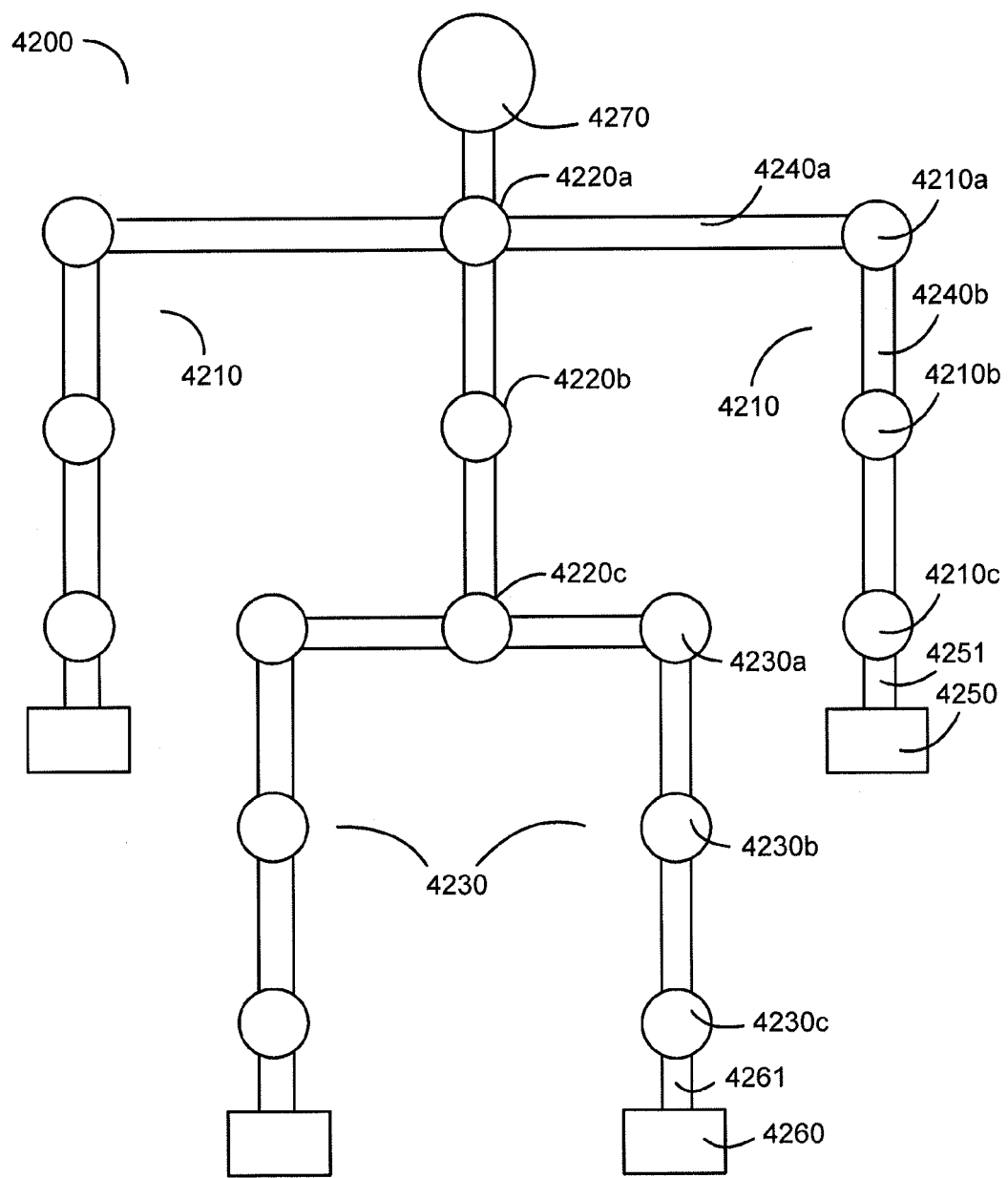
FIG. 42 is a schematic diagram of a complete skeleton system for a robot.

FIG. 42 is a schematic diagram of a complete skeleton system 4200 for a robot. The skeleton system 4200 may include a plurality of compound joints (e.g. joints 4210*a-c*, 4220*a-c*, 4230*a-c*) connected together by skeleton sections (e.g., skeleton sections 4240*a*, 4240*b*) including one or more skeletal components, each of which may or may not include batteries. The plurality of joints may be configured to move in a manner similar to human joints. For example, a shoulder joint 4210*a* may have three degrees of freedom, a elbow joint 4210*b* may have one degree of freedom, a wrist joint 4210*c* may have two degrees of freedom, a neck joint 4220*a* may have two degrees of freedom, a spinal column joint 4220*b* may have one or two degrees of freedom, a waist joint 4220*c* may have two degrees of freedom, a hip joint 4230*a* may have three degrees of freedom, a knee joint 4230*b* may have one degree of freedom, and an ankle 4230*c* joint may have two degrees of freedom. More or fewer degrees of freedom may be included in some embodiments. Hands 4250 and feet 4260 may be coupled to the skeleton 4200 by mechanical connections (e.g., mechanical connections 4251, 4261).

The skeleton system 4200 may include a head 4270. The head 4270 may be coupled to the skeleton system 4200 by a joint (not shown) with two degrees of freedom. The head 4270 may include vision systems, audio systems, various sensory systems, and/or the like. Examples of sensory systems may include gyroscopes, stereo cameras, sonic sensors, LIDAR, optical sensors, and the like. The skeleton system 4200 may also include a central hydraulic pumping system (not shown) and reservoir (not shown). One pump may be configured to deliver fluid to all of the joints 4210*a-c*, 4220*a-c*, 4230*a-c*; one pump may be used for each limb 4210, 4230; and/or the skeleton system 4200 may include more or fewer than one pump or one pump per limb. In an embodiment, the hydraulic pumping system and reservoir are located in a torso and/or body of the robot. The joint motions may be controlled by hydraulic valves for each joint individually with a central hydraulic pump. The pump may supply a positive pressure to the hydraulic valves.

Each compound joint 4210*a-c*, 4220*a-c*, 4230*a-c* may contain one or more flow meters, and/or each constituent joint within the compound joints 4210*a-c*, 4220*a-c*, 4230*a-c* may contain or be coupled to one or more flow meters. Each pump and/or reservoir (not shown) may also include flow meters. By monitoring the total flow of fluid through each joint 4210*a-c*, 4220*a-c*, 4230*a-c*, leaks may be detected. The flow of fluid into each joint 4210*a-c*, 4220*a-c*, 4230*a-c* may be compared with the flow of fluid out of each joint 4210*a-c*, 4220*a-c*, 4230*a-c*, and/or the total flow out of the pump and/or reservoir may be compared with the total flow through all the joints 4210*a-c*, 4220*a-c*, 4230*a-c*. If it is determined that the hydraulic system is leaking, the hydraulic system and/or components of the hydraulic system may be deactivated. Grippers and/or the skeletal components 4240*a*, 4240*b* may also include flow meters to detect leaks.

One or more processors (not shown) may send signals to control valves for each joint 4210*a-c*, 4220*a-c*, 4230*a-c* to control movement of each joint 4210*a-c*, 4220*a-c*, 4230*a-c*, the hands 4250, and the feet 4260. In an embodiment, different processors may perform different functions, such as one processor implementing a walking algorithm and another processor implementing a gripping algorithm, and/or one or more processors may include multiple cores configured to perform different functions and/or to process different threads. The one or more processors may receive measurements from joint measurement cells to determine the locations of the limbs 4210, 4230, the hands 4250, and/or the feet 4260 and/or identify objects in hands 4250 and/or grippers. The one or more processors may be located in the head 4270, torso, body, or the like and/or may be distributed throughout the robot 4200 based on function. The skeleton system may include a power inlet for receiving electrical power and battery charging and discharging hardware and/or software. The inlet, hardware, and/or software may be located in the head 4270, torso, body, or the like.

It will be understood by those having skill in the art that many changes may be made to the details of the above-described embodiments without departing from the underlying principles of the disclosure. For example, components and/or configurations disclosed in relation to one embodiment may be used in other embodiments unless the disclosure explicitly states otherwise. The scope of the present disclosure should, therefore, be determined only by the following claims.

The invention claimed is:

1. A skeletal component for supporting and powering locomotion of an electric device, the skeletal component comprising:
    an elongated inner core;
    a first battery coupled to and substantially circumscribing the inner core, the first battery comprising an anode, a cathode, a separator, and wires, wherein the wires couple each of the anode and the cathode to the robot, and wherein the first battery provides structural support to the skeletal component; and
    a casing at least partially enclosing the first battery.

2. The skeletal component of claim 1, wherein the first battery comprises a battery cell selected from the group consisting of a rechargeable lithium battery and a flexible lithium polymer battery.

3. The skeletal component of claim 1, wherein the inner core comprises a hollow interior.

4. The skeletal component of claim 3, further comprising a polyvinyl chloride (PVC) pipe for transmitting fluid, wherein the inner core at least partially encircles the PVC pipe.

5. The skeletal component of claim 3, further comprising an insulator sleeve, wherein the hollow interior comprises a plurality of chambers configured to transport fluid longitudinally, wherein the plurality of chambers are configured to prevent fluid from different chambers from mixing during transport, and wherein the insulator sleeve insulates the fluid from the inner core.

6. The skeletal component of claim 3, wherein the inner core comprises conductive, longitudinal surface elements configured to transmit data.

7. The skeletal component of claim 3, wherein the inner core comprises conductive, longitudinal surface elements configured to couple the wires to the robot.

8. The skeletal component of claim 1, wherein the first battery comprises a plurality of battery cells and a plurality of support plates, and wherein each battery cell is encased by the plurality of support plates.

9. The skeletal component of claim 1, further comprising a second battery, wherein the second battery substantially circumscribes the first battery.

10. The skeletal component of claim 1, wherein the inner core is configured to connect to a joint via a quick release flange.

11. The skeletal component of claim 1, further comprising an end cap configured to removeably couple to the inner core.

12. The skeletal component of claim 11, wherein the end cap comprises a port configured to transmit at least one of fluid, data, and power.

13. The skeletal component of claim 1, wherein the first battery comprises a plurality of battery cells, and wherein each battery cell comprises a plurality of substantially parallel windings.

14. The skeletal component of claim 13, wherein the substantially parallel windings are insert molded into at least one of the plurality of battery cells.

15. The skeletal component of claim 1, wherein the first battery is configured to conform to a shape of the inner core.

16. The skeletal component of claim 1, wherein the casing is configured to seal punctures.

17. The skeletal component of claim 1, wherein the casing completely encloses the first battery, and wherein the wires perforate the casing.

18. The skeletal component of claim 1, further comprising:
a heating element configured to deliver heat to the first battery; and
an electrical insulator configured to electrically insulate the first battery from the heating element.

19. The skeletal component of claim 18, wherein the heating element comprises at least one of a resistive heating element and a thermoelectric heating element.

20. The skeletal component of claim 18, wherein the heating element is helically shaped and wraps around the battery.

21. A robot skeletal component for transporting fluid, the robot skeletal component comprising:
a male end;
a female end;
an output section between the male end and the female end; and
an elongated inner core comprising a hollow interior,
wherein the male and female ends are configured to mechanically connect to other skeletal components and/or joints,
wherein the output section and the female end are configured to transfer the fluid to the other skeletal components and/or joints, and
wherein the inner core comprises a plurality of chambers, wherein each chamber is bounded by the elongated inner core and a common dividing wall configured to prevent fluids from different chambers from mixing during transport, wherein the plurality of chambers are parallel to each other, and wherein the plurality of chambers are configured to transfer the fluid between the female end and the output section.

22. The robot skeletal component of claim 21, wherein the inner core comprises a plurality of surface elements configured to transfer at least one of data and electrical power between the female end and the output section.

23. The robot skeletal component of claim 22, wherein the inner core comprises:
a core cylinder; and
an insulator configured to electrically insulate the core cylinder from the plurality of surface elements.

24. The robot skeletal component of claim 21, wherein the plurality of chambers are configured to insulate the fluid in each chamber from fluid in other chambers.

25. The robot skeletal component of claim 24, wherein the inner core comprises an insulator configured to electrically insulate the fluid from the inner core.

26. The robot skeletal component of claim 21, wherein the inner core comprises a material selected from the group consisting of titanium, aluminum, and carbon fiber.

27. The robot skeletal component of claim 21, further comprising a battery, wherein at least one of the female end and the output section is electrically coupled to the battery.

28. The robot skeletal component of claim 27, wherein the battery comprises first and second ends and is cylindrically wound about the inner core, and wherein the female end and the output section enclose the first and second ends of the battery to prevent longitudinal displacement relative to the inner core.

29. The robot skeletal component of claim 27, wherein the female end comprises one or more switches configured to selectively couple the battery to charging and discharging circuits.

30. The robot skeletal component of claim 21, wherein the female end comprises a fluid port in fluid communication with a pump.

31. A robot skeletal component for transporting data and/or electrical power, the robot skeletal component comprising:
a cylindrical inner core comprising a hollow interior;
a proximal end configured to connect the robot skeletal component to a first adjacent skeletal component or joint; and
a distal end configured to connect the robot skeletal component to a second adjacent skeletal component or joint,
wherein the inner core comprises a plurality of conducting elements coupled to a surface of the cylindrical inner core and running along the surface parallel to a cylinder axis, the plurality of conducting elements configured to transfer at least one of data and electrical power between the first adjacent skeletal component and the second adjacent skeletal component.

* * * * *